United States Patent
Ke et al.

(10) Patent No.: US 11,617,109 B2
(45) Date of Patent: Mar. 28, 2023

(54) RADIO ACCESS NETWORK HANDOVER METHOD, BASE STATION, AND COMMUNICATION METHOD OF THE BASE STATION

(71) Applicant: Samsung Electronics Co., Ltd., Suwon-si (KR)

(72) Inventors: Xiaowan Ke, Beijing (CN); Hong Wang, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 519 days.

(21) Appl. No.: 16/476,203

(22) PCT Filed: Jan. 8, 2018

(86) PCT No.: PCT/KR2018/000332
§ 371 (c)(1),
(2) Date: Jul. 5, 2019

(87) PCT Pub. No.: WO2018/128494
PCT Pub. Date: Jul. 12, 2018

(65) Prior Publication Data
US 2021/0289402 A1    Sep. 16, 2021

(30) Foreign Application Priority Data

Jan. 6, 2017   (CN) .................... 201710009861.X
May 5, 2017   (CN) .................... 201710310626.6
(Continued)

(51) Int. Cl.
*H04W 36/00*   (2009.01)
*H04W 8/08*    (2009.01)
(Continued)

(52) U.S. Cl.
CPC ......... *H04W 36/0022* (2013.01); *H04W 8/08* (2013.01); *H04W 28/0268* (2013.01);
(Continued)

(58) Field of Classification Search
CPC ............... H04W 36/0022; H04W 8/08; H04W 28/0268; H04W 36/0033; H04W 36/14;
(Continued)

(56) References Cited

U.S. PATENT DOCUMENTS 8,391,241 B2   3/2013   Vikberg et al.
10,390,266 B2  8/2019   Won et al.
(Continued)

FOREIGN PATENT DOCUMENTS

CN    101816206 A      8/2010
WO    2013/125918 A1   8/2013
(Continued)

OTHER PUBLICATIONS

Title: "Resolving editor's nodes in Solution 18.2", SA WG2 Meeting #118, S2-167077;, Nov. 14-18, Reno, NV USA (Year: 2016).*
(Continued)

*Primary Examiner* — Michael Y Mapa
(74) *Attorney, Agent, or Firm* — Jefferson IP Law, LLP

(57) ABSTRACT

A radio access network handover method of a base station in a 5G radio access network (5G-RAN) is are disclosed. The method comprising: determining handing over a user equipment (UE) to an Evolved Universal Terrestrial Radio Access Network (E-UTRAN); transmitting a handover requirement message to an Access and Mobility Management Function (AMF); receiving a handover command message from the AMF and transmitting the handover command message to the UE, the handover message such that the UE is handed over from the 5G-RAN to the E-UTRAN; and performing indirect data forwarding to a base station in the E-UTRAN.

4 Claims, 18 Drawing Sheets

(30) Foreign Application Priority Data

| | | | |
|---|---|---|---|
| May 12, 2017 | (CN) | ......................... | 201710334629.3 |
| Jun. 16, 2017 | (CN) | ......................... | 201710457132.0 |
| Jul. 11, 2017 | (CN) | ......................... | 201710562752.0 |
| Aug. 21, 2017 | (CN) | ......................... | 201710717927.0 |
| Sep. 30, 2017 | (CN) | ......................... | 201710939371.X |
| Nov. 15, 2017 | (CN) | ......................... | 201711131078.7 |

(51) Int. Cl.
*H04W 28/02* (2009.01)
*H04W 36/14* (2009.01)
*H04W 88/16* (2009.01)

(52) U.S. Cl.
CPC ....... *H04W 36/0033* (2013.01); *H04W 36/14* (2013.01); *H04W 88/16* (2013.01)

(58) Field of Classification Search
CPC ............. H04W 88/16; H04W 36/0066; H04W 28/0263; H04W 40/36; H04W 36/0016; H04W 36/02
USPC .................................. 370/331; 455/436–444
See application file for complete search history.

(56) References Cited

U.S. PATENT DOCUMENTS

| | | | |
|---|---|---|---|
| 2012/0207129 A1* | 8/2012 | Sun ................... | H04W 36/0016 370/331 |
| 2016/0021592 A1 | 1/2016 | Vesely et al. | |
| 2016/0127889 A1 | 5/2016 | Cui et al. | |
| 2016/0330612 A1 | 11/2016 | Mildh et al. | |
| 2017/0034749 A1* | 2/2017 | Chandramouli .... | H04L 12/4633 |
| 2020/0120570 A1* | 4/2020 | Youn ..................... | H04W 76/11 |

FOREIGN PATENT DOCUMENTS

| | | |
|---|---|---|
| WO | 2015/170931 A1 | 11/2015 |
| WO | 2016/122589 A1 | 8/2016 |
| WO | 2016/195735 A1 | 12/2016 |

OTHER PUBLICATIONS

"Resolving editor's nodes in Solution 18.2", SA WG2 Meeting #118, S2-167077;, Nov. 14-18, Reno, NV USA (Year: 2016).*
Chinese Office Action with English translation dated Mar. 24, 2021; Chinese Appln. No. 201711131078.7.
Nokia et al.; Updates on interworking and migration solution 18.2: Call flows; SA WG2 Temporary Document; SA WG2 Meeting #117; S2-166101 (revision of S2-165869); XP051170061; Oct. 17-21, 2016 ; Kaohsiung, Taiwan.
Qualcomm Inc.; Updated solution 6.4.3 for key issue 4; SA WG2 Temporary Document; SA WG2 Meeting #118; S2-166540 (revision of S2-16xxxx); XP051185099; Nov. 14-18, 2016; Reno, NV.
Samsung; Update of solution 18.4 to support QoS mapping on Common IP Anchor; SA WG2 Temporary Document; SA WG2 Meeting #118; S2-166455; XP051185017; Nov. 14-18, 2016; Reno, NV.
Nokia et al; Resolving editor's notes in Solution 18.2; SA WG2 Temporary Document; SA WG2 Meeting #118; S2-167077; (revision of S2-166445, 7073); XP051200018; Nov. 14-18, 2016; Reno, NV.
3GPP; 3rd Generation Partnership Project; Technical Specification Group Services and System Aspects; Study on Architecture for Next Generation System (Release 14); 3GPP TR 23.799; V14.0.0; XP051295448; Dec. 2016; Valbonne, France.
European Search Report dated Nov. 20, 2019; European Appln. No. 18736028.4-1214 / 3563607 PCT/KR2018000332.
European Search Report dated Jan. 29, 2020; European Appln. No. 18736028.4-1212 / 3563607 PCT/KR2018000332.

* cited by examiner

[Fig. 1]
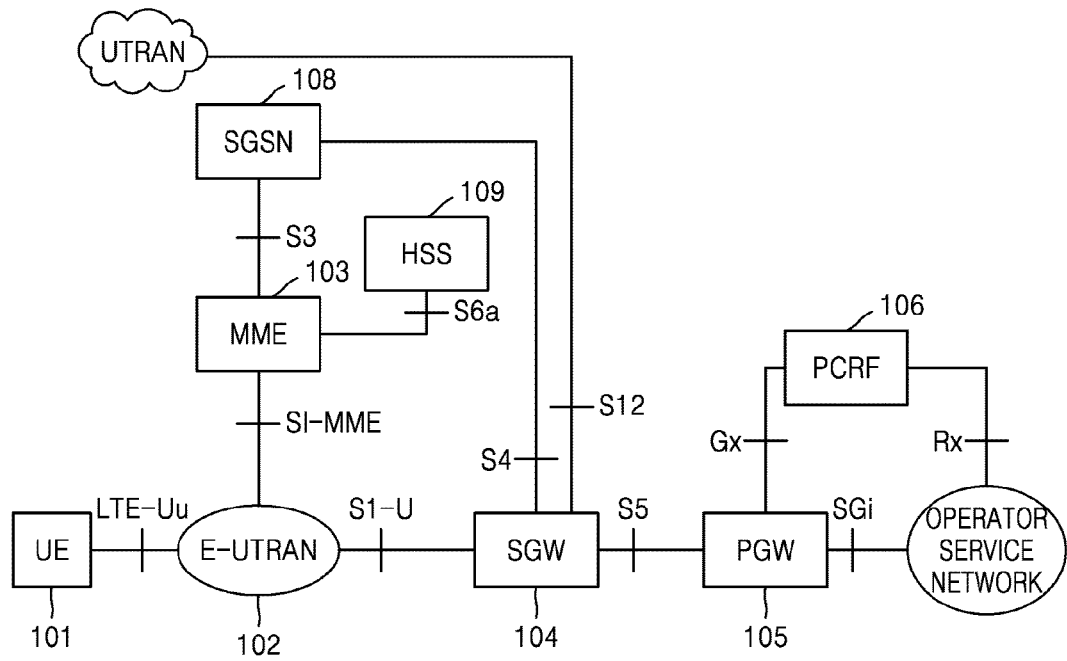
[Fig. 2]
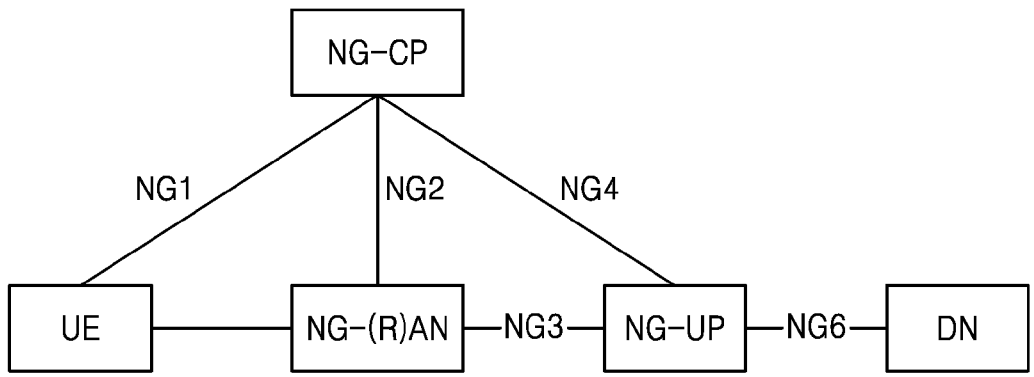

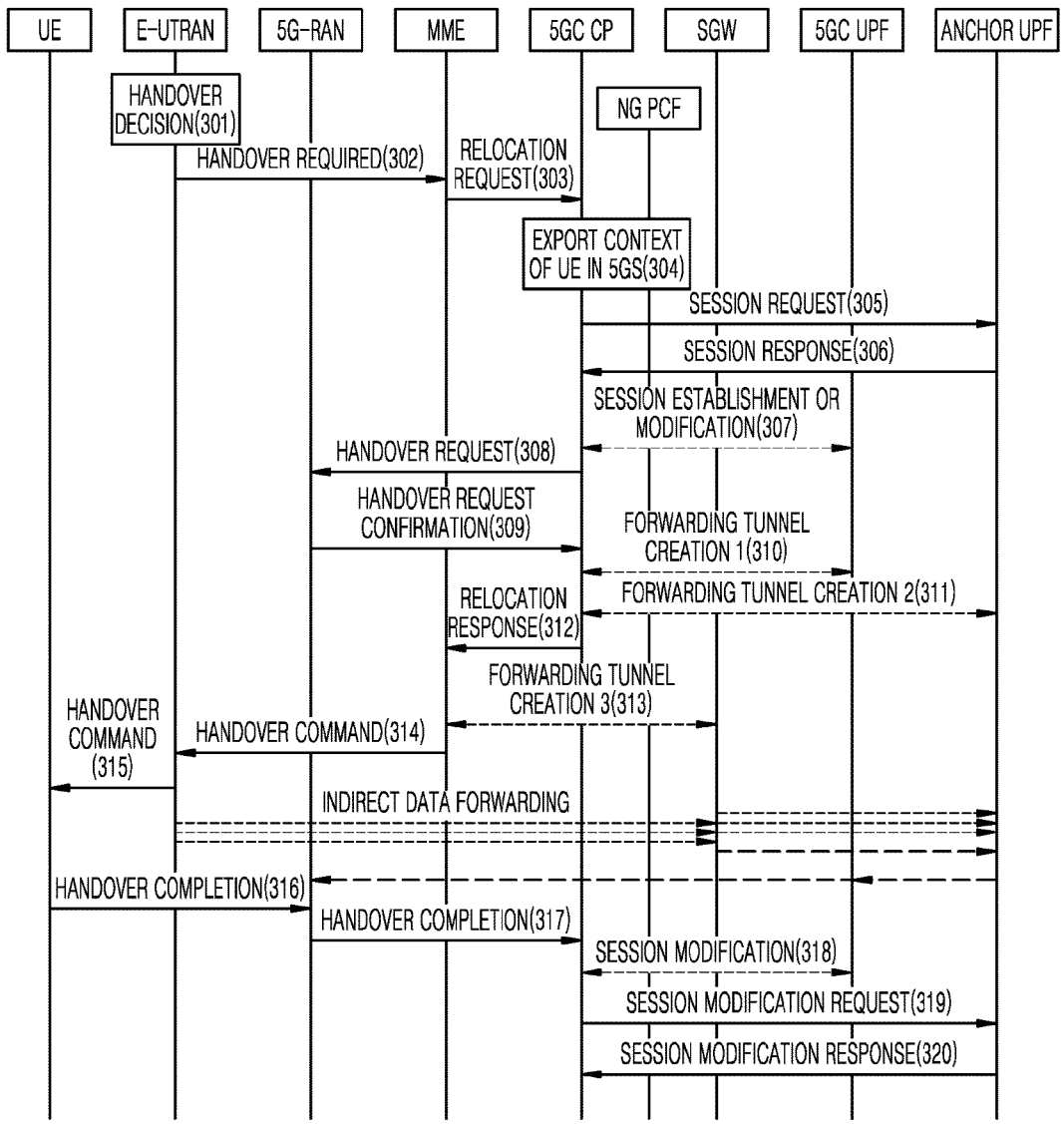
[Fig. 3]

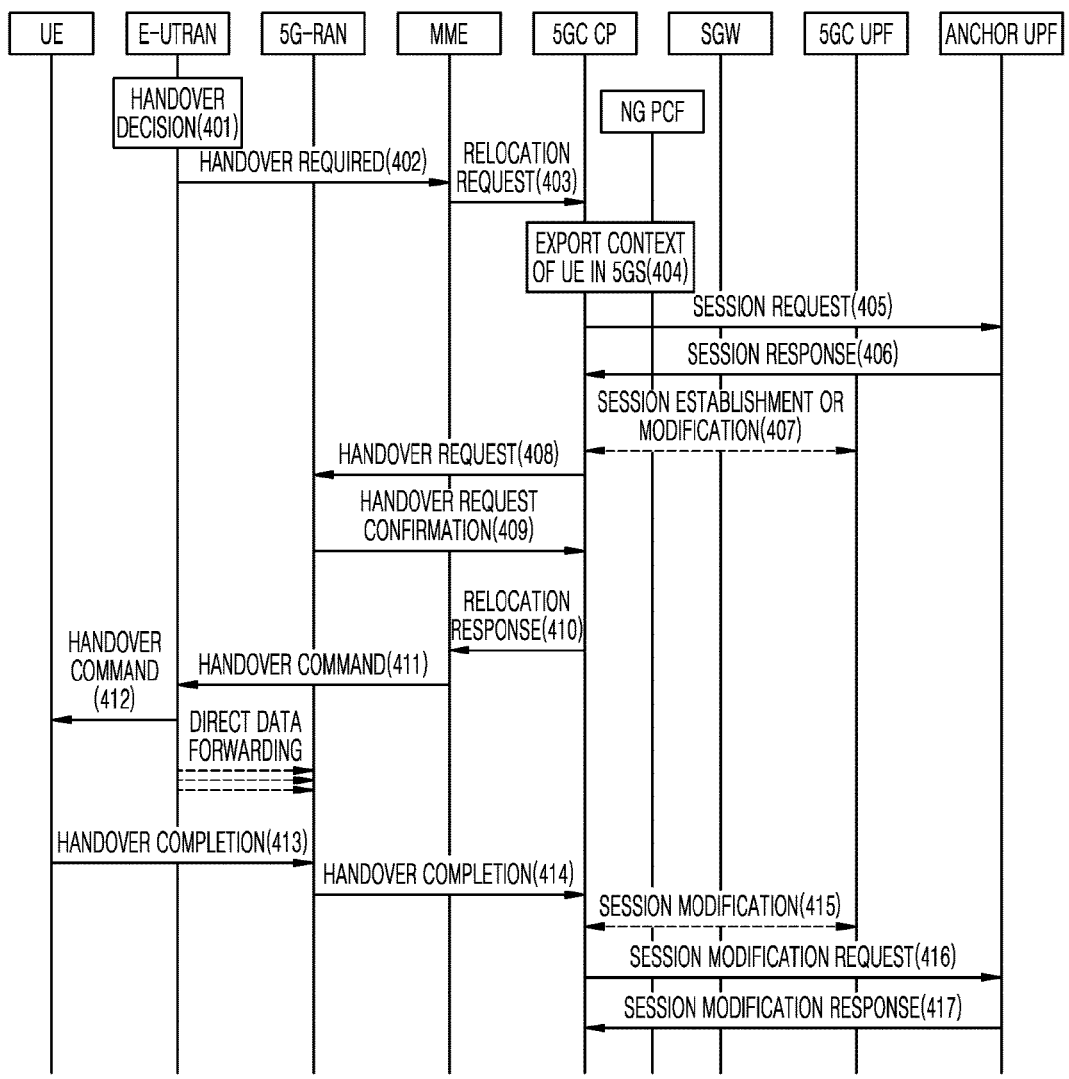
[Fig. 4]

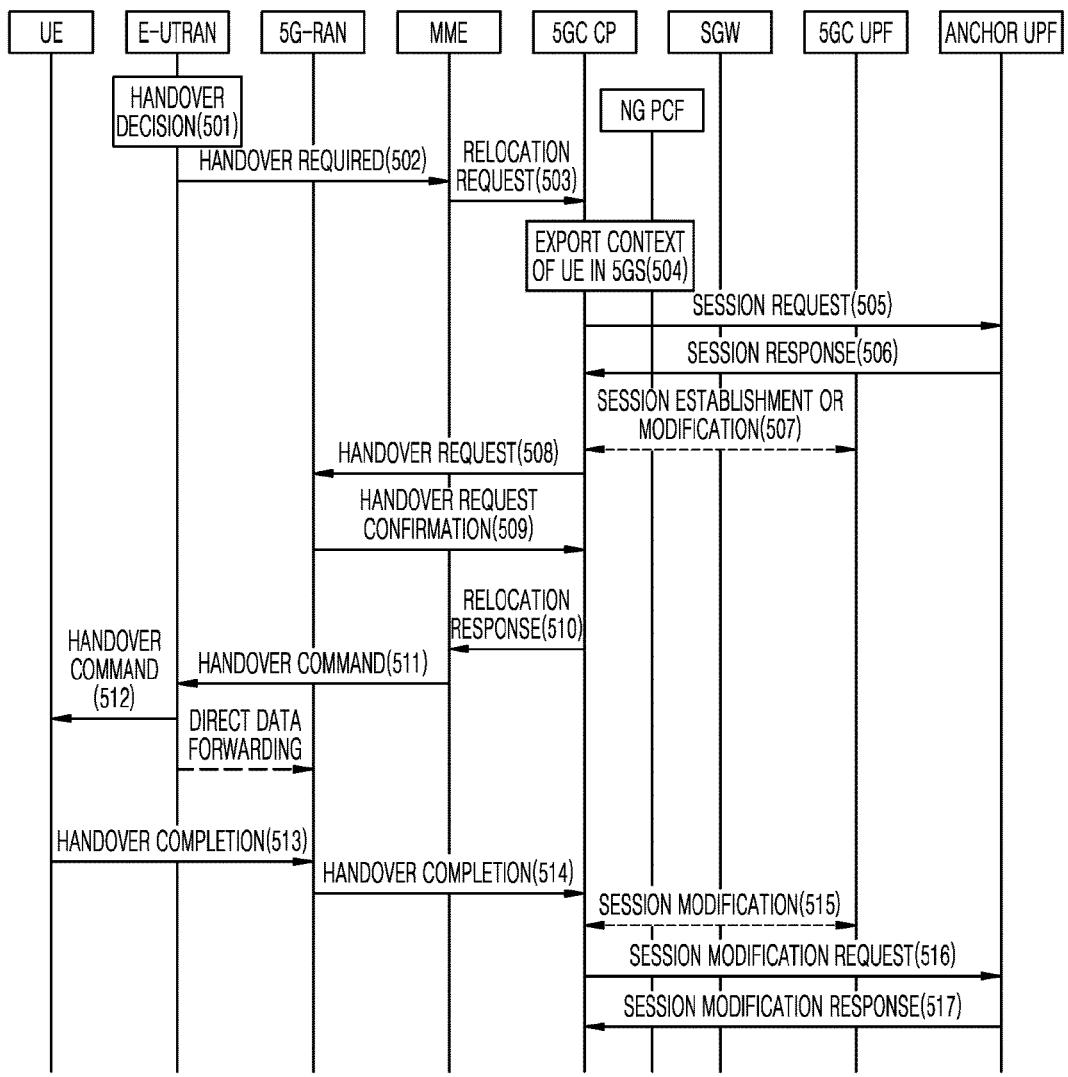
[Fig. 5]

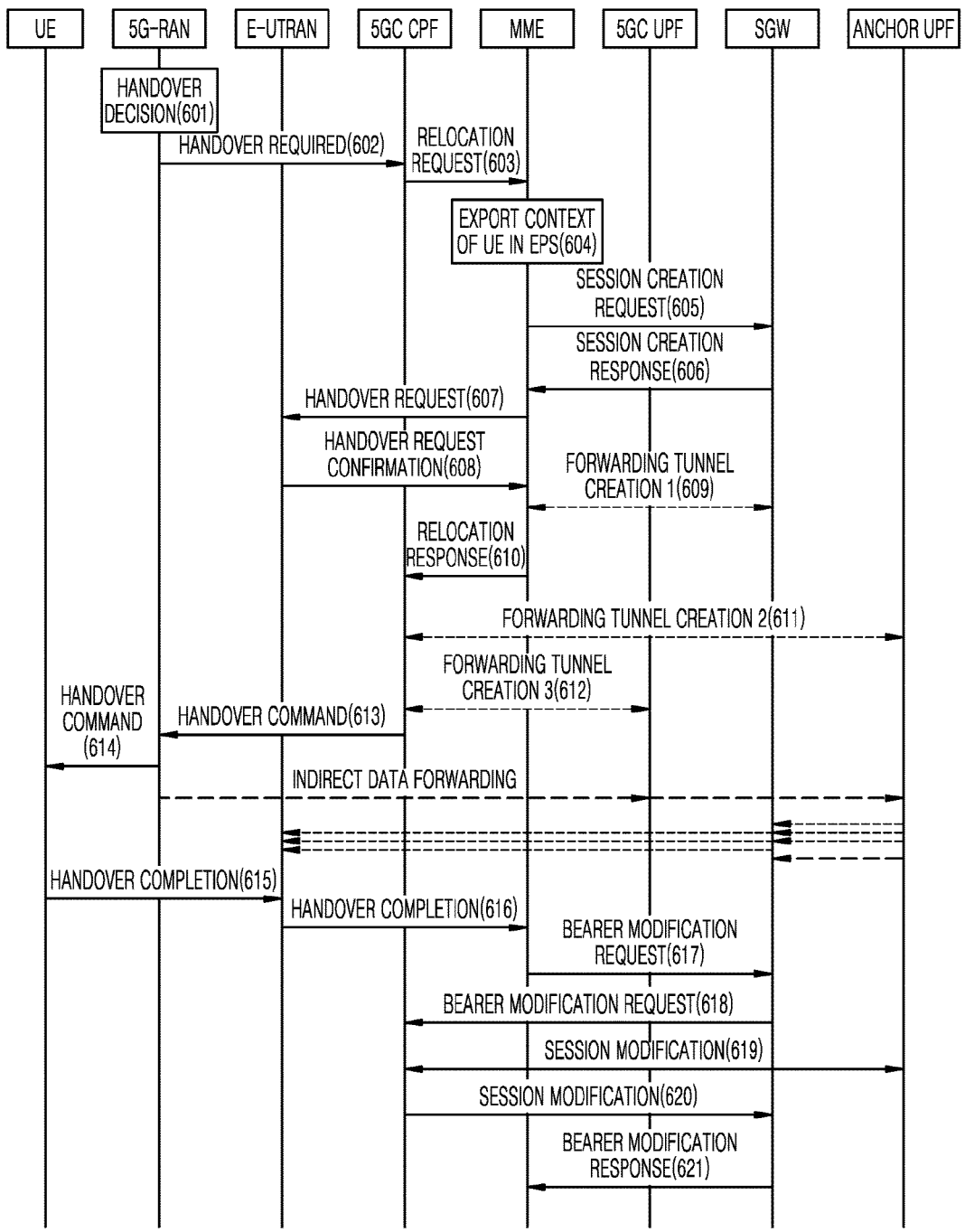
[Fig. 6]

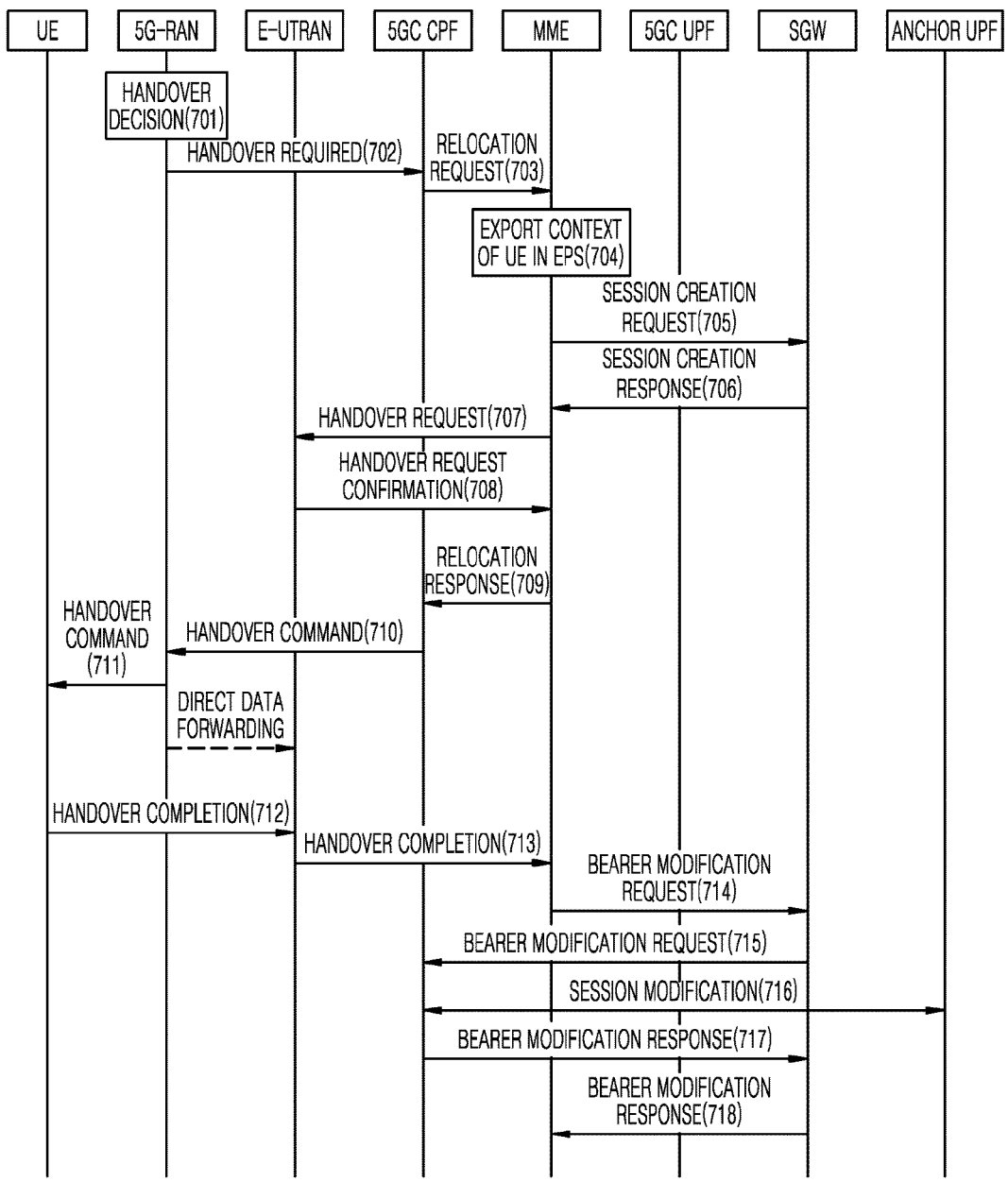
[Fig. 7]

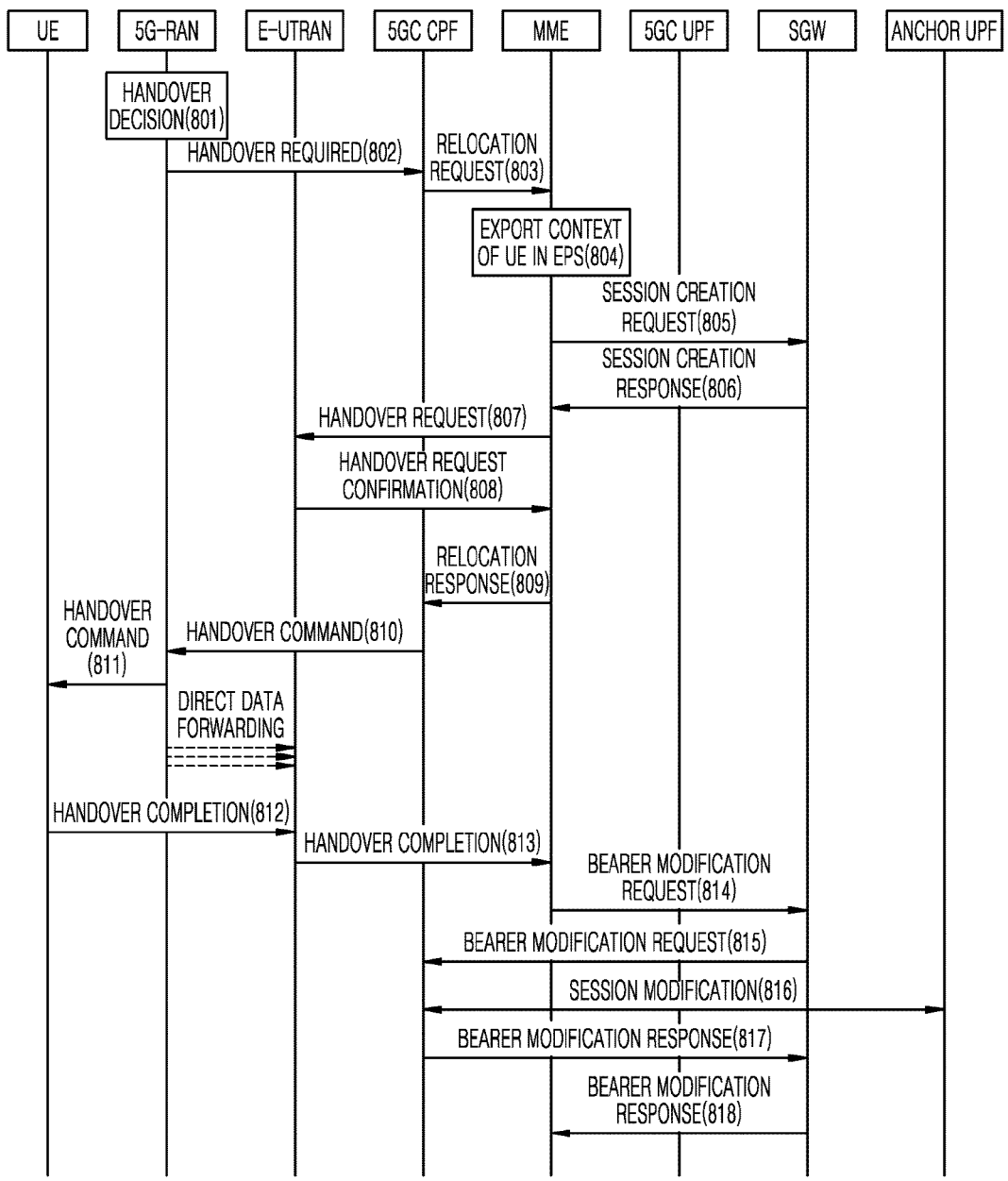

[Fig. 9]
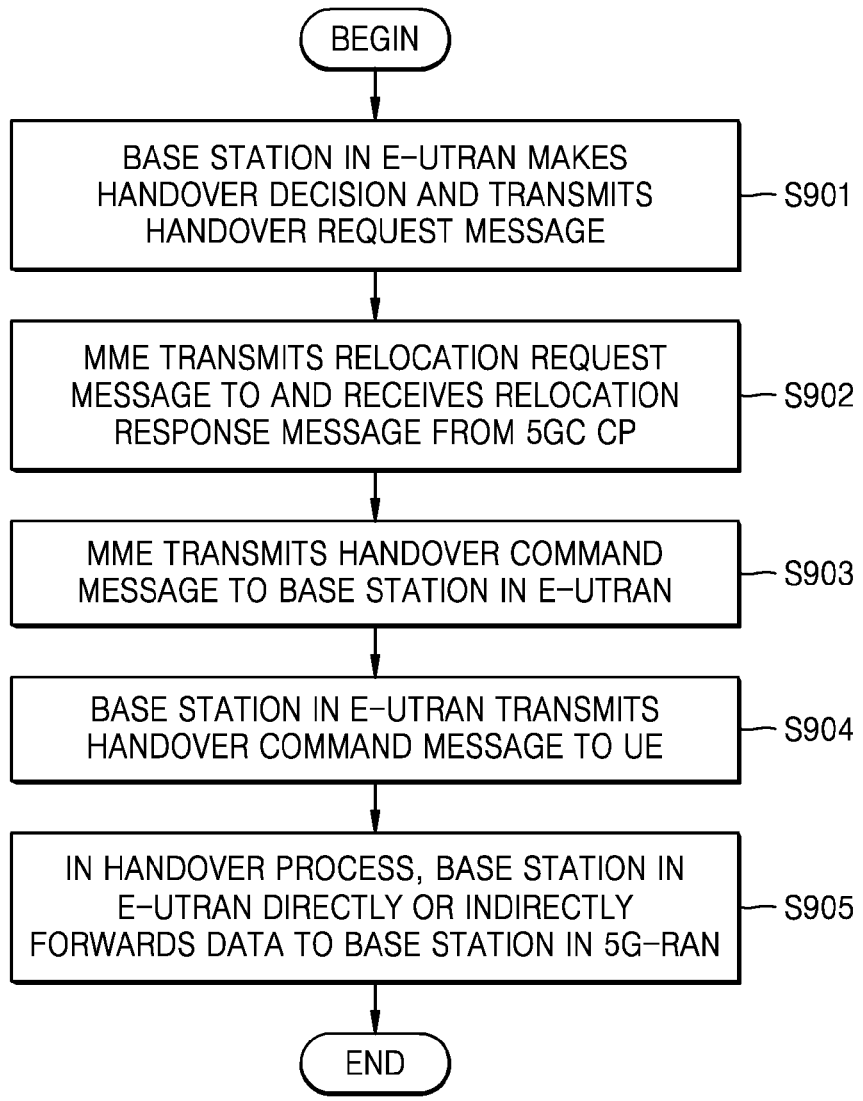

[Fig. 10]
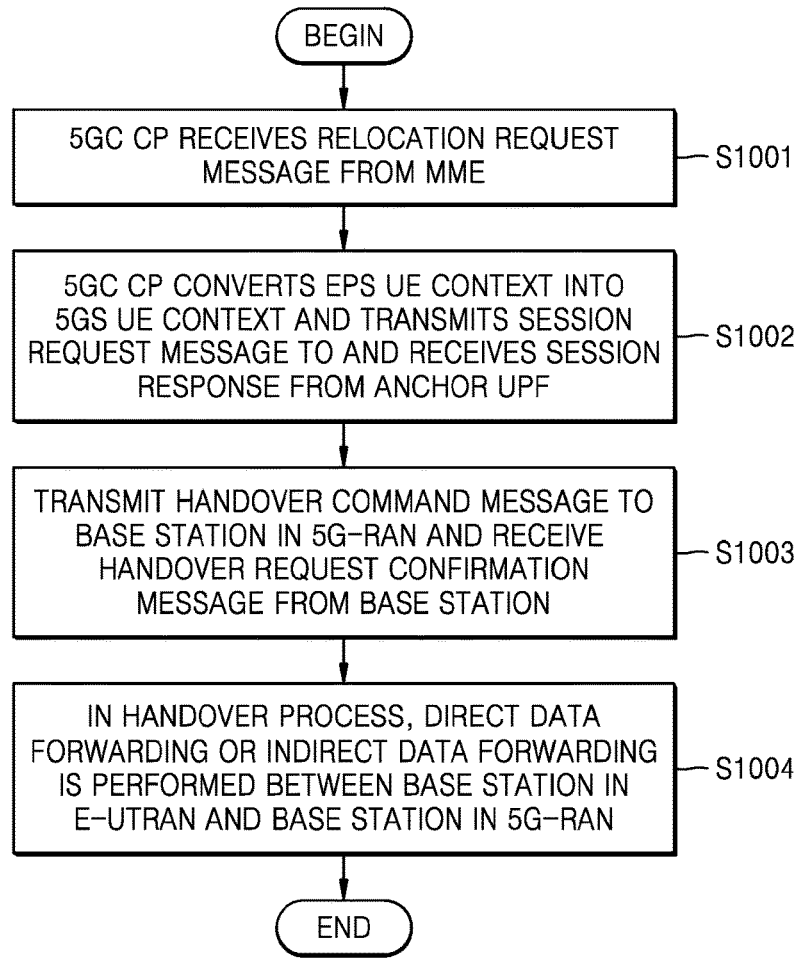
[Fig. 11]
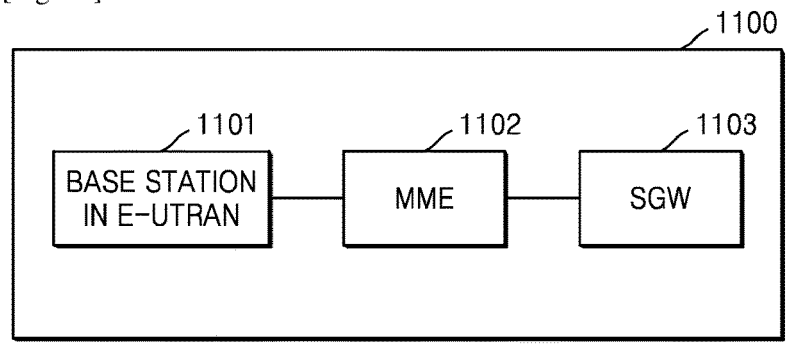
[Fig. 12]
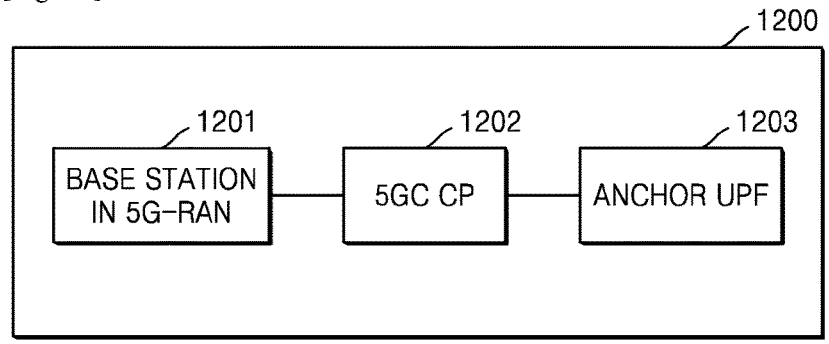

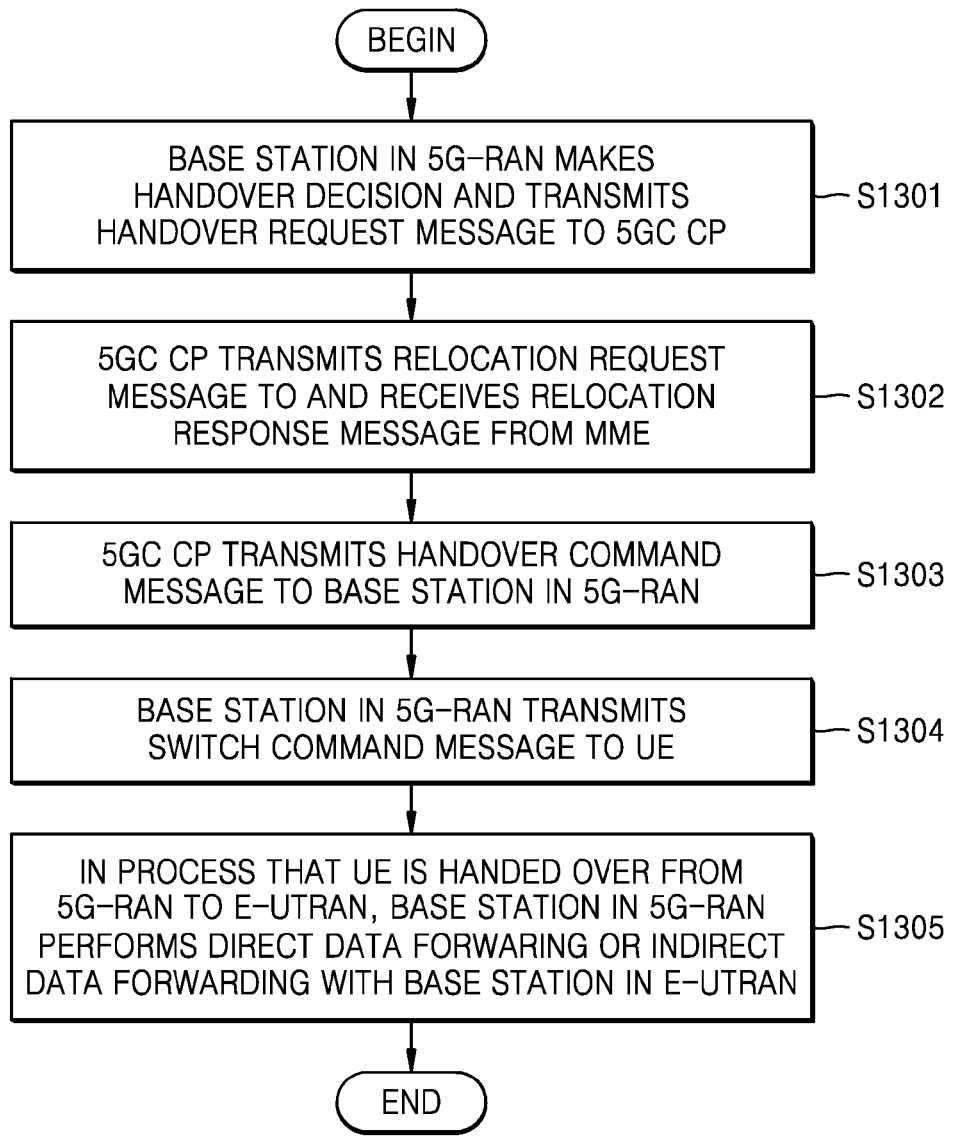
[Fig. 13]

[Fig. 14]
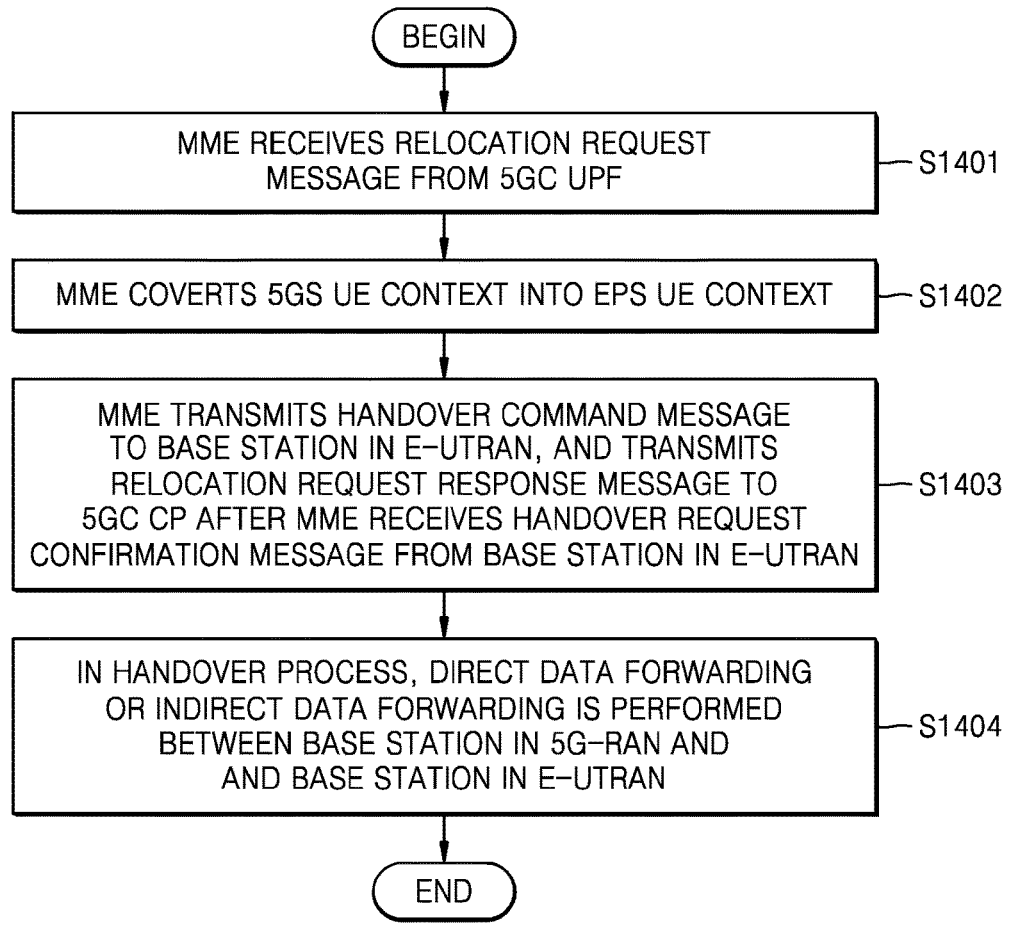
[Fig. 15]
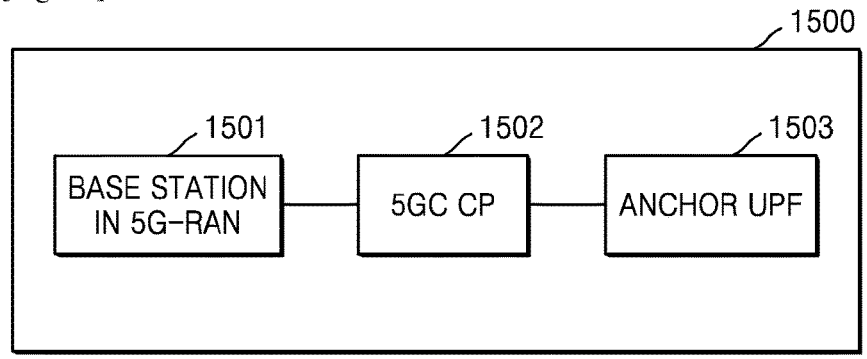
[Fig. 16]
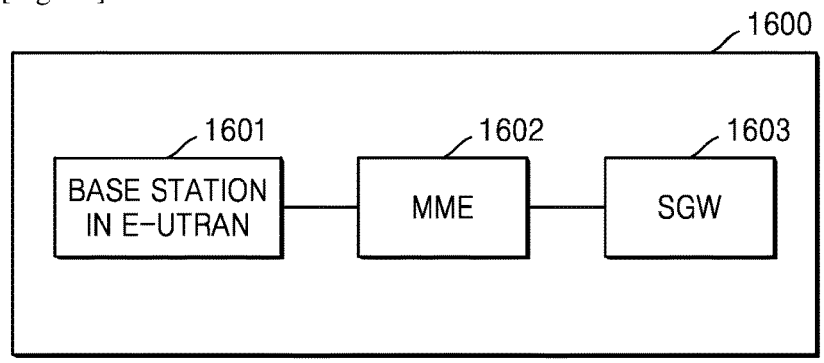

[Fig. 17]
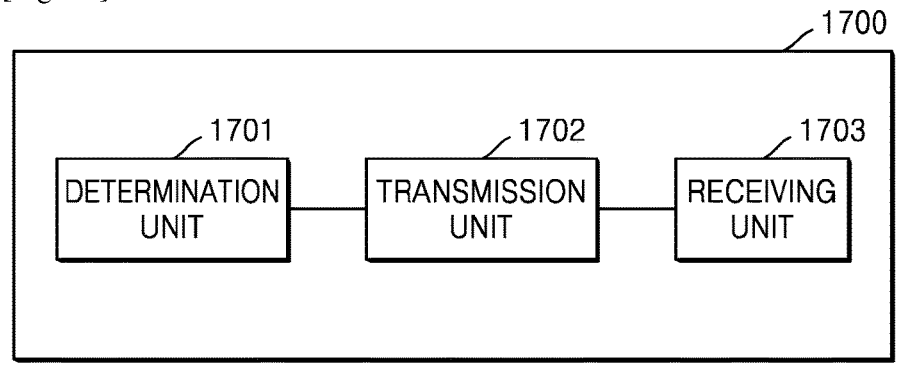
[Fig. 18]
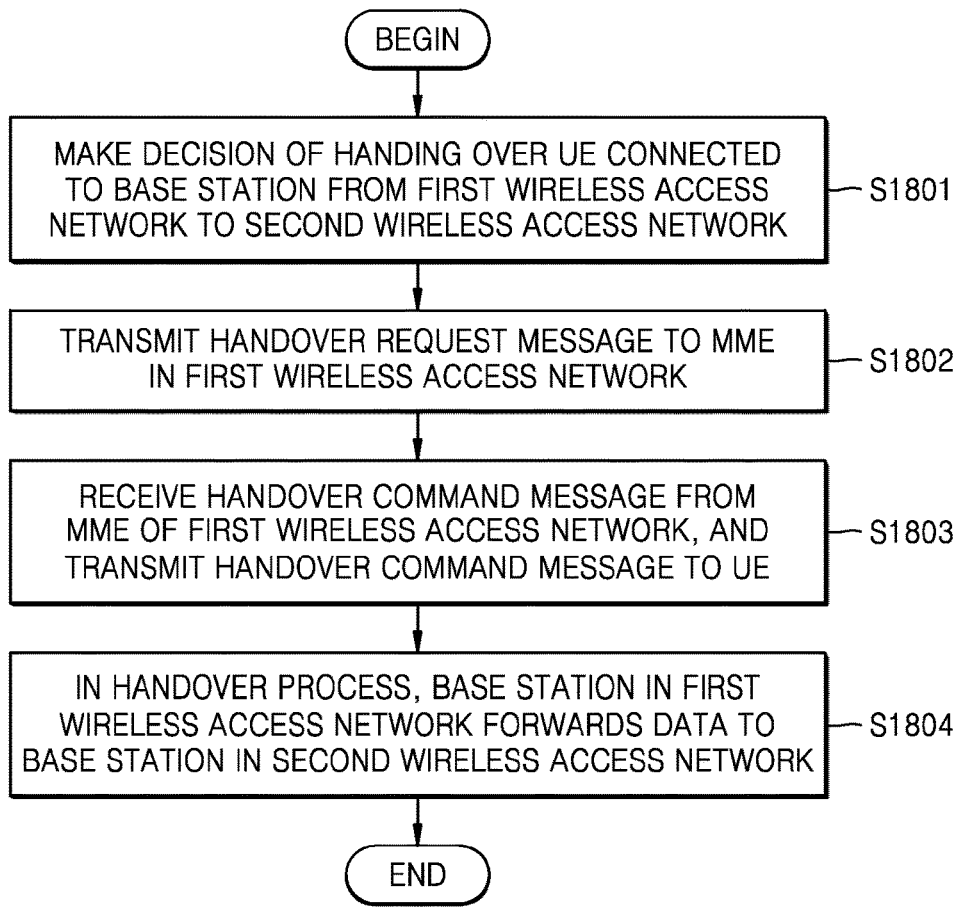
[Fig. 19]
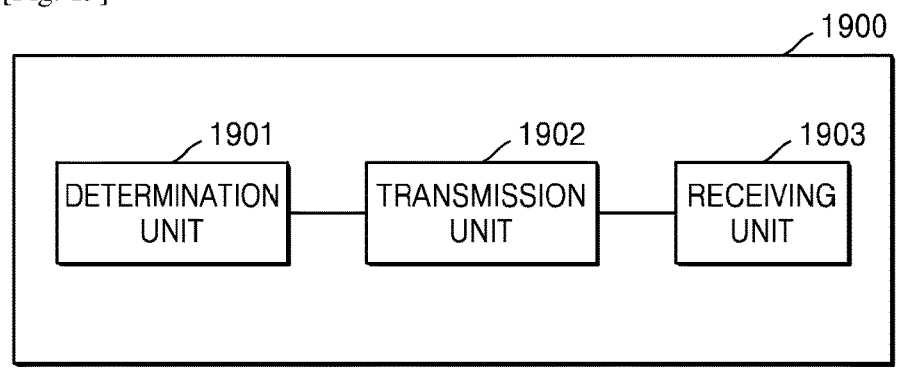

[Fig. 20]
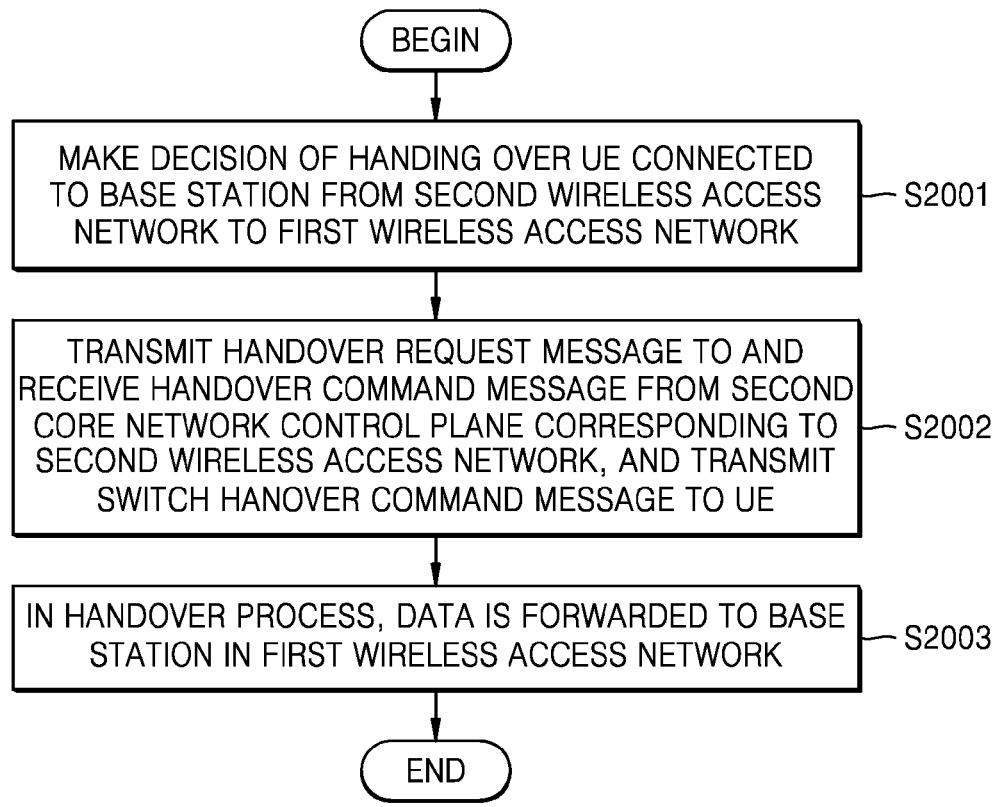
[Fig. 21]
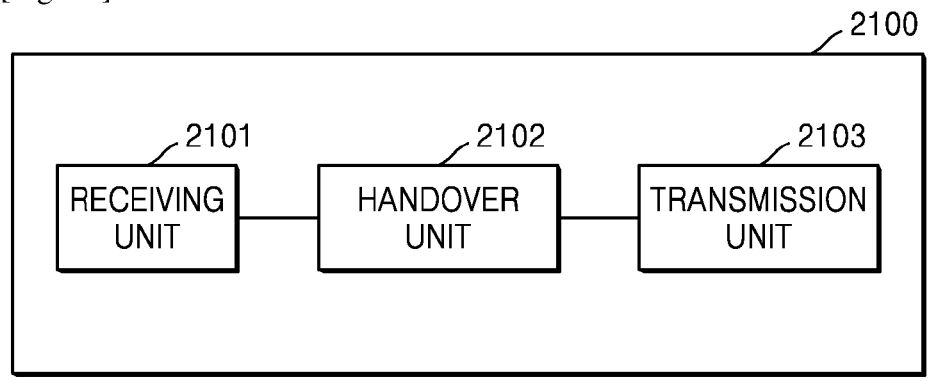

[Fig. 22]
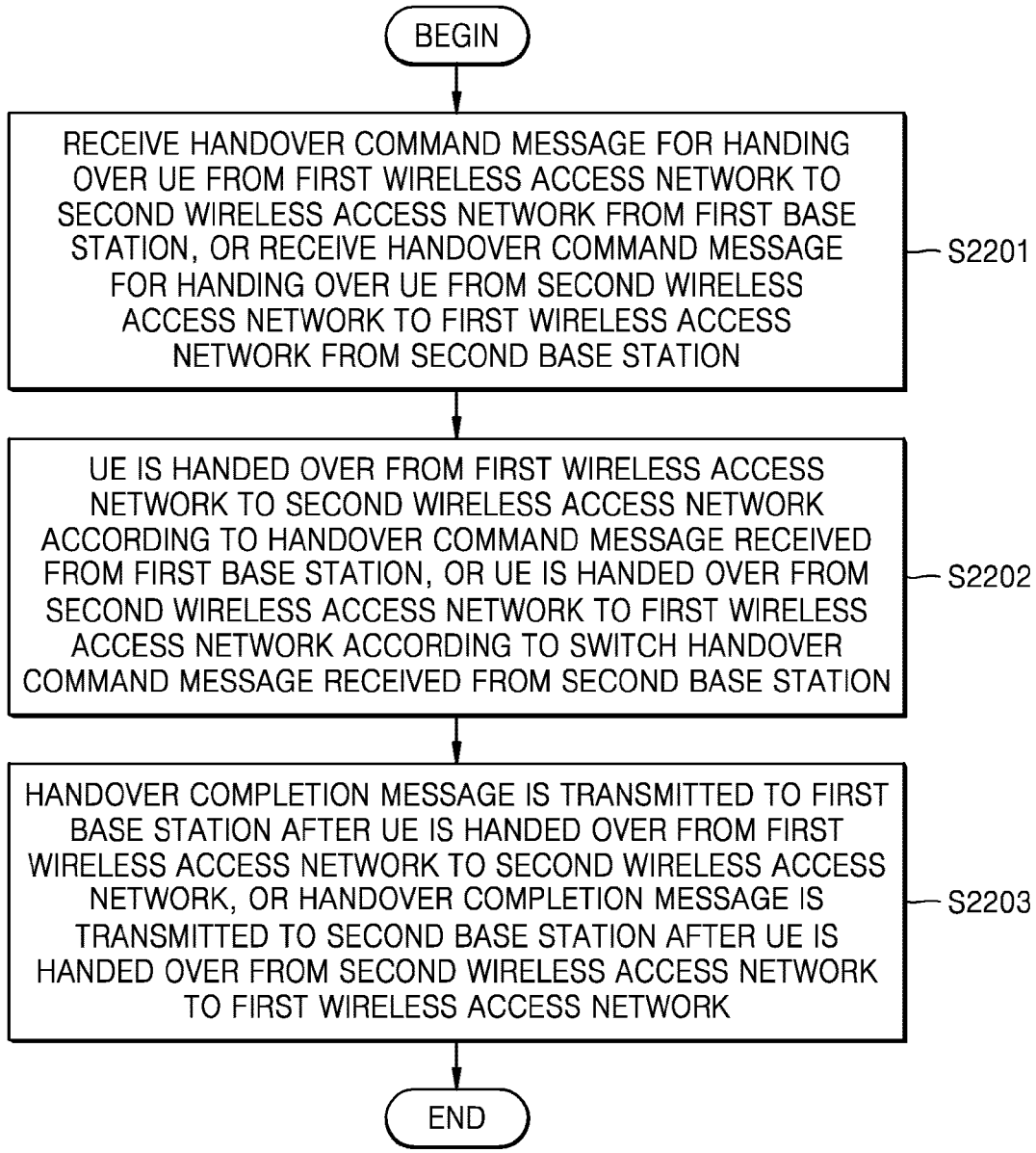

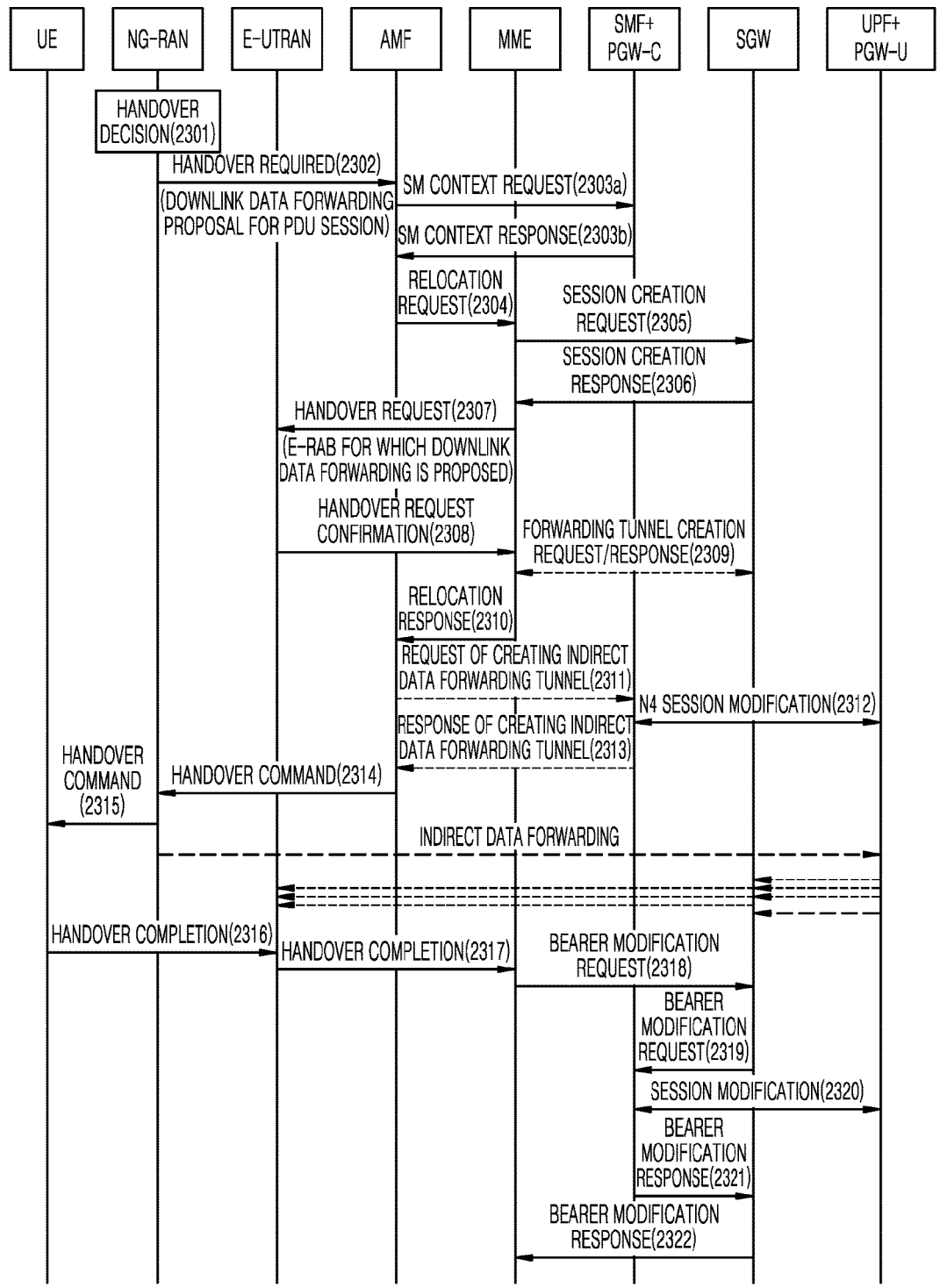
[Fig. 23]

[Fig. 24]
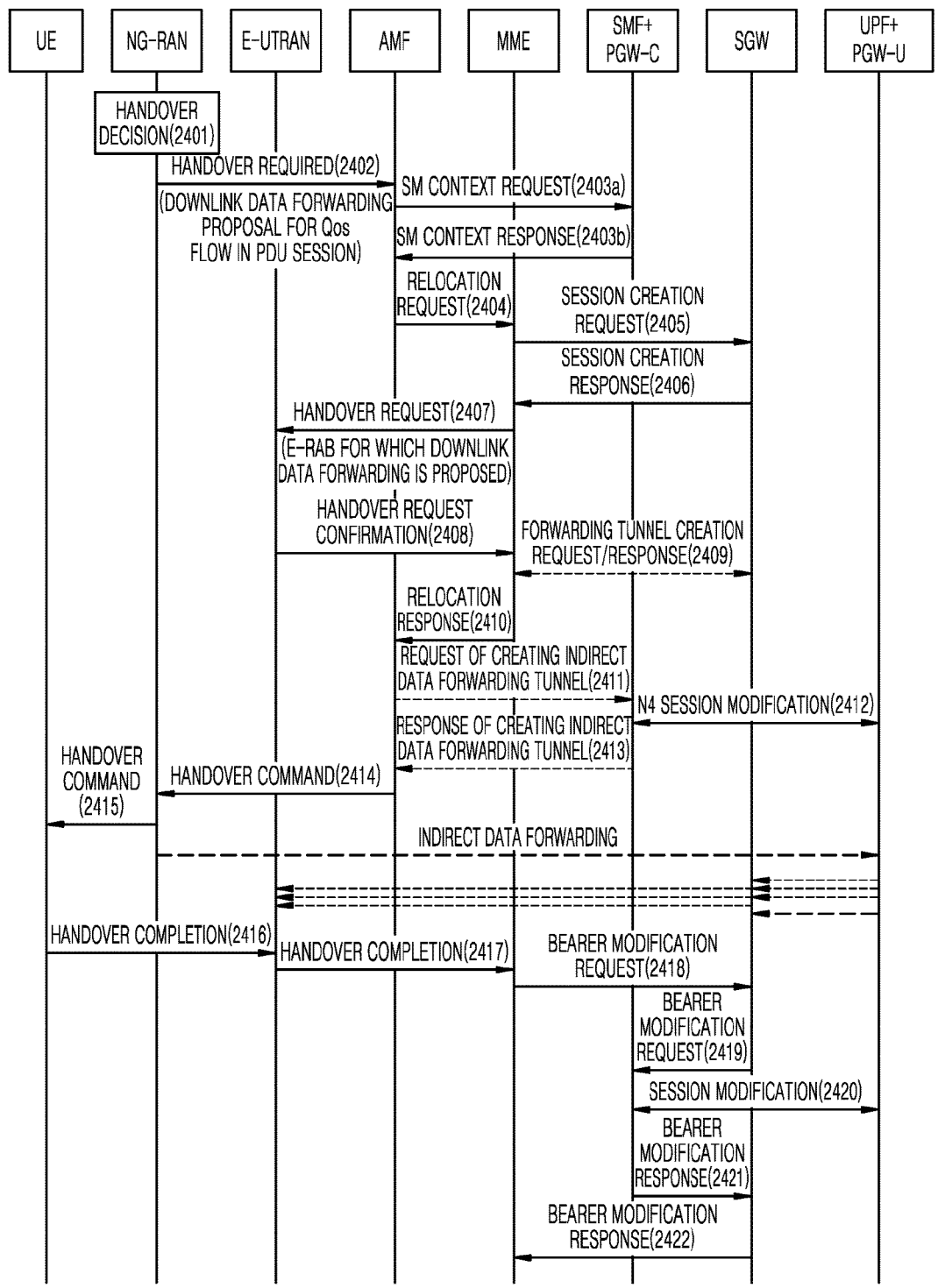

[Fig. 25]
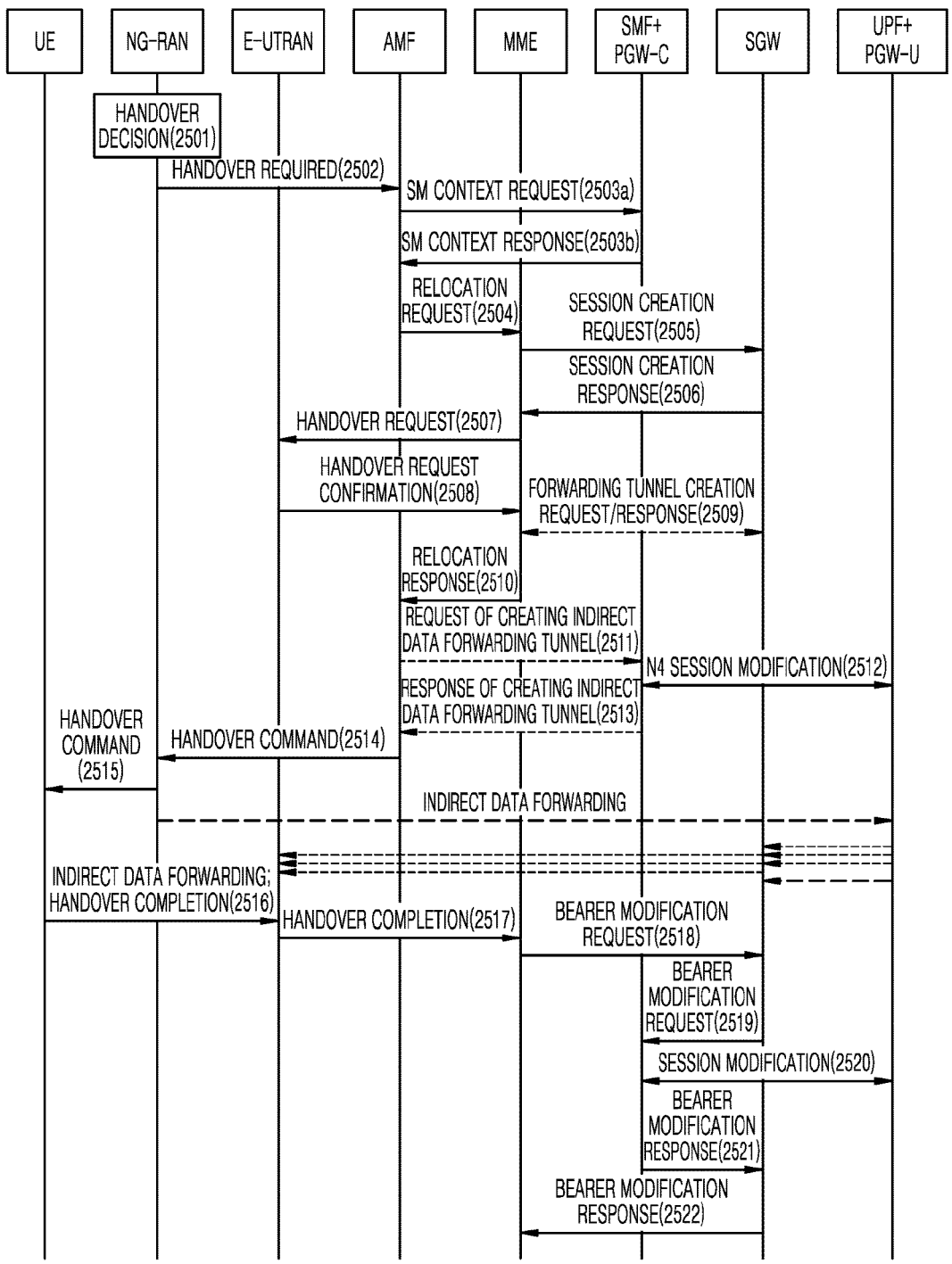

[Fig. 26]
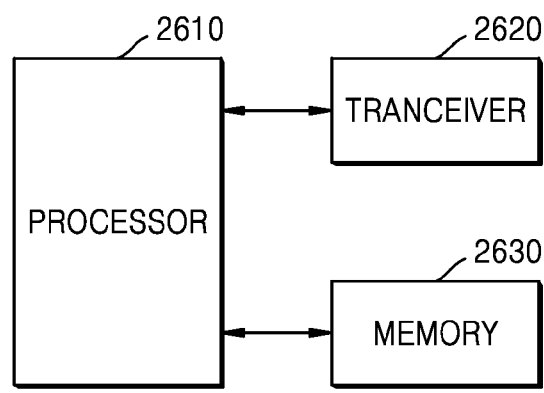
[Fig. 27]
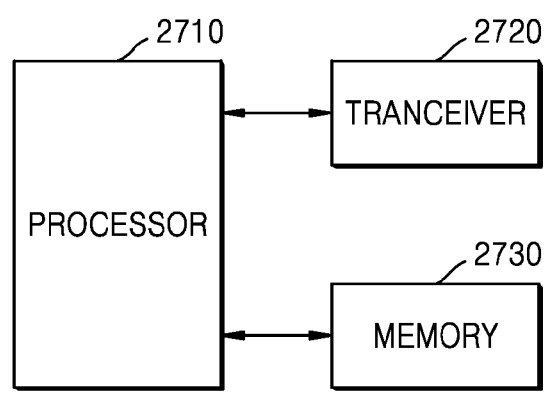

RADIO ACCESS NETWORK HANDOVER METHOD, BASE STATION, AND COMMUNICATION METHOD OF THE BASE STATION

TECHNICAL FIELD

The present disclosure overall relates to a radio communication field, and more particular, to a radio access network handover method, a base station and a communication method of the base station.

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

DISCLOSURE OF INVENTION

Solution to Problem

According to an aspect of the present disclosure, a radio access network handover method of a base station in a 5G radio access network (5G-RAN) is provided, the method comprising: determining handing over a user equipment (UE) to an Evolved Universal Terrestrial Radio Access Network (E-UTRAN); transmitting a handover requirement message to an Access and Mobility Management Function (AMF); receiving a handover command message from the AMF and transmitting the handover command message to the UE, the handover message such that the UE is handed over from the 5G-RAN to the E-UTRAN; and performing indirect data forwarding to a base station in the E-UTRAN.

Advantageous Effects of Invention

According to the radio access network handover method of the present disclosure, it may be effective to avoid data loss, and guarantee continuity of communication service.

BRIEF DESCRIPTION OF DRAWINGS

FIG. 1 is a system architecture diagram of a System Architecture Evolution (SAE).

FIG. 2 is a diagram illustrating an initial overall architecture of 5G.

FIG. 3 is a diagram illustrating a radio network handover method according to an exemplary embodiment of the present disclosure.

FIG. 4 is a diagram illustrating a radio access network handover method according to another exemplary embodiment of the present disclosure.

FIG. 5 is a diagram illustrating a radio access network handover method according to another exemplary embodiment of the present disclosure.

FIG. 6 is a diagram illustrating a radio access network handover method according to another exemplary embodiment of the present disclosure.

FIG. 7 is a diagram illustrating a radio access network handover method according to another exemplary embodiment of the present disclosure.

FIG. 8 is a diagram illustrating a radio access network handover method according to another exemplary embodiment of the present disclosure.

FIG. 9 is a flow chart illustrating a radio access network handover method according to an exemplary embodiment of the present disclosure.

FIG. 10 is a flow chart illustrating a radio access network handover method according to an exemplary embodiment of the present disclosure.

FIG. 11 is a block diagram illustrating a system for performing radio access network handover according to an exemplary embodiment of the present disclosure.

FIG. 12 is a block diagram illustrating another system for performing radio access network handover according to an exemplary embodiment of the present disclosure.

FIG. 13 is a flow chart illustrating a radio access network handover method according to another exemplary embodiment of the present disclosure.

FIG. 14 is a flow chart illustrating a radio access network handover method according to another exemplary embodiment of the present disclosure.

FIG. 15 is a block diagram illustrating a system for performing radio access network handover according to another exemplary embodiment of the present disclosure.

FIG. 16 is a block diagram illustrating a system for performing radio access network handover according to another exemplary embodiment of the present disclosure.

FIG. 17 is a block diagram illustrating a base station for performing a radio access network handover method according to an exemplary embodiment of the present disclosure.

FIG. 18 is a flow chart illustrating a communication method performed by the base station shown in FIG. 17 according to an exemplary embodiment of the present disclosure.

FIG. 19 is a block diagram illustrating a base station for performing a radio access network handover method according to another exemplary embodiment of the present disclosure.

FIG. 20 is a flow chart illustrating a communication method performed by the base station shown in FIG. 19 according to an exemplary embodiment of the present disclosure.

FIG. 21 is a block diagram illustrating a UE according to an exemplary embodiment of the present disclosure.

FIG. 22 is a flow chart illustrating a communication method performed by the UE shown in FIG. 21 according to an exemplary embodiment of the present disclosure.

FIG. 23 is a diagram illustrating a radio access network handover method according to another exemplary embodiment of the present disclosure.

FIG. 24 is a diagram illustrating a radio access network handover method according to another exemplary embodiment of the present disclosure.

FIG. 25 is a diagram illustrating a radio access network handover method according to another exemplary embodiment of the present disclosure.

FIG. 26 is a block diagram illustrating a base station according to another exemplary embodiment of the present disclosure.

FIG. 27 is a block diagram illustrating a UE according to another exemplary embodiment of the present disclosure.

BEST MODE FOR CARRYING OUT THE INVENTION

According to an aspect of the present disclosure, a radio access network handover method of a base station in a 5G radio access network (5G-RAN) is provided, the method comprising: determining handing over a user equipment (UE) to an Evolved Universal Terrestrial Radio Access Network (E-UTRAN); transmitting a handover requirement message to an Access and Mobility Management Function (AMF); receiving a handover command message from the AMF and transmitting the handover command message to the UE, the handover message such that the UE is handed over from the 5G-RAN to the E-UTRAN; and performing indirect data forwarding to a base station in the E-UTRAN.

Preferably, the handover requirement message may include a target eNB ID and a source-to-target transparent container.

Preferably, the method may further comprise: receiving at least one of a PDU session resource establishment request message and an initial context establishment request message including Evolved Radio Access Bearer (E-RAB) ID to which a Quality of Service flow (QoS flow) is mapped from the AMF; and including E-RAB ID proposed for data forwarding in the source-to-target transparent container.

Preferably, the method may further comprise: notifying the AMF a type of the handover, wherein the type of the handover may include at least one of NR to LTE-5G core, NR to LTE-EPC, and intra NR.

Preferably, the handover command message may comprise a target-to-source transparent container, tunnel information for data forwarding and Qos flow for data forwarding.

Preferably, the performing indirect data forwarding may comprise: forwarding data of each QoS flow to an anchor User Plane Function (UPF) through a user plane tunnel allocated to Protocol Data Unit (PDU) session based on the tunnel information.

Preferably, the tunnel information may correspond to each PDU session.

According to an aspect of the present disclosure, a radio access network handover method of a user equipment (UE) in a 5G radio access network (5G-RAN) is provided, the method comprising: receiving Evolved Packet System (EPS) bearer ID to which a Quality of Service flow (QoS flow) is mapped from a base station in a 5G radio access network (5G-RAN); receiving a handover command message from the base station in the 5G-RAN, the handover message including QoS flow for Data Forwarding; correlating ongoing QoS flow with the EPS bearer ID.

Preferably, the EPS ID may allocated by a AMF.

According to an aspect of the present disclosure, a radio access network handover method of an Access and Mobility Management Function (AMF) in a 5G core network is provided, the method comprising: receiving a handover requirement message from a base station in a 5G-RAN; transmitting a relocation request message to a mobile management entity (MME) in Evolved Packet Core (EPC); receiving a relocation response message from the MME; and transmitting a handover command message to the base station in the 5G-RAN.

Preferably, the method may further comprise: allocating EPS Bearer ID to which a QoS flow is mapped; and transmitting the EPS Bearer ID to a Session Management Function (SMF) and a UE.

Preferably, the method may further comprise: receiving a type of the handover from the base station in the 5G-RAN; and transmitting a session management (SM) context request message to the SMF when the type of the handover is handover to E-UTRAN.

Preferably, the SM context may include a mapped EPS bearer context.

Preferably, the relocation response message may include a tunnel information for data forwarding.

Preferably, the method may further comprise: transmitting a request message of creating an indirect data forwarding tunnel to a SMF; and receiving a a response message of creating an indirect data forwarding tunnel from the SMF.

Preferably, the request message may include the tunnel information for data forwarding.

Preferably, the response message may include tunnel information for the data forwarding between the base station in the 5G-RAN and the anchor UPF.

Preferably, the tunnel information for data forwarding may corresponds to each PDU session.

According to an aspect of the present disclosure, a base station in a 5G radio access network (5G-RAN) is provided, the base station comprising: a transceiver; at least one memory storing instructions; at least one processor configured to execute the stored instructions to: determining handing over a UE to an E-UTRAN; transmitting a handover requirement message to an AMF; receiving a handover command message from the AMF and transmitting the handover command message to the UE, the handover message such that the UE is handed over from the 5G-RAN to the E-UTRAN; and performing indirect data forwarding to a base station in the E-UTRAN.

According to an aspect of the present disclosure, a UE in a 5G radio access network (5G-RAN) is provided, the UE comprising: a transceiver; at least one memory storing instructions; at least one processor configured to execute the stored instructions to: receiving EPS bearer ID to which a QoS flow is mapped from a base station in a 5G-RAN; receiving a handover command message from the base station in the 5G-RAN, the handover message including QoS flow for Data Forwarding; correlating ongoing QoS flow with the EPS bearer ID; and transmitting a handover completion message to the E-UTRAN.

According to an aspect of the present disclosure, a radio access network handover method is provided, the method comprising: a base station in an E-UTRAN making a decision of handing over a UE to a 5G-RAN, and transmitting a handover required message to a MME, wherein the message includes identification of a 5G-RAN node, and the message further includes identification information indicating a 5GC CP to which a target 5G-RAN node is connected; the MME transmitting a relocation request message to the 5GC CP and receiving a relocation response message from the 5GC CP; the MME transmitting a handover command message to the base station in the E-UTRAN; and the base station in the E-UTRAN transmitting a handover command message to the UE such that the UE is handed over from the E-UTRAN to the 5G-RAN, wherein the base station in the E-UTRAN performs direct data forwarding or indirect data forwarding with a base station in the 5G-RAN in a process that the UE is handed over from the E-UTRAN to the 5G-RAN.

According to an aspect of the present disclosure, a radio access network handover method is provided, the method comprising: a 5GC CP receiving a relocation request message from a MME, wherein the relocation request message includes EPS UE context, and the relocation request message further includes identification of a target 5G-RAN node; the 5GC CP converting the received EPS UE context into a 5GS UE context, and transmitting a session request message to and receiving a session response from an anchor UPF, wherein the anchor UPF is a 5GC UPF performing an anchor function for a PDU session of the UE; the 5GC CP transmitting a handover request message to a base station in a 5G-RAN, and transmitting a relocation response message to the MME after receiving a handover request confirmation message from the base station in the 5G-RAN, wherein a base station in the E-UTRAN performs direct data forwarding or indirect data forwarding with the base station in the 5G-RAN in a process that the UE is handed over from the E-UTRAN to the 5G-RAN.

According to an aspect of the present disclosure, a system for performing radio access network handover is provided, the system comprising: a base station in an E-UTRAN configured to make a decision of handing over a UE to a 5G-RAN, transmit a handover required message to a MME, and transmit a handover command message to the UE connected to the E-UTRAN such that the UE is handed over from the E-UTRAN to the 5G-RAN, wherein the handover required message includes identification of a target 5G-RAN node and identification information indicating a 5GC CP to which a target 5G-RAN node is connected; the MME configured to receive the handover required message from the base station in the E-UTRAN, transmit a relocation request message to and receive a relocation response message from the 5GC CP, and transmit a handover command message to the base station in the E-UTRAN, wherein the base station in the E-UTRAN performs direct data forwarding or indirect data forwarding with a base station in the 5G-RAN in a process that the UE is handed over from the E-UTRAN to the 5G-RAN.

According to an aspect of the present disclosure, a system for performing radio access network handover is provided, the system comprising: a base station in a 5G-RAN configured to receive a handover request message for handing over a UE connected to an E-UTRAN from the E-UTRAN to the 5G-RAN, and transmit a handover request confirmation message to a 5GC CP; the 5GC CP configured to: receive a relocation request message from a MME, wherein the relocation request message includes an EPS UE context and identification of a target 5G-RAN node; convert the received EPS UE context into a 5GS UE context, and transmit a session request message to and receive a session response from an anchor UPF, wherein the anchor UPF is a 5GC UPF servicing the UE and performs a function of an anchor of user planes in an inter-RAT handover process; and transmit the handover request message to the base station in the 5G-RAN, and transmit a relocation response message to the MME after receiving a handover request confirmation message from the base station in the 5G-RAN, wherein a base station in the E-UTRAN performs direct data forwarding or indirect data forwarding with the base station in the 5G-RAN in a process that the UE is handed over from the E-UTRAN to the 5G-RAN.

According to an aspect of the present disclosure, a radio access network handover method is provided, the method comprising: a base station in a 5G-RAN making a decision of handing over a UE to an E-UTRAN, and transmitting a handover required message to a 5GC CP, and the 5GC CP transmitting a relocation request message to and receiving a relocation response message from a MME; the 5GC CP transmitting a handover command message to the base station in the 5G-RAN; and the base station in the 5G-RAN transmitting a handover command message to the UE such that the UE is handed over from the 5G-RAN to the E-UTRAN, wherein the base station in the 5G-RAN performs direct data forwarding or indirect data forwarding with a base station in the E-UTRAN in a process that the UE is handed over from the 5G-RAN to the E-UTRAN.

The 5GC CP may determine whether the direct data forwarding or the indirect data forwarding is performed between the base station in the 5G-RAN and the base station in the E-UTRAN, wherein the 5GC CP determines whether the direct data forwarding or the indirect data forwarding is performed according to whether information about direct data forwarding being available is received from the base station in the 5G-RAN, and notifies a result of whether the direct data forwarding or the indirect data forwarding to the MME. Or, the 5GC CP may transmit information indicating whether the direct data forwarding is available received from the 5G-RAN to the MME such that the MME determines whether the direct data forwarding or the indirect data forwarding is performed.

If it is determined that the indirect data forwarding is performed between the base station in the 5G-RAN and the base station in the E-UTRAN in the process that the UE is handed over from the 5G-RAN to the E-UTRAN, the relocation response message includes information for data forwarding between a service gateway (SGW) and an anchor user plane function (UPF) allocated by the SGW of the E-UTRAN, wherein the information for the data forwarding between the SGW and the anchor UPF includes identification of a protocol data unit (PDU) session and/or information of an Evolved Radio Access Bearer (E-RAB) included in the PDU session, and wherein the anchor UPF is a 5G core network user plane function (5GC UPF) serving the UE and performs a function of an anchor of user planes in an interradio access technologies (inter-RAT) handover process; and the handover command message includes a target-to-source transparent container and tunnel information for data forwarding allocated by the 5GC UPF or the anchor UPF.

If it is determined that the indirect data forwarding is performed between the base station in the 5G-RAN and the base station in the E-UTRAN in the process that the UE is handed over from the 5G-RAN to the E-UTRAN, the method may further include:

the 5GC CP transmitting a request message of creating a forwarding tunnel to the anchor UPF to request the anchor UPF to create a data forwarding tunnel, wherein the request message of creating the forwarding tunnel includes identification of a PDU session or PDU sessions and/or information of an E-RAB or E-RABs included in the PDU session or the PDU sessions and correspondence relationship between a quality of service (Qos) flow or Qos flows and the E-RAB or the E-RABs in the PDU session or the PDU sessions, or the request message of creating the forwarding tunnel includes tunnel information for data forwarding of each PDU session; and the 5GC CP receiving the tunnel information for data forwarding allocated by the anchor UPF from the anchor UPF.

The method may further include: if there is another 5GC UPF between the anchor UPF and the 5G-RAN, the 5GC CP requesting the 5GC UPF to create the data forwarding tunnel.

If it is determined that the indirect data forwarding is performed between the base station in the 5G-RAN and the base station in the E-UTRAN in the process that the UE is handed over from the 5G-RAN to the E-UTRAN, the indirect data forwarding is performed by one of two means of:

the anchor UPF forwarding data to the SGW through the corresponding tunnel for each Evolved Packet System (EPS) bearer that requires data forwarding, and then the SGW forwarding the data to the base station in the E-UTRAN according to a session transmitting method in the EPS; or the anchor UPF transmitting data received from the tunnel corresponding to a PDU session to the SGW through one tunnel, the SGW performing mapping from the PDU session to the EPS bearer and/or mapping from the Qos flow to the EPS bearer in the PDU session and transmitting the data to the base station in the E-UTRAN through the corresponding EPS bearer.

The method may further include: the 5GC CP receiving a bearer modification request message from the SGW, requesting the anchor UPF to perform a session modification and transmitting a bearer modification response message to the SGW, wherein the bearer modification response message includes tunnel information for uplink data transmission between the SGW and the anchor UPF allocated by the anchor UPF.

If it is determined that the direct data forwarding is performed between the base station in the 5G-RAN and the base station in the E-UTRAN in the process that the UE is handed over from the 5G-RAN to the E-UTRAN, the relocation response message may include information of a Qos flow in a PDU session and information of E-RAB to which the Qos flow is mapped in the EPS, wherein the information of the Qos flow includes flow identification and/or Qos information corresponding to the flow; and the handover command message may include one or more of:

a target-to-source transparent container;

information of a PDU session or PDU sessions accepted by the E-UTRAN, wherein the information of the PDU session includes identification of the PDU session, information of a Qos flow or Qos flows accepted by the PDU session, and information of an unaccepted PDU flow or PDU flows; and a list of information of an established PDU session or PDU sessions unaccepted by the E-UTRAN, wherein the list of the information of the PDU session includes identification of the PDU session and the reason for being unaccepted.

the information of the PDU session may further include tunnel information for direct data forwarding allocated to each E-RAB that requires data forwarding in the PDU session.

In the process that the UE is handed over from the 5G-RAN to the E-UTRAN, the base station in the 5G-RAN directly forwards data to the base station in the E-UTRAN, wherein the data belongs to the same PDU session is forwarded through one tunnel.

In the process that the UE is handed over from the 5G-RAN to the E-UTRAN, the base station in the 5G-RAN directly forwards data to the base station in the E-UTRAN, wherein the base station in the 5G-RAN forwards the data of the same PDU session to the base station in the E-UTRAN through the tunnels allocated to different E-RABs.

The handover required message may include identification of a target base station, a source-to-target transparent container, and identification information indicating the MME to which the target base station is connected, wherein the identification information is tracking area identification or MME identification.

According to an aspect of the present disclosure, a radio access network handover method is provided, the method comprising: a MME receiving a relocation request message from a 5GC CP, wherein the relocation request message includes a 5GS UE context; the MME converting the received 5GS UE context into an Evolved Packet System (EPS) UE context, and transmitting a session creation request to and receiving a session creation response from an service gateway (SGW) of an Evolved Universal Terrestrial Radio Access Network (E-UTRAN); and the MME transmitting a handover request message to a base station in the E-UTRAN, and transmitting a relocation response message to the 5GC UPF after receiving a handover request confirmation message from the base station in the E-UTRAN, wherein a base station in the 5G-RAN performs direct data forwarding or indirect data forwarding with the base station in the E-UTRAN in a process that the UE is handed over from the E-UTRAN to the 5G-RAN.

According to an aspect of the present disclosure, a system for performing radio access network handover is provided, the system comprising: a base station in a 5G-RAN configured to make a decision of handing over a UE to an E-UTRAN, transmit a handover required message to a 5GC CP, and transmit a handover command message to the UE connected to the 5G-RAN such that the UE is handed over from the 5G-RAN to the E-UTRAN; the 5GC CP configured to transmit a relocation request message to and receive a relocation response message from a MME, and transmit a handover command message to a base station in the 5G-RAN, wherein the base station in the 5G-RAN performs direct data forwarding or indirect data forwarding with a base station in the E-UTRAN in a process that the UE is handed over from the 5G-RAN to the E-UTRAN.

According to an aspect of the present disclosure, a system for performing radio access network handover is provided, the system comprising: a base station in an E-UTRAN configured to receive a handover request message from and transmit a handover request confirmation message to a MME; the MME configured to: receive a relocation request message from a 5GC CP, wherein the relocation request message includes a 5GS UE context; convert the received 5GS UE context into an EPS UE context, and transmit a session creation request to and receiving a session creation response from an SGW of the E-UTRAN; and transmit the handover request message to a base station in the E-UTRAN, and transmit a relocation response message to the 5GC CP after the MME receives the handover request confirmation message from the base station in the E-UTRAN, wherein the base station in the E-UTRAN receives the data forwarded by a base station in the 5G-RAN through direct forward or indirect forward from the base station in the 5G-RAN in a process that the UE is handed over from the 5G-RAN to the E-UTRAN.

According to another aspect of the present disclosure, a UE is provided, the UE comprising: a receiving unit configured to receive a handover command message for handing over the UE from a first radio access network to a second radio access network from a first base station, or receive a handover command message for handing over the UE from the second radio access network to the first radio access network from a second base station; a handover unit configured to hand over the UE from the first radio access network to the second radio access network according to the handover command message received from the first base station, or handover the UE from the second radio access network to the first radio access network according to the handover command message received from the second base station; and a transmission unit configured to transmit a handover completion message to the first base station after the UE is handed over from the first radio access network to the second radio access network, or transmit a handover completion message to the second base station after the UE is handed over from the second radio access network to the first radio access network.

According to another aspect of the present disclosure, a communication method of a UE is provided, the method comprising: receiving a handover command message for handing over the UE from a first radio access network to a second radio access network from a first base station, or receiving a handover command message for handing over the UE from the second radio access network to the first radio access network from a second base station; handing over the UE from the first radio access network to the second radio access network according to the handover command message received from the first base station, or handing over the UE from the second radio access network to the first radio access network according to the handover command message received from the second base station; and transmitting a handover completion message to the first base station after the UE is handed over from the first radio access network to the second radio access network, or transmitting a handover completion message to the second base station after the UE is handed over from the second radio access network to the first radio access network.

According to another aspect of the present disclosure, a base station is provided, wherein the based station is located in a first radio access network, the base station comprising: a determination unit configured to make a decision of handing over a UE connected to the base station from the first radio access network to a second radio access network; a transmission unit configured to transmit a handover required message for requesting for handing over the UE from the first radio access network to the second radio access network to a MME, and transmit a handover command message to the UE such that the UE is handed over from the first radio access network to the second radio access network; and a receiving unit configured to receive a handover command message from the MME, wherein the base station forwards data to a base station in the second radio access network in a process that the UE is handed over from the first radio access network to the second radio access network.

According to another aspect of the present disclosure, a communication method of a base station is provided, wherein the based station is located in a first radio access network, the method comprising making a decision of handing over a UE connected to the base station from the first radio access network to a second radio access network; transmitting a handover required message for requesting for handing over the UE from the first radio access network to the second radio access network to a MME; and receiving a handover command message from the MME, and transmitting a handover command message to the UE such that the UE is handed over from the first radio access network to the second radio access network, wherein the base station forwards data to a base station in the second radio access network in a process that the UE is handed over from the first radio access network to the second radio access network.

According to another aspect of the present disclosure, a base station is provided, wherein the based station is located in a second radio access network, the base station comprising: a determination unit configured to make a decision of handing over a UE connected to the base station from the second radio access network to a first radio access network; a transmission unit configured to transmit a handover required message for requesting for handing over the UE from the second radio access network to the first radio access network to a second core network control plane corresponding to the second radio access network, and transmit a handover command message to the UE such that the UE is handed over from the second radio access network to the first radio access network; and a receiving unit configured to receive a handover command message from the second core network control plane, wherein the base station forwards data to a base station in the first radio access network in a process that the UE is handed over from the second radio access network to the first radio access network.

According to another aspect of the present disclosure, a communication method of a base station is provided, wherein the based station is located in a second radio access network, the communication method comprising making a decision of handing over a UE connected to the base station from the second radio access network to a first radio access network; transmitting a handover required message for requesting for handing over the UE from the second radio access network to the first radio access network to a second core network control plane corresponding to the second radio access network, receiving a handover command message from the second core network control plane, and transmitting a handover command message to the UE such that the UE is handed over from the second radio access network to the first radio access network, wherein the base station forwards data to a base station in the first radio access network in a process that the UE is handed over from the second radio access network to the first radio access network.

MODE FOR THE INVENTION

The exemplary embodiments of the present disclosure are described in details. Examples of the embodiments are shown in the drawings, wherein the same reference sign refers to the same part. Below, the exemplary embodiments of the present disclosure will be described in details with reference to the drawings so as to explain the present disclosure.

Modern mobile communication increasingly intends to provide multimedia service of high rate transmission to users.

FIG. 1 illustrates a system architecture diagram of a System Architecture Evolution (SAE).

A User Equipment (UE) 101 is a terminal equipment for receiving data. An Evolved Universal Terrestrial Radio Access Network (E-UTRAN) 102 is a radio access network including an eNodeB/NodeB for providing an interface for accessing a radio network to the UE. A Mobile Management Entity (MME) 103 is responsible for managing a mobile context, a session context and security information of the UE. A Service Gateway (SGW) 104 mainly provides a function of a User Plane (UP). The MME 103 and the SGW 104 may be located in the same physical entity. A PGW 105 is responsible for functions of billing, lawful interception and so on, and may be in the same physical entity as the SGW 104. A Policy and Charging Rules Function (PCRF) entity 106 provides a Quality of Service (QoS) policy and charging rules. A Serving General Packet Radio Service Support Node (SGSN) 108 is a network node apparatus for providing routing for data transmission in a Universal Mobile Telecommunications System (UMTS). A Home Subscriber Server (HSS) 109 is a home subscriber subsystem of the UE, and is responsible for protecting user information including a current location of the UE, an address of a service node, user security information, a packet context of the UE and the like.

FIG. 2 is a diagram illustrating an initial overall architecture of 5G.

An initial overall architecture of 5G as illustrated FIG. 2 includes a Next Generation (NG) UE, an NG Access Network or NG Radio access network (NG-(R)AN), an NG Core Network (NGC) and a data network. The NGC includes a function of an NGC Control Plane (NGC CP) and a function of an NGC User Plane (NGC UP). The NGC CP further includes an Access and Mobility Management Function (AMF) associated with access control and mobile management, a Session Management Function (SMF). The detailed description is omitted here. A control panel interface between the NG(R)AN and the NGC is NG2, and a user plane interface therebetween is NG3. The names of these interfaces are only temporary names, and the main content of the present disclosure would not be affected even if the 3GPP finally decides to use other names. The NG-(R)AN may be called as 5G radio access network (5G-RAN) or other names, the NGC may be called as 5G-CN or 5GC or other names, the NGC CP is called as NGC CPF, 5GC CP, 5GC CPF or other names, and the NG UP is called as NGC UPF, 5GC UP, 5G UPF or other names. These names all depend on the final decision of the 3GPP without affecting the main content of the present disclosure. A base station entity in the NG-RAN is referred to as gNB in the present disclosure.

There is a scene of coexistence of LTE and 5G network in a next generation network deployment. When the UE moves at a border between the E-UTRAN and the 5G-RAN, a technology of inter-radio access technologies (inter-RAT) handover is required in order to guarantee service continuity. At present, there is no detailed discussion on how to apply a conventional inter-RAT handover process to the handover between the E-UTRAN and the 5G-RAN, and especially, there is no specific solution on how to perform data forwarding in the inter-RAT handover process between the E-UTRAN and the 5G-RAN. The handover here may also be referred to as a handover between the EPS and the NGS or the 5GS.

The architecture of 5G is different from the architecture of LTE. In addition, a data bearing method in 5G is also different from that of a LTE system. Each Packet Data Unit (PDU) session is divided into a plurality of bearers according to different QoS levels in LTE, and each of the bearers has one-to-one correspondence relationship at different interfaces. The data for one PDU session is transmitted using one tunnel at a network side in the 5G system, and the data received from the same tunnel at the network side is mapped to different Data Radio Bearers (DRB) at an air interface for transmission. These differences bring challenges for the handover process between different systems. However, how to perform data forwarding between different systems is a problem that is not solved currently.

FIG. 3 is a diagram illustrating a radio network handover method according to an exemplary embodiment of the present disclosure.

The method is used to support indirect data forwarding during a process of handing over from an EPS to an NGS or a 5GS. The method describes a method for downlink data forwarding and a method for uplink data forwarding simultaneously. In the practical application, it is possible to only perform the downlink data forwarding without performing the uplink data forwarding. Regarding this case, the method for the uplink data forwarding may be omitted. The method includes the following steps:

Step 301, an E-UTRAN decides to hand over a UE to a 5G-RAN.

Here, the E-UTRAN may be an eNB connected to an EPC. The 5G-RAN may be a gNB, an eNB connected to a 5GC or a centralized unit (CU) in a gNB.

A user plane path before the handover is anchor UPF, SGW and E-UTRAN. The SGW is required to support an interface with the anchor UPF. The anchor UPF may be in an NGC or EPC or a common entity. The anchor UPF may be a 5GC UPF serving the UE and performs a function of an anchor of user planes in an inter-RAT handover process. The anchor UPF may be a function of a PGW user plane plus the 5GC UPF or a function of the 5GC UPF plus the PGW user plane and performs a function of an anchor of user planes in the inter-RAT handover process.

There are one or more ongoing PDU sessions for the UE. Each of the PDU session includes one or more EPS bearers. In a process that a PDU session or an EPS bearer is established, Qos information and/or Qos flow identification of the mapped Qos flow and/or identification of the PDU session (PDU session identification) is/are allocated to the EPS bearer. Default EPS bearers are mapped to non-Guaranteed Business Rate (non-GBR) Qos flows. The Qos information and/or Qos flow identification of the Qos flow to which EPS bearer is mapped is allocated, by a function of a PCC (Policy Control and Charging) or PGW control plane function. In a process that a PDN connection or a PDU session is established, the UE allocates identification of a PDU session and sends it to a MME, and the MME transmits the identification of the PDU session allocated by the UE to the PGW(PGW control plane function and/or PGW user plane function) through the SGW. In order to support the inter-system handover, the function of the PGW control plane may have an SMF function thereon. In a scene that a PCC is deployed, a Policy and Charging Rules Function (PCRF) provides a Qos and/or Qos flow identification of a Qos flow to which the EPS bearer is mapped to the SMF. In order to support the inter-system handover, the PCRF further includes a policy control function (PCF) thereon. The MME transmits the Qos of the Qos flow and/or the Qos flow identification to which the EPS bearer is mapped and/or the identification of the PDU session to the UE, for example, a message of establishing a PDU session is transmitted to the UE through a non-access stratum message. The MME gets the Qos of the Qos flow and/or the Qos flow identification and/or the PDU session identification, to which the EPS bearer is mapped, from the SMF (PGW control plane function). The MME or the SMF transmits the mapped Qos flow identification and PDU session ID of the EPS bearer to the PGW user plane function. In the process that the PDU session or the EPS bearer is established, the MME may transmit the Qos of the Qos flow and/or the Qos flow identification and/or the PDU session identification, to which the EPS bearer is mapped, to the E-UTRAN. The E-UTRAN may transmit the mapping information to the UE through a Radio Resource Control (RRC) message. An E-RAB and an EPS bearer are the same or correspond to each other. It is called as an EPS bearer in a core network, and called as an E-RAB in an access network. Identification of an E-RAB (E-RAB identification) and identification of an EPS bearer (EPS bearer identification) are the same or correspond to each other. It is identification of an EPS bearer in a core network, and identification of an E-RAB in an access network.

Step 302, the E-UTRAN transmits a handover required message to the MME. The message includes identification of a target 5G-RAN node, and a source-to-target transparent container. The source-to-target transparent container is encoded according to a target system. If it is handed over to the 5G-RAN, the source-to-target transparent container is a source 5G-RAN to a target 5G-RAN transparent container or a source 5G-RAN node to a target 5G-RAN node transparent container. The E-UTRAN proposes downlink data forwarding. The E-UTRAN may propose the downlink data forwarding per PDU session or per Qos flow. The E-UTRAN proposes the downlink data forwarding according to the PDU session to which an EPS bearer belongs and/or the information of the Qos flow to which the EPS bearer is mapped received from the MME. The E-UTRAN includes identification of the PDU session and the downlink data forwarding in a source to target base station transparent container. Or, the E-UTRAN includes identification of the PDU session, identification of a Qos flow in the PDU session and the downlink data forwarding information in a source to target base station transparent container. According to the identification of the Qos flow and the identification of the PDU session to which the E-RAB is mapped obtained from the core network by the E-UTRAN in the process that the PDU session or the PDN connection is established or the GBR EPS bearer is established, the E-UTRAN includes a list of information of the PDU session or PDU sessions in a source 5G-RAN to a target 5G-RAN transparent container. The information of the PDU session includes PDU session identification, downlink data forwarding and information of a Qos flow or Qos flows of the PDU session. The information of the Qos flow includes identification of the Qos flow, and/or downlink data forwarding for the Qos flow proposed by a source base station. The source 5G-RAN to a target 5G-RAN transparent container further includes a RRC container. Content in the RRC container is organized according to handover preparation of the 5G-RAN. If a target cell is an LTE cell, the RRC container is organized according to the handover preparation in the LTE. If a target cell is an NR cell, the RRC container is organized according to the handover preparation in the NR.

The message further includes identification information indicating a 5GC CP to which the target 5G-RAN node is connected. The identification information may be tracking area identification, a network slicing identification, 5GC CP pool identification, or 5GC CP identification.

The message includes a type of the handover. The type of the handover includes an intraLTE handover, a handover from LTE to NR and so on. The handover from LTE to NR may further include a handover from an LTE base station connected to EPC to NR or a handover from an LTE base station connected to 5GC to NR, because an LTE base station may support an interface with the 5GC, or may not support the interface with the 5GC.

The 5GC CP as stated in the Description of the Related Art may be further divided into an AMF function entity and an SMF function entity. An interface of the 5G-RAN with the 5GC CP is an interface with the AMF, thus, the described messages or procedures of the interface of the 5G-RAN with the 5GC CP are messages or procedures between the 5G-RAN and the AMF. An interface of the 5GC CP with the MME is an interface of the AMF with the MME, thus, the described messages or procedures of the interface of the 5GC CP and the MME are messages or procedures between the AMF and the MME. In order to support the inter-system handover, the SMF may further include a function of PGW control plane. Identification information of the 5GC CP is identification information of the AMF. An interface of the 5GC CP with an anchor UPF is an interface of the SMF with the anchor UPF, thus, the described messages or procedures of the interface of the 5GC CP with the anchor UPF are messages or procedures between the SMF and the anchor UPF; and the AMF transmits messages to the SMF, and the SMF communicates with the anchor UPF. Similarly, an interface of the 5GC CP with the 5GC UPF is an interface of the SMF with the 5GC UPF; and the AMF transmit messages to the SMF, and the SMF and the 5GC UPF communicate with each other, wherein the 5GC UPF may be called as UPF.

Step 303, the MME transmits a relocation request message to the 5GC CP. Here, the 5GC CP is an AMF in the 5GC CP. The MME selects and finds out the 5GC CP according to the identification information indicating the 5GC CP to which the target 5G-RAN node is connected included in the handover required message. The message includes identification of a target 5G-RAN node, a source-to-target transparent container, and EPS UE context information. The EPS UE context information includes EPS Mobile Management (MM) context information of the UE and a session management (SM) context. The message includes a type of the handover. The type of the handover includes an intraLTE handover, a handover from LTE to NR and so on. The handover from LTE to NR may further include a handover from an LTE base station connected to EPC to NR or a handover from an LTE base station connected to 5GC to NR, because an LTE base station may support an interface with the 5GC, or may not support the interface with the 5GC.

The MME or 5GC CP determines whether data forwarding is possible. The data forwarding here refers to indirect data forwarding. If the MME determines that the indirect data forwarding is unavailable, the MME notifies this information to the 5GC CP.

Step 304, the 5GC CP converts the received EPS UE context into a 5GS UE context.

As for the 5GC CP including the AMF and SMF function entities, the AMF transmits a SM context request message to the SMF. According to the received information in the relocation request message e.g. handover type, the AMF knows that the handover is the inter-system handover, and requests the SMF to provide the SM context. The AMF transmits the message to each SMF that serves the UE. The each SMF transmits a SM context response message to the AMF. The message includes a SM context of the UE. The SM context further includes a mapping relationship of the Qos flow and the E-RAB in the PDU session. If the SMF has a mapped EPS bearer context when the AMF requests the SM context, the SMF always returns the mapped EPS bearer context to the AMF. Or, the SMF transmits the mapped EPS bearer context to the AMF when the AMF requests the mapped EPS context.

The 5GS UE context includes Qos information in the 5GS. The Qos information in the 5GS includes Qos rules and/or Qos profile. The 5GC CP may map the EPS QoS information into 5G Qos information, or the 5GC CP interacts with a 5G-PCF to get the 5G Qos information.

Step 305, the 5GC CP may determine whether another 5GC UPF needs to be selected in addition to the anchor UPF. The 5GC CP transmits a session request message to the anchor UPF.

The AMF selects the SMF that serves the UE. The AMF transmits a SM request message to the SMF. The SMF transmits the session request message to the anchor UPF. The anchor UPF is a 5GC UPF performing an anchor function for the PDU session of the UE. If the anchor UPF does not have the session management context of the UE, the session request message may be a session creation request, and the response message transmitted to the 5GC CP by the anchor UPF is a session creation response. If the anchor UPF has the UE context, the session request message is a session modification request, and the response message transmitted to the 5GC CP by the anchor UPF is a session modification response. The 5GC CP transmits the updated 5G Qos information to the anchor UPF.

The SMF transmits information of the PDU session to the anchor UPF. The information of the PDU session includes identification of the PDU session (PDU session identification), Qos information of the PDU session, an EPS bearer list of the PDU session in the EPS and/or a mapping relationship of the Qos flow and the EPS bearer in the PDU session. The EPS bear list includes EPS bearer identification and/or Qos information of the EPS bearer.

In order to use the same process to not only support the handover between the EPS and the 5GS, but also support intra 5GS system handover, the 5GC CP notifies the anchor UPF of a type of the handover process, for example, whether it is the handover from the EPS to the 5GS or the intra 5GS system handover, and the anchor UPF stores the received information. The 5GC CP may let anchor UPF know whether it is the inter-system handover according to whether the message transmitted to the anchor UPF includes the information of the EPS bearer or the mapping relationship of the Qos flow and the EPS bearer. Regarding the intra 5GS system handover, in Step 311, the anchor UPF allocates a tunnel to each PDU session for downlink data forwarding and transmits it to the 5GC CP. Regarding the handover from the EPS to the 5GS, the anchor UPF allocates a tunnel to each EPS bearer for data forwarding according to the received EPS bearer list of the PDU session in the EPS, and please refer to Step 311 for details.

Step 306, the anchor UPF allocates uplink tunnel information for the PDU session in the 5GS. The anchor UPF transmits a session response message to the 5GC CP. The session response message may be a session establishment response or a session modification response. The session response message includes the uplink tunnel information for the PDU session in the 5GS allocated by the anchor UPF. The anchor UPF transmits information of a Qos flow in the PDU session to the 5GC CP. The information of the Qos flow (Qos flow information) includes Qos flow identification and/or Qos information corresponding to the Qos flow. The anchor UPF may notify the 5GC CP of correspondence relationship between the Qos flow in the 5GS and the EPS bearer in the EPS of the PDU session.

The SMF transmits a SM request response message to the AMF after receiving a response message of the anchor UPF. The tunnel information for uplink data transmission is transmitted to the AMF.

Step 307, if the 5GC CP selects another 5GC UPF, the 5GC CP triggers a session establishment process or a session modification process with the 5GC UPF. The 5GC CP transmits the uplink tunnel information allocated by the anchor UPF to the 5GC UPF, and receives uplink tunnel information for a NG3 interface allocated by the 5GC UPF.

Step 308, the 5GC CP transmits a handover request message to the 5G-RAN. The message includes information of a PDU session or PDU sessions to be established. The information of the PDU session includes session identification, session Qos information, Qos flow information, Qos information of a Qos flow, uplink tunnel information of each session, and/or a source-to-target transparent container. The message includes a type of the handover. The type of the handover includes an intraLTE handover, a handover from LTE to NR and so on. The handover from LTE to NR may further include a handover from an LTE base station connected to EPC to NR or a handover from an LTE base station connected to 5GC to NR, because an LTE base station may support an interface with the 5GC, or may not support the interface with the 5GC.

The message may further include a mapping relationship from the Qos flow to the EPS bearer in the PDU session, that is, identification of the EPS bearer to which the Qos flow is mapped and/or the mapped Qos information.

Step 309, the 5G-RAN transmits a handover request confirmation message to the 5GC CPF The message includes one or more kinds of the following information:

a target-to-source transparent container, wherein the target-to-source transparent container may include a mapping relationship from the Qos flow to the EPS bearer in the PDU session, that is, identification of the EPS bearer to which the Qos flow is mapped and/or the mapped Qos information, and the target-to-source transparent container may further include information of the PDU session that is successfully established, and wherein the information of the PDU session includes PDU session identification, a list of identification of the Qos flows that are successfully established in the PDU session;

a list of information of an established PDU session or PDU sessions accepted by the 5G-RAN, wherein the information of the PDU session includes PDU session identification, downlink tunnel information for the PDU session over the NG3 interface, information of a Qos flow or Qos flows accepted by the NG-RAN, information of an unaccepted Qos flow or Qos flows, and tunnel information for data forwarding over the NG3 interface, wherein as for a Qos flow or Qos flows that is/are successfully established in the PDU session, the 5G-RAN may allocate the tunnel information for data forwarding over the NG3 interface for the corresponding PDU session if the 5G-RAN receives the downlink data forwarding proposed by the source base station, and wherein as for a Qos flow or Qos flows that is/are successfully established, the 5G-RAN may allocate the tunnel information for data forwarding over the NG3 interface for the corresponding PDU session if the 5G-RAN receives the downlink data forwarding proposed by the source base station and the data forwarding is possible; and a list of information of a PDU session or PDU sessions unaccepted by the 5G-RAN, wherein the list of the information of the PDU session includes PDU session identification and the reason for being unaccepted.

Step 310 and Step 311 are executed when the data forwarding is applied. The 5GC CP receives information about data forwarding being available from the MME or the 5GC CP decides data forwarding being available.

Step 310, if the tunnel information for data forwarding over NG3 interface is received from the 5G-RAN, and a new 5GC UPF is selected between the anchor UPF and the 5G-RAN, the 5GC CP requests the 5GC UPF to create a data forwarding tunnel. The 5GC CP transmits the tunnel information for data forwarding over the NG3 interface received from the 5G-RAN to the 5GC UPF. The 5GC UPF allocates tunnel information for data forwarding between the 5GC UPF and the anchor UPF and transmits it to the 5GC CP.

Step 311, if the tunnel information for data forwarding over the NG3 interface is received from the 5G-RAN, the 5GC CP requests the anchor UPF to create a data forwarding tunnel. If a new 5GC UPF is selected between the anchor UPF and the 5G-RAN, the 5GC CP transmits the tunnel information for data forwarding allocated by the new 5GC UPF to the anchor UPF. If there is no new 5GC UPF between the anchor UPF and the 5G-RAN, the 5GC CP transmits the tunnel information for data forwarding received from the 5G-RAN to the anchor UPF. For the admitted PDU session by the target 5G-RAN, 5GC CP transmits the Qos flow setup list and Qos flow failed to be setup list to the anchor UPF. 5GC CP transmits the list of PDU session or PDU sessions successfully established in 5G-RAN to the anchor UPF. The PDU session information includes the PDU session identification, DL tunnel info for the PDU session over NG3 interface, accepted Qos flows for the PDU session, non-accepted Qos flows for the PDU session, tunnel information for the PDU session for data forwarding over NG3 interface. 5GC CP sends the EPS bearer(s) that need data forwarding and/or Qos flow(s) that need data forwarding and/or the PDU session(s) that need data forwarding to the anchor UPF. 5GC can know the EPS bearer(s) that need data forwarding according to the mapping of EPS bearer and Qos flow and the PDU session (s) or Qos flow(s) that accepted data forwarding by the target 5G-RAN. The anchor allocates tunnel information for data forwarding between the SGW and the anchor UPF and sends to the 5GC CP.

There are three methods for data forwarding.

Method 1: A data transmission method between the SGW and the anchor UPF is that one tunnel is for each EPS bearer of each PDU session, and the anchor UPF transmits the data belonging to the same PDU session received from the SGW from the data forwarding tunnel(s) corresponding to the EPS bearer(s) to the 5GC UPF or the 5G-RAN through the same tunnel corresponding to the PDU session, that is, the anchor UPF performs mapping from multiple tunnels to one tunnel. As for this data forwarding method, the anchor UPF allocates tunnel information for data forwarding between the SGW and the anchor UPF to each EPS bearer that requires data forwarding in each PDU session. As for each PDU session, the number of the data forwarding tunnels equals to the number of the EPS bearers that need data forwarding. The anchor UPF knows the number of the EPS bearers that require data forwarding included in each PDU session at the EPS side according to the information received from the 5GC CP in the Step 311 or step 305. The anchor UPF transmits the tunnel information for data forwarding allocated to each EPS bearer in the PDU session to the 5GC CP.

Method 2: A data transmission method between the SGW and the anchor UPF is that one tunnel is for each PDU session, and the SGW transmits the data belonging to the same PDU session received from a tunnel corresponding to each EPS bearer to the anchor UPF through the same tunnel. In accordance with this data forward method, the anchor UPF allocates tunnel information for the data forwarding between the SGW and the anchor UPF to each PDU session.

Method 3: A data transmission method between the SGW and the anchor UPF is that one tunnel is for each PDU session, the SGW transmits the data belonging to the same PDU session received from a tunnel corresponding to each E-RAB to the anchor UPF through the same tunnel, and adds information on the Qos and/or flow to a data packet header. In accordance with this data forward method, the anchor UPF allocates tunnel information for the data forwarding between the SGW and the anchor UPF to each PDU session. In Step 306, the anchor UPF transmits the information of the Qos flow to which the PDU session is to be mapped in the 5GS to the 5GC CP. The information of the Qos flow (Qos flow information) includes flow identification and/or Qos information corresponding to the flow. The 5GC CP notifies the MME of the information through Step 312, and the MME notifies the SGW of the information through Step 313. The SGW may include the information on the Qos and/or flow in the data packet header.

The anchor UPF transmits the allocated tunnel information for data forwarding to the 5GC CP.

The messages in the process of the Step 311 and in the process of the Step 310 may be different messages or the same messages.

Step 312, the 5GC CP transmits a relocation response message to the MME. The message includes the tunnel information for data forwarding. The tunnel information is assigned by 5GC. The message includes a target-to-source transparent container. According to the accepted PDU session or PDU sessions and accepted Qos flow or Qos flows received from the target 5G-RAN and the mapping of the Qos flow and EPS bearer, the 5GC CP knows the correspondingly accepted EPS bearers. The message includes a list of EPS bearers to be setup.

Regarding the data forwarding method 3, the message includes the information of the Qos flow to which the PDU session is mapped in the 5GS. The information of the Qos flow includes flow identification and/or Qos information corresponding to the flow.

Step 313, if the MME receives the tunnel information for data forwarding, the MME transmits a request message of creating an indirect data forwarding tunnel to the SGW. The message includes the tunnel information for data forwarding allocated by 5GC.

Regarding the data forwarding method 3, the message includes the anchor transmitting the information of the Qos flow to which the PDU session is to be mapped in the 5GS to the 5GC CP. The information of the Qos flow includes flow identification and/or Qos information corresponding to the flow.

The SGW transmits a response message of creating the indirect data forwarding tunnel to the MME. The message includes the uplink tunnel information allocated by the SGW for data forwarding over the S1 interface.

Step 314, the MME transmits a handover command message to the E-UTRAN. The message includes a target-to-source transparent container, and tunnel information for data forwarding over the S1 interface. The message includes a type of the handover. The type of the handover includes an intra-LTE handover, a handover from LTE to NR and so on. The handover from LTE to NR may further include a handover from an LTE base station connected to EPC to NR or a handover from an LTE base station connected to 5GC to NR, because an LTE base station may support an interface with the 5GC, or may not support the interface with the 5GC.

Step 315, the E-UTRAN transmits a handover command message to the UE.

The message may further include a mapping relationship between the Qos flow and the EPS bearer in the PDU session, that is, identification of PDU session and/or the identification of the Qos flow to which the EPS bearer is mapped and/or the mapped Qos information.

The E-UTRAN forwards data to the SGW. The E-UTRAN forwards data to the SGW through the corresponding tunnel for each E-RAB that requires data forwarding.

The SGW forwards the data to the anchor UPF. The SGW has different actions according to the three data forwarding methods in the Step 311.

Method 1: The SGW forwards the data to the anchor UPF through the corresponding tunnel for each EPS bearer that requires data forwarding.

Method 2: The SGW transmits the data belonging to the same PDU session received from a tunnel corresponding to each EPS bearer to the anchor UPF through the same tunnel. The anchor UPF performs mapping from the PDU session to the Qos flow.

Method 3: The SGW transmits the data belonging to the same PDU session received from a tunnel corresponding to each E-RAB to the anchor UPF through the same tunnel, and adds information on the Qos and/flow to a data packet header. The SGW performs mapping from the PDU session to the Qos flow. The SGW performs the mapping from the PDU session to the Qos flow according to the information received in the Step 313.

The anchor UPF forwards the data to the new 5GC UPF or the 5G-RAN. The anchor UPF has different actions according to the three data forwarding methods described in the Step 311.

Method 1: The anchor UPF transmits the data belonging to the same PDU session received from the SGW from the data forwarding tunnel(s) to corresponding the EPS bearer(s) to the 5GC UPF or the 5G-RAN through the same tunnel corresponding to the PDU session, that is, the anchor UPF performs mapping from multiple tunnels to one tunnel. The anchor UPF forwards the data to the new 5GC UPF or the 5G-RAN according to the session transmitting method in the 5GS, for example, the Qos flows through which each PDU session transmits downlink data, and how a header of the flow is set. As for a Qos flow that is unsuccessfully established or data forwarding is not accepted received in the Step 309, if the UPF receives data forwarded from the SGW, the UPF discards the data. This case happens just because an access control in the 5G-RAN is performed according to the Qos flow level. However, at the E-UTRAN side, the data tunnel is for each E-RAB, and the data forwarding is also in an E-RAB level. A level of the Qos flow is finer than the E-RAB level. The E-UTRAN cannot discriminate data of different Qos flows mapped to the successfully established E-RAB and data forwarding is accepted for that E-RAB, or the E-UTRAN do not know information of the Qos flow that is unsuccessfully established or data forwarding is not accepted but the corresponding E-RAB is successfully established and data forwarding is accepted, thus, the E-UTRAN may forward data of the Qos flow that unsuccessfully established or data forwarding is not accepted to the SGW, and the SGW transmits the data to the UPF.

Method 2: the anchor UPF directly receives the data from the tunnel corresponding to each PDU session of the SGW. The anchor UPF forwards the data to the new 5GC UPF or the 5G-RAN according to the session transmitting method in the 5GS, for example, how many flows through which each PDU session transmits downlink data, and how a header of the flow is set.

Method 3: the anchor UPF directly receives the data that needs to be forwarded in the 5GS from the SGW. The anchor UPF forwards the data to the 5GC UPF or the 5G-RAN.

If the anchor UPF forwards the data to the new 5GC UPF, the new 5GC UPF forwards the received data to the 5G-RAN.

In the process that a PDU session or a PDN connection or an EPS bearer is established, the UE receives the mapped Qos information and/or Qos flow identification of a Qos flow and/or identification of a PDU session, to which the EPS bearer is mapped, from the network. The UE correlates the ongoing EPS bearer with the mapped Qos flow and PDU session included in the handover command message. As for the EPS bearer that does not have the corresponding Qos flow, the UE may delete it.

Or, the UE obtains the mapping relationship from the Qos flow to the EPS bearer in the PDU session from the handover command message. The UE correlates the ongoing EPS bearer with the mapped Qos flow and PDU session included in the handover command message. As for the EPS bearer that does not have the corresponding Qos flow, the UE may delete it.

Step 316, the UE transmits a handover completion message to the 5G-RAN.

Step 317, the 5G-RAN transmits the handover completion message to the 5GC CP. The message includes the tunnel information for downlink data transmission allocated by the 5G-RAN.

Step 318, if another 5GC UPF is selected in the Step 305, the 5GC CP transmits a downlink data transmission tunnel to the 5GC UPF. The 5GC UPF allocates the uplink data tunnel information over the NG3 interface. The 5GC UPF allocates the tunnel information for the downlink data transmission between the 5GC UPF and the anchor UPF. The 5GC UPF transmits the allocated tunnel information for the uplink and downlink data transmission to the 5GC CP.

Step 319, the 5GC CP transmits a session modification request message to the anchor UPF. The 5GC CP transmits the tunnel information for the downlink data transmission allocated by the 5G-RAN or the 5GC UPF to the anchor UPF.

Step 320, the anchor UPF transmits a session modification response message to the 5GC CP.

So far, the description of the first radio access network handover method of the present disclosure is completed. According to the method, a problem of the handover from the EPS to the 5GS is resolved, data loss is avoided, and service continuity is guaranteed.

FIG. 4 is a diagram illustrating a radio access network handover method according to another exemplary embodiment of the present disclosure. The method is used to support direct data forwarding with respect to one data forwarding tunnel for each E-RAB during a process of handing over from an EPS to an NGS or a 5GS. The method describes a method for downlink data forwarding and a method for uplink data forwarding simultaneously. In the practical application, it is possible to only perform the downlink data forwarding without performing the uplink data forwarding. Regarding this case, the method for the uplink data forwarding may be omitted. The method includes the following steps:

Step 401, an E-UTRAN decides to hand over a UE to a 5G-RAN.

Here, the E-UTRAN may be an eNB connected to an EPC. The 5G-RAN may be a gNB or an eNB connected to a 5GC or a centralized unit (CU) in a gNB.

A user plane path before the handover is anchor UPF, SGW and E-UTRAN. The SGW is required to support an interface with the anchor UPF. The anchor UPF may be in an NGC or EPC or a common entity. The anchor UPF may be a 5GC UPF serving the UE and performs a function of an anchor of user planes in an inter-RAT handover process. The anchor UPF may be a function of a PGW plus the 5GC UPF or a function of the 5GC UPF plus the PGW and performs a function of an anchor of user planes in the inter-RAT handover process.

There are one or more ongoing PDU sessions for the UE. Each of the PDU session includes one or more EPS bearers. In a process that a PDU session or an EPS bearer is established, Qos information and/or Qos flow identification of the mapped Qos flow is/are allocated to the EPS bearer. Default EPS bearers are mapped to non-Guaranteed Business Rate (non-GBR) Qos flows. The Qos information and/or Qos flow identification of the Qos flow to which the EPS bearer is mapped is allocated, by a function of a PCC (Policy Control and Charging) or PGW control plane control. In order to support the inter-system handover, the function of the PGW control plane may have a SMF function thereon. In a scene that a PCC is deployed, a Policy and Charging Rules Function (PCRF) provides a Qos and/or the Qos flow identification of a Qos flow to which the EPS bearer is mapped to the SMF. In order to support the inter-system handover, the PCRF further includes a policy control function (PCF) thereon. The SMF transmits the Qos of the Qos flow and/or the Qos flow identification to which the EPS bearer is mapped to the UE through the MME, for example, a message of establishing a PDU session is transmitted to the UE through a non-access stratum message. In the process that the PDU session or the EPS bearer is established, the SMF may further transmit the Qos and/or the Qos flow identification of the Qos flow to which the EPS bearer is mapped to the E-UTRAN through the MME. The E-UTRAN may transmit the mapping information to the UE through a Radio Resource Control (RRC) message. An E-RAB and an EPS bearer are the same or correspond to each other. It is called as an EPS bearer in a core network, and called as an E-RAB in an access network. Identification of an E-RAB (E-RAB identification) and identification of an EPS bearer (EPS bearer identification) are the same or correspond to each other. It is identification of an EPS bearer in a core network, and identification of an E-RAB in an access network.

Step 402, the E-UTRAN transmits a handover required message to a MME. The message includes identification of a target 5G-RAN node and a source-to-target transparent container. The E-UTRAN notifies the MME of whether the direct data forwarding is available through the message. The E-UTRAN determines whether the direct data forwarding is available according to whether an interface exists between the eNB and the target gNB, and the E-UTRAN may consider other factors to determine whether the direct data forwarding is available. The message further includes identification information indicating a 5GC CP to which the target 5G-RAN node is connected. The identification information may be tracking area identification, network fragment identification, 5GC CP pool identification, or 5GC CP identification.

The message includes a type of the handover. The type of the handover includes an intraLTE handover, a handover from LTE to NR and so on. The handover from LTE to NR may further include a handover from an LTE station connected to EPC to NR or a handover from an LTE station connected to 5GC to NR, because an LTE base station eNB may support an interface with the 5GC, or may not support the interface with the 5GC.

The 5GC CP as stated in the Description of the Related Art may be further divided into an AMF function entity and an SMF function entity. An interface of the 5G-RAN with the 5GC CP is an interface with the AMF, thus, the described messages or procedures of the interface of the 5G-RAN with the 5GC CP are messages or processes between the 5G-RAN and the AMF. An interface of the 5GC CP with the MME is an interface of the AMF with the MME, thus, the described messages or procedures of the interface of the 5GC CP and the MME are messages or processes between the AMF and the MME. In order to support the inter-system handover, the SMF may further include a function of PGW control plane. Identification information of the 5GC CP is identification information of the AMF. An interface of the 5GC CP with an anchor UPF is an interface of the SMF with the anchor UPF, thus, the described messages or procedures of the interface of the 5GC CP with the anchor UPF are messages or processes between the SMF and the anchor UPF; and the AMF transmits messages to the SMF, and the SMF communicates with the anchor UPF. Similarly, an interface of the 5GC CP with the 5GC UPF is an interface of the SMF with the 5GC UPF; and the AMF transmit messages to the SMF, and the SMF and the 5GC UPF communicate with each other, wherein the 5GC UPF may be called as UPF.

Step 403, the MME transmits a relocation request message to the 5GC CP. Here, the 5GC CP is an AMF in the 5GC CP. The MME selects and finds out the 5GC CP according to the identification information indicating the 5GC CP to which the target 5G-RAN node is connected included in the handover required message. The message includes identification of a target 5G-RAN node, a source-to-target transparent container, and EPS UE context information. The EPS UE context information includes context information of Mobile Management (MM) EPS of the UE and a session management (SM) context. The message includes a type of the handover. The type of the handover includes an intraLTE handover, a handover from LTE to NR and so on. The handover from LTE to NR may further include a handover from an LTE station connected to EPC to NR or a handover from an LTE station connected to 5GC to NR, because an LTE base station eNB may support an interface with the 5GC, or may not support the interface with the 5GC.

If the MME receives from the E-UTRAN that the direct data forwarding is available, the MME notifies this information to the 5GC CP. If the direct data forwarding is unavailable (for example, the MME does not receive from the E-UTRAN an indication indicating that the direct data forwarding is available), the MME or the 5GC CP determines whether indirect data forwarding is available. If the MME determines that the indirect data forwarding is unavailable, the MME notifies this information to the 5GC CP.

If the data forwarding is available, there are two methods for determining whether the direct data forwarding or the indirect data forwarding is used in the present disclosure. One method is that the determination is made by the MME. The MME determines whether the direct data forwarding or the indirect data forwarding is performed according to whether factors such as whether information about direct data forwarding being available is received from the E-UTRAN, and so on. The MME transmits a result of whether the direct data forwarding or the indirect data forwarding is available to the 5GC CP. The other method is that the MME transmits information indicating whether the direct data forwarding is available received from the E-UTRAN to the 5GC CP, and the 5GC CP determines whether the direct data forwarding or the indirect data forwarding is performed. The MME may also transmit information indicating that the data forwarding is unavailable to the 5GC CP, and the 5GC CP may determine that the data forwarding is not performed according to the received information.

If it is determined that the indirect data forwarding is performed, the specific indirect data forwarding methods and influences on the subsequent respective processes and steps in order to support the indirect data forwarding are the same as those in Method 1, which will not be repeated here.

The present disclosure emphasizes influences on the subsequent respective steps if it is determined that the direct data forwarding is performed.

Step 404, the 5GC CP converts the received EPS UE context into a 5GS UE context.

As for the 5GC CP including the AMF and SMF function entities, the AMF transmits a SM context request message to the SMF. According to the received information in the relocation request message, the AMF knows that the handover is the inter-system handover, and requests the SMF to provide the SM context. The AMF transmits the message to each SMF that serves the UE. The each SMF transmits a SM context response message to the AMF. The message includes a SM context of the UE. The SM context further includes a mapping relationship from the Qos flow to the E-RAB bearer in the PDU session. If the SMF has a mapped EPS bearer context when the AMF requests the SM context, the SMF always return the mapped EPS bearer context to the AMF at the same time. Or, the SMF transmits the mapped EPS bearer context to the AMF while the AMF requests the mapped EPS context.

The 5GS UE context includes 5G Qos information in the 5G-RAN and the 5GC UPF. The 5GC CP may map EPS QoS information into the 5G Qos information, or the 5GC CP interacts with a 5G-PCF to export the 5G Qos information.

Step 405, the 5GC CP may determine whether another 5GC UPF needs to be selected in addition to the anchor UPF. The 5GC CP transmits a session request message to the anchor UPF. The AMF selects the SMF that serves the UE. The AMF transmits a SM request message to the SMF. The SMF transmits the session request message to the anchor UPF. The anchor UPF is a 5GC UPF performing an anchor function for the PDU session of the UE. If the anchor UPF does not have the session management context of the UE, the session request message may be a session creation request, and the response message transmitted to the 5GC CP by the anchor UPF is a session creation response. If the anchor UPF has the context of the UE, the session request message is a session modification request, and the response message transmitted to the 5GC CP by the anchor UPF is a session modification response. The 5GC CP transmits the updated 5G Qos information to the anchor UPF.

The SMF transmits information of the PDU session to the anchor UPF. The information of the PDU session includes PDU session identification, and Qos information of the PDU session. The information of the PDU session includes an EPS bearer list of the PDU session in the EPS and/or a mapping relationship from the Qos flow to the EPS bearer in the PDU session. The EPS bear list includes EPS bearer identification and/or Qos information of the EPS bearer.

Step 406, the anchor UPF allocates uplink tunnel information for the PDU session in the 5GS.

The anchor UPF determines the Qos flow information of each PDU session. The anchor UPF determines the Qos flow information of each PDU session according to the information the PDU session, the Qos information and other information received from the 5GC CP. The Qos flow information may be, for example, a number of flows through which the PDU session transmits data, flow identification, and/or Qos information corresponding to the flow.

The anchor UPF may further determine a mapping relationship between the E-RAB and the Qos flow, i.e., information about which E-RABs being mapped to which Qos flow, during the data forwarding.

It needs to explain that the E-RAB and the EPS bearer have one-to-one correspondence relationship in an LTE system. The EPS bearer is a concept of a core network or a concept of a non-access stratum, and E-RAB is a concept of an access stratum. Thus, the E-RAB and the EPS in the present disclosure both refer to a concept of a bearer in the LTE system.

The anchor UPF transmits a session response message to the 5GC CP. The session response message may be a session establishment response or a session modification response. The session response message includes information of a PDU session. The information of the PDU session includes the uplink tunnel information for the PDU session in the 5GS allocated by the anchor UPF. The message includes information of the Qos flow of each PDU session. The message includes mapping relationship between the E-RAB and the Qos flow in each PDU session. The SMF in the 5GC CP may further notify the AMF of the mapping relationship between the EPS bearer and the Qos flow in the PDU session.

The SMF transmits a SM request response message to the AMF after receiving a response message of the anchor UPF. The tunnel information for uplink data transmission allocated by the anchor UPF is transmitted to the AMF.

Step 407, if the 5GC CP selects another 5GC UPF, the 5GC CP triggers a session establishment process or a session modification process with the 5GC UPF. The 5GC CP transmits the uplink tunnel information allocated by the anchor UPF to the 5GC UPF, and receives uplink tunnel information over a NG3 interface allocated by the 5GC UPF. The 5GC CP transmits the information of the PDU session to the 5GC UPF. The information of the PDU session is the same as that in the Step 406, which will not be repeated here.

Step 408, the 5GC CP transmits a handover request message to the 5G-RAN. The message includes information of a PDU session or PDU sessions to be established. The information of the PDU session includes session identification, session Qos information, Qos flow information, uplink tunnel information of each session, and a source-to-target transparent container. Regarding the direct data forwarding, the message further includes information of an E-RAB or E-RABs included in each PDU session in the EPS. The information of the E-RAB includes identification of the E-RAB and/or Qos information of the E-RAB. The message includes the mapping relationship between the E-RAB and the Qos flow in each PDU session. The message includes a type of the handover. The type of the handover includes an intraLTE handover, a handover from LTE to NR and so on. The handover from LTE to NR may further include a handover from an LTE station connected to EPC to NR or a handover from an LTE station connected to 5GC to NR, because an LTE base station eNB may support an interface with the 5GC, or may not support the interface with the 5GC.

The message may further include a mapping relationship from the Qos flow to the EPS bearer in the PDU session, that is, identification of the EPS bearer to which the Qos flow is mapped and/or the mapped Qos information.

Step 409, the 5G-RAN transmits a handover request confirmation message to the 5GC CP. The message includes one or more kinds of the following information:

a target-to-source transparent container, wherein the target-to-source transparent container may include a mapping relationship from the Qos flow to the EPS bearer in the PDU session, that is, identification of the EPS bearer to which the Qos flow is mapped and/or the mapped Qos information; and a list of information of an established PDU session or PDU sessions accepted by the 5G-RAN, wherein the list of the information of the PDU session includes identification of the PDU session, tunnel information for the PDU session over the NG3 interface, information of a PDU flow or PDU flows accepted by the PDU session, information of an unaccepted PDU flow or PDU flows. The information of the PDU session further includes information of an E-RAB or E-RABs accepted in the PDU session. The information of the PDU session further includes the tunnel information for direct data forwarding allocated to each E-RAB that requires data forwarding in the PDU session. The direct data forwarding is performed through an interface Xx (an interface between the eNB and the gNB), an interface X2, or an interface Xn. The interface X2 is an interface between the eNBs regardless of whether the core network connected to the eNBs is the EPC or the 5GC, or an interface between the eNB and the gNB. The tunnel information for direct data forwarding allocated to each E-RAB may be included in AP messages of access stratums of the 5G-RAN and the 5GC CP, or may be included in the target-to-source transparent container; and a list of information of a PDU session or PDU sessions unaccepted by the 5G-RAN, wherein the list of the information of the PDU session includes PDU session identification and reasons for being unaccepted.

Step 410, the 5GC CP transmits the relocation response message to the MME. The message includes one or more of:

information of an E-RAB or E-RABs accepted by the target 5G-RAN, wherein the information of the E-RAB includes identification of the E-RAB and/or tunnel information for direct data forwarding of the E-RAB;

information of an unaccepted E-RAB or E-RABs, wherein the information of the E-RAB includes identification of the E-RAB and reasons for being unaccepted; and a target-to-source transparent container.

The 5GC CP maps out the list of accepted E-RABs in the PDU session according to the information of an accepted PDU or PDUs and the information of an accepted Qos flow or Qos flows received from the 5G-RAN, or the 5GC CP knows the list of the accepted E-RABs directly according to the information of the accepted E-RABs in the PDU session received from the 5G-RAN. The AMF determines a list of E-RABs accepted in the PDU session according to the mapping relationship from the Qos flow to the EPS bearer. The AMF obtains the mapping relationship from the Qos flow to the EPS bearer in the PDU session from the SMF in the Step 305.

Step 411, the MME transmits a handover command message to the E-UTRAN. The message includes one or more of:

information of an E-RAB or E-RABs accepted by the target 5G-RAN, wherein the information of the E-RAB includes identification of the E-RAB and/or tunnel information for direct data forwarding of the E-RAB;

information of an unaccepted E-RAB or E-RABs, wherein the information of the E-RAB includes identification of the E-RAB and reasons for being unaccepted; and a target-to-source transparent container.

The message includes a type of the handover. The type of the handover includes an intraLTE handover, a handover from LTE to NR and so on. The handover from LTE to NR may further include a handover from an LTE station connected to EPC to NR or a handover from an LTE station connected to 5GC to NR, because an LTE base station eNB may support an interface with the 5GC, or may not support the interface with the 5GC.

Step 412, the E-UTRAN transmits a handover command message to the UE.

The message may further include a mapping relationship from the Qos flow to the EPS bearer in the PDU session, that is, identification of the EPS bearer to which the Qos flow is mapped and/or the mapped Qos information.

The E-UTRAN forwards data to the 5G-RAN. The E-UTRAN forwards the data to the 5G-RAN through the corresponding tunnel for each E-RAB that requires data forwarding. The 5G-RAN firstly transmits the forwarded data to the UE, and then transmits the data received from the 5GC UPF or the anchor UPF to the UE. The 5G-RAN determines mapping the received E-RAB data to a Data Radio Bearer (DRB). The 5G-RAN determines mapping the received E-RAB data to the DRB according to the received mapping relationship between the E-RAB and the Qos flow in the PDU session. The 5G-RAN determines which Qos flow the data of the E-RAB is mapped to, and then determines which DRB the data of the Qos flow is mapped to. The 5G-RAN maps the Qos flow received from the 5GC UPF or the anchor UPF to the DRB. This may guarantee the service continuity and avoid the data loss.

In the process that a PDU session or an EPS bearer is established, the UE receives Qos information and/or Qos flow information of a Qos flow to which the EPS bearer is mapped from the network. The UE correlates the ongoing EPS bearer with the Qos flow in the handover command message. As for the EPS bearer that does not have the corresponding Qos flow, the UE may delete it.

Or, the UE obtains the mapping relationship from the Qos flow to the EPS bearer in the PDU session from the handover request message. The UE correlates the ongoing EPS bearer with the Qos flow included in the handover command message. As for the EPS bearer that does not have the corresponding Qos flow, the UE may delete it.

Step 413, the UE transmits a handover completion message to the 5G-RAN.

Step 414, the 5G-RAN transmits the handover completion message to the 5GC CP. The message includes the tunnel information for downlink data transmission allocated by the 5G-RAN.

Step 415, if another 5GC UPF is selected in the Step 405, the 5GC CP transmits a downlink data transmission tunnel to the 5GC UPF. The 5GC UPF allocates the uplink data tunnel information over the NG3 interface. The 5GC UPF allocates the tunnel information for the downlink data transmission between the 5GC UPF and the anchor UPF. The 5GC UPF transmits the allocated tunnel information for the uplink and downlink data transmission to the 5GC CP.

Step 416, the 5GC CP transmits a session modification request message to the anchor UPF. The 5GC CP transmits the tunnel information for the downlink data transmission allocated by the 5G-RAN or the 5GC UPF to the anchor UPF.

Step 417, the anchor UPF transmits a session modification response message to the 5GC CP.

In the present disclosure, the anchor UPF is a 5GC UPF serving the UE and performs a function of an anchor of user planes in the inter-RAT handover process.

So far, the description of the second handover method supported by the present disclosure is completed. According to the method, a problem of the handover from the EPS to the 5GS is resolved, the data loss is avoided, and the service continuity is guaranteed.

FIG. 5 is a diagram illustrating a radio access network handover method according to another exemplary embodiment of the present disclosure. The method is used to support direct data forwarding with respect to one data forwarding tunnel for each PDU session during a process of handing over from an EPS to an NGS or a 5GS. The method describes a method for downlink data forwarding and a method for uplink data forwarding simultaneously. In the practical application, it is possible to only perform the downlink data forwarding without performing the uplink data forwarding. Regarding this case, the method for the uplink data forwarding may be omitted. The method includes the following steps:

Step 501, an E-UTRAN decides to hand over a UE to a 5G-RAN.

Here, the E-UTRAN may be an eNB connected to an EPC. The 5G-RAN may be a gNB or an eNB connected to a 5GC or a centralized unit (CU) in a gNB.

A user plane path before the handover is anchor UPF, SGW and E-UTRAN. The SGW is required to support an interface with the anchor UPF. The anchor UPF may be in an NGC or EPC or a common entity. The anchor UPF may be a 5GC UPF serving the UE and performs a function of an anchor of user planes in an inter-RAT handover process. The anchor UPF may be a function of a PGW plus the 5GC UPF or a function of the 5GC UPF plus the PGW and performs a function of an anchor of user planes in the inter-RAT handover process.

There are one or more ongoing PDU sessions for the UE. Each of the PDU session includes one or more EPS bearers. In a process that a PDU session or an EPS bearer is established, Qos information and/or Qos flow identification of the mapped Qos flow is/are allocated to the EPS bearer. Default EPS bearers are mapped to non-Guaranteed Business Rate (non-GBR) Qos flows. The Qos information and/or Qos flow identification of the Qos flow to which the EPS bearer is mapped is allocated, by a function of a PCC (Policy Control and Charging) or PGW control plane function. In order to support the inter-system handover, the function of the PGW control plane may have a SMF function thereon. In a scene that a PCC is deployed, a Policy and Charging Rules Function (PCRF) provides a Qos and/or the Qos flow identification of a Qos flow to which the EPS bearer is mapped to the SMF. In order to support the inter-system handover, the PCRF further includes a policy control function (PCF) thereon. The SMF transmits the Qos and/or the Qos flow identification of the Qos flow to which the EPS bearer is mapped to the UE through the MME, for example, a message of establishing a PDU session is transmitted to the UE through a non-access stratum message. In the process that the PDU session or the EPS bearer is established, the SMF may further transmit the Qos and/or the Qos flow identification of the Qos flow to which the EPS bearer is mapped to the E-UTRAN through the MME. The E-UTRAN may transmit the mapping information to the UE through a Radio Resource Control (RRC) message. An E-RAB and an EPS bearer are the same or correspond to each other. It is called as an EPS bearer in a core network, and called as an E-RAB in an access network. Identification of an E-RAB (E-RAB identification) and identification of an EPS bearer (EPS bearer identification) are the same or correspond to each other. It is identification of an EPS bearer in a core network, and identification of an E-RAB in an access network.

Step 502, the E-UTRAN transmits a handover required message to a MME. The message includes identification of a target 5G-RAN node and a source-to-target transparent container. The E-UTRAN notifies the MME of whether the direct data forwarding is available through the message. The E-UTRAN determines whether the direct data forwarding is available according to whether an interface exists between the eNB and the target gNB, and the E-UTRAN may consider other factors to determine whether the direct data forwarding is available. The message further includes identification information indicating a 5GC CP to which the target 5G-RAN node is connected. The identification information may be tracking area identification, network fragment identification, 5GC CP pool identification, or 5GC CP identification.

The message includes a type of the handover. The type of the handover includes an intraLTE handover, a handover from LTE to NR and so on. The handover from LTE to NR may further include a handover from an LTE station connected to EPC to NR or a handover from an LTE station connected to 5GC to NR, because an LTE base station eNB may support an interface with the 5GC, or may not support the interface with the 5GC.

The 5GC CP as stated in the Description of the Related Art may be further divided into an AMF function entity and an SMF function entity. An interface of the 5G-RAN with the 5GC CP is an interface with the AMF, thus, the described messages or procedures of the interface of the 5G-RAN with the 5GC CP are messages or processes between the 5G-RAN and the AMF. An interface of the 5GC CP with the MME is an interface of the AMF with the MME, thus, the described messages or procedures of the interface of the 5GC CP and the MME are messages or processes between the AMF and the MME. In order to support the inter-system handover, the SMF may further include a function of PGW control plane. Identification information of the 5GC CP is identification information of the AMF. An interface of the 5GC CP with an anchor UPF is an interface of the SMF with the anchor UPF, thus, the described messages or procedures of the interface of the 5GC CP with the anchor UPF are messages or processes between the SMF and the anchor UPF; and the AMF transmits messages to the SMF, and the SMF communicates with the 5GC UPF. Similarly, an interface of the 5GC CP with the 5GC UPF is an interface of the SMF with the 5GC UPF; and the AMF transmit messages to the SMF, and the SMF and the 5GC UPF communicate with each other, wherein the 5GC UPF may be called as UPF.

Step 503, the MME transmits a relocation request message to the 5GC CP. Here, the 5GC CP is an AMF in the 5GC CP. The MME selects and finds out the 5GC CP according to the identification information indicating the 5GC CP to which the target 5G-RAN node is connected included in the handover required message. The message includes identification of a target 5G-RAN node, a source-to-target transparent container, and EPS UE context information. The EPS UE context information includes context information of Mobile Management (MM) EPS of the UE and a session management (SM) context. The message includes a type of the handover. The type of the handover includes an intraLTE handover, a handover from LTE to NR and so on. The handover from LTE to NR may further include a handover from an LTE station connected to EPC to NR or a handover from an LTE station connected to 5GC to NR, because an LTE base station eNB may support an interface with the 5GC, or may not support the interface with the 5GC.

If the MME receives from the E-UTRAN that the direct data forwarding is available, the MME notifies this information to the 5GC CP. If the direct data forwarding is unavailable (for example, the MME does not receive from the E-UTRAN an indication indicating that the direct data forwarding is available), the MME or the 5GC CP determines whether indirect data forwarding is available. If the MME determines that the indirect data forwarding is unavailable, the MME notifies this information to the 5GC CP.

If the data forwarding is available, there are two methods for determining whether the direct data forwarding or the indirect data forwarding is used in the present disclosure. One method is that the determination is made by the MME. The MME determines whether the direct data forwarding or the indirect data forwarding is performed according to factors such as whether information about direct data forwarding being available is received from the E-UTRAN, and so on. The MME transmits a result of the determination to the 5GC CP. The other method is that the MME transmits information indicating whether the direct data forwarding is available received from the E-UTRAN to the 5GC CP, and the 5GC CP determines whether the direct data forwarding or the indirect data forwarding is performed. The MME may also transmit information indicating that the data forwarding is unavailable to the 5GC CP, and the 5GC CP may determine that the data forwarding is not performed according to the received information.

If it is determined that the indirect data forwarding is performed, the specific indirect data forwarding methods and influences on the subsequent respective processes and steps in order to support the indirect data forwarding are the same as those in Method 1, which will not be repeated here.

The present disclosure emphasizes influences on the subsequent respective steps if it is determined that the direct data forwarding is performed.

Step 504, the 5GC CP converts the received EPS UE context into a 5GS UE context. As for the 5GC CP including the AMF and SMF function entities, the AMF transmits a SM context request message to the SMF. According to the received information in the relocation request message, the AMF knows that the handover is the inter-system handover, and requests the SMF to provide the SM context. The AMF transmits the message to each SMF that serves the UE. The each SMF transmits a SM context response message to the AMF. The message includes a SM context of the UE. The SM context further includes a mapping relationship from the Qos flow to the E-RAB bearer in the PDU session. If the SMF has a mapped EPS bearer context when the AMF requests the SM context, the SMF always return the mapped EPS bearer context to the AMF at the same time. Or, the SMF transmits the mapped EPS bearer context to the AMF while the AMF requests the mapped EPS context.

The 5GS UE context includes 5G Qos information in the 5G-RAN and the 5GC UPF. The 5GC CP may map the EPS QoS information into 5G Qos information, or the 5GC CP interacts with a 5G-PCF to export the 5G Qos information.

Step 505, the 5GC CP may determine whether another 5GC UPF needs to be selected in addition to the anchor UPF. The 5GC CP transmits a session request message to the anchor UPF. The AMF selects the SMF that serves the UE. The AMF transmits a SM request message to the SMF. The SMF transmits the session request message to the anchor UPF. The anchor UPF is a 5GC UPF performing an anchor function for the PDU session of the UE. If the anchor UPF does not have the session management context of the UE, the session request message may be a session creation request, and the response message transmitted to the 5GC CP by the anchor UPF is a session creation response. If the anchor UPF has the context of the UE, the session request message is a session modification request, and the response message transmitted to the 5GC CP by the anchor UPF is a session modification response. The 5GC CP transmits the updated 5G Qos information to the anchor UPF.

The 5GC CP transmits information of the PDU session to the anchor UPF. The information of the PDU session includes PDU session identification, and Qos information of the PDU session. The information of the PDU session includes an EPS bearer list of the PDU session in the EPS and/or a mapping relationship from the Qos flow to the EPS bearer in the PDU session. The EPS bear list includes EPS bearer identification and/or Qos information of the EPS bearer.

Step 506, the anchor UPF allocates uplink tunnel information for the PDU session in the 5GS.

The anchor UPF determines the Qos flow information of each PDU session. The anchor UPF determines the Qos flow information of each PDU session according to the information the PDU session, the Qos information and other information received from the 5GC CP. The Qos flow information may be, for example, a number of flows through which the PDU session transmits data, flow identification, and/or Qos information corresponding to the flow. The message may further include information indicating how to determine a Qos flow mapping policy in the PDU session.

The anchor UPF may further determine a mapping relationship between the E-RAB and the Qos flow, i.e., information about which E-RABs being mapped to which Qos flow, during the data forwarding.

The anchor UPF transmits a session response message to the 5GC CP. The session response message may be a session establishment response or a session modification response. The session response message includes information of a PDU session. The information of the PDU session includes the uplink tunnel information for the PDU session in the 5GS allocated by the anchor UPF. The message includes information of the Qos flow of each PDU session. The message includes mapping relationship between the E-RAB and the Qos flow in each PDU session.

The SMF transmits a SM request response message to the AMF after receiving a response message of the anchor UPF. The tunnel information for uplink data transmission allocated by the anchor UPF is transmitted to the AMF.

Step 507, if the 5GC CP selects another 5GC UPF, the 5GC CP triggers a session establishment process or a session modification process with the 5GC UPF. The 5GC CP transmits the uplink tunnel information allocated by the anchor UPF to the 5GC UPF, and receives uplink tunnel information over a NG3 interface allocated by the 5GC UPF. The 5GC CP transmits the information of the PDU session to the 5GC UPF. The information of the PDU session is the same as that in the Step 506, which will not be repeated here.

Step 508, the 5GC CP transmits a handover request message to the 5G-RAN. The message includes information of a PDU session or PDU sessions to be established. The information of the PDU session includes session identification, session Qos information, Qos flow information, uplink tunnel information of each session, and a source-to-target transparent container. The message may further include information indicating how to determine a Qos flow mapping policy in the PDU session. The 5G-RAN determines how to map the received data to different Qos flows according to the policy information after receiving the data from the E-UTRAN through the tunnel with respect to one PDU session. The message includes a type of the handover. The type of the handover includes an intraLTE handover, a handover from LTE to NR and so on. The handover from LTE to NR may further include a handover from an LTE station connected to EPC to NR or a handover from an LTE station connected to 5GC to NR, because an LTE base station eNB may support an interface with the 5GC, or may not support the interface with the 5GC.

The message may further include a mapping relationship from the Qos flow to the EPS bearer in the PDU session, that is, identification of the EPS bearer to which the Qos flow is mapped and/or the mapped Qos information.

Step 509, the 5G-RAN transmits a handover request confirmation message to the 5GC CP. The message includes one or more kinds of the following information:

a target-to-source transparent container, wherein the target-to-source transparent container may include a mapping relationship from the Qos flow to the EPS bearer in the PDU session, that is, identification of the EPS bearer to which the Qos flow is mapped and/or the mapped Qos information; and a list of information of an established PDU session or PDU sessions accepted by the 5G-RAN, wherein the list of the information of the PDU session includes identification of the PDU session, tunnel information for the PDU session over the NG3 interface, information of a PDU flow or PDU flows accepted by the PDU session, and/or information of an unaccepted PDU flow or PDU flows. The information of the PDU session further includes the tunnel information for direct data forwarding. The direct data forwarding is performed through an interface Xx (an interface between the eNB and the gNB), an interface X2, or an interface Xn. The interface X2 is an interface between the eNBs regardless of whether the core network connected to the eNBs is the EPC or the 5GC, or an interface between the eNB and the gNB. The tunnel information for direct data forwarding allocated to each PDU session may be included in AP messages of access stratums of the 5G-RAN and the 5GC CP, or may be included in the target-to-source transparent container;

a list of information of a PDU session or PDU sessions unaccepted by the 5G-RAN, wherein the list of the information of the PDU session includes PDU session identification and reasons for being unaccepted.

The 5G-RAN determines a mapping relationship from the Qos flow to the DRB. The 5G-RAN decides a mapping relationship between the EPS bearer and the DRB according to the received mapping relationship from the Qos flow to the EPS bearer. The 5G-RAN notifies a source base station of the mapping relationship from the EPS bearer to the DRB, i.e., identification of the DRB to which each EPS bearer is mapped, through a core network. For example, it may be included in the target-to-source transparent container or may be directly included in the handover request confirmation message, the relocation response message and the handover request message. The 5G-RAN allocates tunnel information for each DRB that requires data forwarding, and the tunnel information includes a transport layer address and a Tunnel Endpoint Identifier (TEID). The 5G-RAN notifies the source base station of the tunnel information allocated for each DRB that requires data forwarding through core network. For example, it may be included in the target-to-source transparent container or may be directly included in the handover request confirmation message, the relocation response message and the handover command message.

Step 510, the 5GC CP transmits the relocation response message to the MME. The message includes one or more of:

information of an E-RAB or E-RABs accepted by the target 5G-RAN, wherein the information of the E-RAB includes identification of the E-RAB;

information of an unaccepted E-RAB or E-RABs, wherein the information of the E-RAB includes identification of the E-RAB and reasons for being unaccepted;

a target-to-source transparent container; and a list of information of an established PDU session or PDU sessions accepted by the 5G-RAN, wherein the list of the information of the PDU session includes PDU session identification, and/or information of a Qos flow or Qos flows accepted by the PDU session, and/or Qos information of the Qos flow or the Qos flows. The information of the PDU session further includes the tunnel information for direct data forwarding. The direct data forwarding is performed through an interface Xx (an interface between the eNB and the gNB), an interface X2, or an interface Xn. The interface X2 is an interface between the eNBs regardless of whether the core network connected to the eNBs is the EPC or the 5GC, or an interface between the eNB and the gNB. The tunnel information for direct data forwarding allocated to each PDU session may be directly included in the message, or may be included in the target-to-source transparent container. The information of the PDU session includes the mapping relationship between the E-RAB and the Qos flow in each PDU session.

The 5GC CP maps out the list of accepted E-RABs in the PDU session according to the information of an accepted PDU or PDUs and the information of an accepted Qos flow or Qos flows received from the 5G-RAN, or the 5GC CP knows the list of the accepted E-RABs directly according to the information of the accepted E-RABs in the PDU session received from the 5G-RAN. The AMF determines a list of E-RABs accepted in the PDU session according to the mapping relationship from the Qos flow to the EPS bearer. The AMF obtains the mapping relationship from the Qos flow to the EPS bearer in the PDU session from the SMF in the Step 305.

Here, there are two methods for transmitting information indicating one data forwarding tunnel for each PDU session to the MME.

Method 1: The information of the E-RAB includes tunnel information for data forwarding. As for the E-RABs belonging to the same PDU session, the tunnel information for data forwarding is the same, and is the tunnel information for data forwarding of the PDU session received from the 5G-RAN. The information of the E-RAB may further include information indicating which PDU session the E-RAB belongs to, i.e., the session identification of the PDU session which the E-RAB belongs to. The information of the E-RAB may further include information indicating which Qos flow the E-RAB is mapped to, i.e., the identification of the flow of the PDU session which the E-RAB is mapped to.

Method 2: The information of the PDU session is included in the relocation response message. The information of the PDU session includes PDU session identification, a list of identification of E-RABs included in the PDU session, information of Qos flows included in the PDU session, information indicating which Qos flow each E-RAB in the PDU session is mapped to, and/or the tunnel information for direct data forwarding. The direct data forwarding is performed through an interface Xx (an interface between the eNB and the gNB), an interface X2, or an interface Xn. The interface X2 is an interface between the eNBs regardless of whether the core network connected to the eNBs is the EPC or the 5GC, or an interface between the eNB and the gNB. The tunnel information for direct data forwarding allocated to each PDU session may be directly included in the message, or may be included in the target-to-source transparent container. The information of the PDU session includes the mapping relationship between the E-RAB and the Qos flow in each PDU session.

Step 511, the MME transmits a handover command message to the E-UTRAN. The message includes one or more of:

information of an E-RAB or E-RABs accepted by the target 5G-RAN, wherein the information of the E-RAB includes identification of the E-RAB;

information of an unaccepted E-RAB or E-RABs, wherein the information of the E-RAB includes identification of the E-RAB and reasons for being unaccepted; and a target-to-source transparent container.

The message includes a type of the handover. The type of the handover includes an intraLTE handover, a handover from LTE to NR and so on. The handover from LTE to NR may further include a handover from an LTE station connected to EPC to NR or a handover from an LTE station connected to 5GC to NR, because an LTE base station eNB may support an interface with the 5GC, or may not support the interface with the 5GC.

Here, there are two methods for transmitting information indicating one data forwarding tunnel for each PDU session to the E-UTRAN.

Method 1: The information of an E-RAB or E-RABs accepted by the 5G-RAN includes the tunnel information for data forwarding. As for the E-RABs belonging to the same PDU session, the tunnel information for data forwarding is the same, and is the tunnel information for the data forwarding of the PDU session received from the 5GC CP or the 5G-RAN. The information of the E-RAB may further include information indicating which PDU session the E-RAB belongs to, i.e., the session identification of the PDU session which the E-RAB belongs to. The information of the E-RAB may further include information indicating which Qos flow the E-RAB is mapped to, i.e., the identification of the flow of the PDU session which the E-RAB is mapped to. The message may further include the Qos information of each Qos flow.

Method 2: The handover command message includes information of a PDU session. The information of the PDU session includes PDU session identification, a list of identification of E-RABs included in the PDU session, information of Qos flows included in the PDU session, information indicating which Qos flow each E-RAB in the PDU session is mapped to, and/or the tunnel information for direct data forwarding. The direct data forwarding is performed through an interface Xx (an interface between the eNB and the gNB), an interface X2, or an interface Xn. The interface X2 is an interface between the eNBs regardless of whether the core network connected to the eNBs is the EPC or the 5GC, or an interface between the eNB and the gNB. The tunnel information for direct data forwarding allocated to each PDU session may be directly included in the message, or may be included in the target-to-source transparent container. The information of the PDU session includes the mapping relationship between the E-RAB and the Qos flow in each PDU session. The message may further include the Qos information of each Qos flow.

Step 512, the E-UTRAN transmits a handover command message to the UE.

The message may further include a mapping relationship from the Qos flow to the EPS bearer in the PDU session, that is, identification of the EPS bearer to which the Qos flow is mapped and/or the mapped Qos information.

The E-UTRAN forwards data to the 5G-RAN. The E-UTRAN forwards the data to the 5G-RAN according to the received data forwarding tunnel information. The E-RAB data belonging to the same PDU session is forwarded through one tunnel. The E-UTRAN determines which Qos flow the E-RAB uses to transmit data according to the received mapping relationship between the E-RAB and the flow. The E-UTRAN sets a data packet header of the forwarded data according to the received Qos information of each Qos flow. The 5G-RAN firstly transmits the forwarded data to the UE, and then transmits the data received from the 5GC UPF or the anchor UPF to the UE. The 5G-RAN determines mapping the received E-RAB data to the DRB. The 5G-RAN determines the mapping from the Qos flow to the DRB according to the received data packet header, or the 5G-RAN determines how to map the data transmitted from the tunnel of the E-UTRAN with respect to one PDU session to different Qos flows according to the information of the Qos flow mapping policy received from the 5GC UPF or the anchor UPF, and then determines mapping the Qos flow to the DRB. The 5G-RAN maps the Qos flow received from the anchor UPF or the 5GC UPF to the DRB for transmission. This may guarantee the service continuity and avoid the data loss. Or, the E-UTRAN transmits data on each EPS bearer to the 5G-RAN through the tunnel allocated to the corresponding DRB according to the received mapping relationship from the EPS bearer to the DRB and the tunnel information allocated to each DRB that requires data forwarding.

In the process that a PDU session or an EPS bearer is established, the UE receives Qos information and/or Qos flow information of a Qos flow to which the EPS bearer is mapped from the network. The UE correlates the ongoing EPS bearer with the Qos flow included in the handover command message. As for the EPS bearer that does not have the corresponding Qos flow, the UE may delete it.

Or, the UE obtains the mapping relationship from the Qos flow to the EPS bearer in the PDU session from the handover request message. The UE correlates the ongoing EPS bearer with the Qos flow included in the handover command message. As for the EPS bearer that does not have the corresponding Qos flow, the UE may delete it.

Step 513, the UE transmits a handover completion message to the 5G-RAN.

Step 514, the 5G-RAN transmits the handover completion message to the 5GC CP. The message includes the tunnel information for downlink data transmission allocated by the 5G-RAN.

Step 515, if another 5GC UPF is selected in the Step 505, the 5GC CP transmits a downlink data transmission tunnel to the 5GC UPF. The 5GC UPF allocates the uplink data tunnel information over the NG3 interface. The 5GC UPF allocates the tunnel information for the downlink data transmission between the 5GC UPF and the anchor UPF. The 5GC UPF transmits the allocated tunnel information for the uplink and downlink data transmission to the 5GC CP.

Step 516, the 5GC CP transmits a session modification request message to the anchor UPF. The 5GC CP transmits the tunnel information for the downlink data transmission allocated by the 5G-RAN or the 5GC UPF to the anchor UPF.

Step 517, the anchor UPF transmits a session modification response message to the 5GC CP.

In the present disclosure, the anchor UPF is a 5GC UPF serving the UE and performs a function of an anchor of user planes in the inter-RAT handover process.

So far, the description of the third handover method supported by the present disclosure is completed. According to the method, a problem of the handover from the EPS to the 5GS is resolved, the data loss is avoided, data forwarding delay is reduced, and the service continuity is guaranteed.

FIG. 6 is a diagram illustrating a radio access network handover method according to another exemplary embodiment of the present disclosure. The method is used to support indirect data forwarding during a process of handing over from an NGS or a 5GS to an EPS. The method describes a method for downlink data forwarding and a method for uplink data forwarding simultaneously. In the practical application, it is possible to only perform the downlink data forwarding without performing the uplink data forwarding. Regarding this case, the method for the uplink data forwarding may be omitted. The method includes the following steps:

Step 601, a 5G-RAN decides to hand over a UE to an E-UTRAN.

Here, the E-UTRAN may be an eNB connected to an EPC. The 5G-RAN may be a gNB or an eNB connected to a 5GC or a centralized unit (CU) in a gNB.

A user plane path before the handover is anchor UPF, non-terminal 5GC UPF and 5G-RAN. The non-terminal 5GC UPF is optional. The SGW is required to support an interface with the anchor UPF. The anchor UPF may be in an NGC or EPC or a common entity. The anchor UPF may be a 5GC UPF serving the UE and performs a function of an anchor of user planes in an inter-RAT handover process. The anchor UPF may be a function of a PGW plus the 5GC UPF or a function of the 5GC UPF plus the PGW and performs a function of an anchor of user planes in the inter-RAT handover process.

There are one or more ongoing PDU sessions for the UE. Each of the PDU session includes one or more Qos flows. In a process that a PDU session or a Guaranteed Business Rate (GRB) Qos flow is established, the mapped EPS Qos information and/or EPS bearer identification is/are allocated to a Qos flow. Non-Guaranteed Business Rate (non-GBR) Qos flows are mapped to Default EPS bearers. The GRB Qos flows are mapped to EPS dedicated bearers. The EPS Qos information and/or the EPS bearer identification to which the Qos flow is mapped is/are allocated by a PCC or SMF or AMF. If assigned by the AMF, the AMF transmit the EPS Qos information and/or the EPS bearer identification to which the Qos flow is mapped to the SMF. In order to support the inter-system handover, the SMF may further include a function of PGW control plane. In a scene that a PCC is deployed, a Policy Control Function (PCF) provides an EPS Qos and/or EPS bearer identification to which the Qos flow is mapped to the SMF. In order to support the inter-system handover, the PCF may further include a Policy and Charging Rules Function (PCRF) thereon. The SMF transmits the EPS Qos information and/or the EPS bearer identification to which the Qos flow is mapped to the UPF. The SMF transmits the EPS Qos information and/or the EPS bearer identification to which the Qos flow is mapped to the UE through the AMF, for example, a message of establishing a PDU session is transmitted to the UE through a non-access stratum message. In a process that a PDU session or a GRB Qos flow is established, the SMF may further transmit the mapped Qos information in EPS and/or E-RAB identification to which the Qos flow is mapped to the 5G-RAN through the AMF. The AMF transmits the mapped EPS Qos information and/or the E-RAB identification to which the Qos flow is mapped to the 5G-RAN through an initial context establishment request message or a PDU session resource establishment request message. The 5G-RAN may transmit the mapped EPS Qos information and/or the E-RAB identification to which the Qos flow is mapped to the UE through a Radio Resource Control (RRC) message. An E-RAB and an EPS bearer are the same or correspond to each other. It is called as an EPS bearer in a core network, and called as an E-RAB in an access network. Identification of an E-RAB (E-RAB identification) and identification of an EPS bearer (EPS bearer identification) are the same or correspond to each other. It is identification of an EPS bearer in a core network, and identification of an E-RAB in an access network.

Step 602, the 5G-RAN transmits a handover required message to a 5GC CP. The message includes identification of a target eNB and a source-to-target transparent container. The message further includes identification information indicating an MME to which the target eNB is connected. The identification information may be tracking area identification, or MME identification.

The 5G-RAN notifies the 5GC CP of a type of the handover. The type of the handover includes an intraNR handover, a handover from NR to LTE, a handover from NR to UTRAN, and/or a handover from NR to GERAN and/or GSM. As for the handover from NR to LTE, the 5G-RAN notifies the 5GC CP whether a target base station of the handover is a base station connected to a 5G core network or whether the handover is the inter-system handover, because an LTE base station eNB may support an interface with the 5GC, or may not support the interface with the 5GC. If the target base station is also connected to the 5GC, it is the handover inside the 5GS. If the target base station is not connected to the 5GC but to the EPC, it is the inter-system inter-system handover. The 5G-RAN may notify the 5GC CP of that the handover is the inter-system handover by including information of the inter-system handover or information about no interface existing between the target base station and the 5GC in the handover required message. If a length of identification of an eNB connected to the 5GC is different from a length of identification of an eNB that is not connected to the 5GC, the 5GC may determine whether it is the inter-system handover according to the length of identification of the target base station included in the received handover required message. If a definition of identification of the MME to which the target base station is connected is different from that of identification of the 5GC CP node (for example, the lengths are different), the 5GC CP may determine whether it is the inter-system handover according to a length of identification of a core network to which the target base station is connected included in the received handover required message. Or, the 5G-RAN notifies the 5GC CP of the type of the handover by directly setting the type of the handover as a handover from NR to the eNB connected to the EPC or the handover from NR to the eNB connected to the 5GC in the handover required message. The type of the handover indicates whether the core network to which the target eNB is connected is the EPC or the 5GC. If it is the 5GC, it is the handover inside the system. If it is the EPC, it is the inter-system inter-system handover.

The 5G-RAN may know whether the eNB supports an interface with the 5GC by the following methods:

Method 1: The eNB broadcasting whether it supports the interface with the 5GC. The UE reads broadcast information of the eNB, and transmits information about whether a neighboring base station supports the interface with the 5GC to a serving base station, such as a gNB, of the UE.

Method 2: The eNB notifies the gNB of whether it supports the interface with the 5GC through a process of establishing an interface between the gNB and the eNB.

Method 3: The gNB knows whether the eNB supports the interface with the 5GC through O&M configuration.

If a base station within which a target cell to hand over is located is the eNB that does not support the interface with 5GC, the 5G-RAN includes a source eNB to a target eNB transparent container in the handover required message. According to identification of E-RAB to which a Qos flow is mapped obtained from the core network by the 5G-RAN in the process that the PDU session or the GBR Qos flow is established, the 5G-RAN includes a list of information of the E-RAB or E-RABs in the source eNB to a target eNB transparent container. The information of the E-RAB includes identification of the E-RAB. The information of the E-RAB includes downlink data forwarding for the E-RAB proposed by a source base station. The source eNB to a target eNB transparent container further includes a RRC container. Content in the RRC container is organized according to handover preparation of the LTE. The source-to-target transparent container includes content of a source eNB to a target eNB transparent container.

If a base station within which a target cell to hand over is located is the eNB that supports the interface with the 5GC, the 5G-RAN includes a source base station to a target base station transparent container two in the handover required message. The 5G-RAN includes a list of information of a PDU session or PDU sessions in the source base station to a target base station transparent container two. The information of the PDU session includes PDU session identification, Qos flow information, information of downlink data forwarding proposed for the PDU session, information of downlink data forwarding proposed for the Qos flow or Qos flows in the PDU session, information of downlink data forwarding proposed for DRB of the PDU session and/or a mapping relationship from the Qos flow to the DRB. The source base station to a target base station transparent container two further includes a RRC container. Content in the RRC container is organized according to handover preparation of the LTE. The source-to-target transparent container includes content of the source base station to a target base station transparent container two.

The 5GC CP as stated in the Description of the Related Art may be further divided into an AMF function entity and an SMF function entity. An interface of the 5G-RAN with the 5GC CP is an interface with the AMF, thus, the described messages or procedures of the interface of the 5G-RAN with the 5GC CP are messages or procedures between the 5G-RAN and the AMF. An interface of the 5GC CP with the MME is an interface of the AMF with the MME, thus, the described messages or procedures of the interface of the 5GC CP with the MME are messages or procedures between the AMF and the MME. An interface of the 5GC CP with an anchor UPF is an interface of the SMF with the anchor UPF, thus, the described messages or procedures of the interface of the 5GC CP with the anchor UPF are messages or procedures between the SMF with the anchor UPF; and the AMF transmits messages to the SMF, and the SMF communicates with the anchor UPF. Similarly, an interface of the 5GC CP with the 5GC UPF is an interface of the SMF with the 5GC UPF; and the AMF transmit messages to the SMF, and the SMF and the 5GC UPF communicate with each other, wherein the 5GC UPF may be called as UPF. In order to support the inter-system handover, the SMF may further include a function of PGW control plane.

The AMF transmits a SM context request message to the SMF. According to the received information in the handover required message, the AMF knows that the handover is the inter-system handover, and requests the SMF to provide a SM context. The AMF may further request for a mapped EPS bearer context. The AMF transmits the message to each SMF that serves the UE. The each SMF transmits a SM context response message to the AMF. The message includes a SM context of the UE. The SM context further includes the mapped EPS bear context, such as identification of the EPS bearer and/or Qos information of the EPS. If the SMF has the mapped EPS bearer context when the AMF requests for the SM context, the SMF always return the mapped EPS bearer context to the AMF at the same time. Or, when the AMF also indicates to request for the EPS bearer context while requesting for the SM context from the SMF, the SMF transmits the mapped EPS bearer context to the AMF when the AMF requests for the mapped EPS context. According to the information about the target eNB being not connected to the 5GC or the information about the handover being the inter-system handover or the handover from NR to the eNB connected to the EPC received from the source 5G-RAN, the AMF knows that the handover is the inter-system handover, and requests the SMF to provide information of the mapped EPS bearer context.

Step 603, the 5GC CP transmits a relocation request message to the MME. The 5GC CP selects and finds out the MME according to the identification information indicating the MME to which the target eNB is connected included in the handover required message. The identification information of the MME to which the target eNB is connected may be TAI. The message includes identification of the target eNB, a source-to-target transparent container, 5GS UE context information or the mapped EPS UE context information. The 5GS UE context information or the mapped EPS UE context information includes context information of Mobile Management (MM) of the UE and a session management (SM) context.

The 5GC CP or MME determines whether data forwarding is possible. The data forwarding here refers to indirect data forwarding. If the 5GC performs the determination and indirect data forwarding is unavailable, the 5GC CP notifies this information to the MME.

The 5GC CP notifies the MME of information of a Qos flow included in a PDU session.

If the MME receives the 5GS UE context from the 5GC CP, Step 604 is executed, otherwise the Step 604 does not need to be executed.

Step 604, the MME converts the received 5GS UE context into an EPS UE context.

Step 605, the MME transmits a session creation request message to an SGW. The message includes EPS bearer context information.

Step 606, the SGW transmits a session creation response message to the MME. The message includes tunnel information allocated by the SGW for uplink data transmission over a S1 interface.

Step 607, the MME transmits the handover request message to the E-UTRAN. The message includes a source-to-target transparent container, and an E-RAB context. The E-RAB context includes an E-RAB to be established and uplink tunnel information of a S1 interface allocated by the SGW. The E-RAB context includes information indicating whether data forwarding is possible. The message includes a type of the handover, and the specific content is the same as that in the Step 602, which will not be repeated here.

Step 608, the E-UTRAN transmits a handover request confirmation message to the MME. The message includes a list of established E-RABs, a list of E-RABs that are unsuccessfully established, and a target-to-source transparent container. As for the established E-RAB, it further includes the tunnel information for downlink data transmission over the S1 interface. As for the established E-RAB, if the source base station proposes downlink data forwarding, the data forwarding is possible and the target eNB accepts the downlink data forwarding, the target base station includes the tunnel information for data forwarding over the S1 interface allocated by the E-UTRAN to each E-RAB that requires data forwarding.

As for the established E-RAB, the target base station indicates that the target base station requests for uplink data forwarding by including uplink tunnel information in the handover request confirmation message. The tunnel information includes a transport layer address and a Tunnel Endpoint Identifier (TEID).

Step 609, the MME requests the SGW to create an indirect data forwarding tunnel. This step is executed when it needs to perform the indirect data forwarding. If the MME receives the downlink tunnel information for data forwarding from the E-UTRAN, the MME requests the SGW to create the indirect data forwarding tunnel. The MME transmits the transport layer address and TEID for data forwarding allocated by the eNB to the SGW. The transport layer address and TEID correspond to each E-RAB.

The SGW transmits a response message of creating a indirect data forwarding tunnel to the MME. The message includes information for the data forwarding between the SGW and the anchor UPF allocated by the SGW. The information for data forwarding between the SGW and the anchor UPF includes PDU session identification and/or information of an E-RAB (E-RABs) included in the PDU session. The information of the E-RAB includes identification of the E-RAB and tunnel information for data forwarding of the E-RAB. The tunnel information includes a transport layer address and a TEID allocated by the SGW. The SGW allocates downlink data forwarding tunnel information to the E-RAB that requires downlink data forwarding. The SGW allocates uplink data forwarding tunnel information to the E-RAB that requires uplink data forwarding. The data forwarding tunnel information included in the information of the E-RAB may include uplink and/or downlink data forwarding tunnel information.

The MME notifies the SGW of correspondence relationship between the Qos flow and the E-RAB in the PDU session. The MME determines correspondence relationship between a Qos flow and an E-RAB in the PDU session, or receives the correspondence relationship between a Qos flow and an E-RAB in the PDU session from the AMF.

There are two methods for data forwarding between the anchor UPF and the SGW:

Method 1: A data transmission method between the anchor UPF and the SGW is that one tunnel is for each EPS bearer of each PDU session. If the data forwarding between the 5G-RAN and the anchor UPF is performed in accordance with one user plane tunnel for each PDU session, the anchor UPF transmits data of a plurality of Qos flows belonging to the same PDU session received from the 5G-RAN or the 5GC UPF to the SGW through the tunnels of the EPS bears corresponding to each Qos flow, respectively, that is, the anchor UPF performs mapping from one tunnel to multiple tunnels. The anchor UPF performs the mapping from one tunnel to multiple tunnels according to the correspondence relationship between the Qos flow and the EPS bearer or E-RAB in the PDU session. In accordance with this forwarding method, the SGW allocates a tunnel for the data forwarding between the SGW and the anchor UPF to each EPS bearer that requires data forwarding in each PDU session. As for each PDU session, the number of the data forwarding tunnels equals to the number of the EPS bearers. The anchor UPF knows the EPS bearers that require data forwarding for each PDU session, a mapping relationship between the Qos flow and the EPS bearer and/or identification of the EPS bearer according to the information received from the 5GC CP in the Step 611. The anchor UPF knows the information of the Qos flow included in the PDU session in the 5GS.

Method 2: A data transmission method between the anchor UPF and the SGW is that one tunnel is for each PDU session. If the data forwarding between the 5G-RAN and the anchor UPF is performed in accordance with one user plane tunnel for each PDU session, the SGW maps the data received from the tunnels belonging to the same PDU session to the tunnel corresponding to each EPS bearer, and transmits the data to the E-UTRAN. If the data forwarding between the 5G-RAN and the anchor UPF is performed in accordance with one user plane tunnel for each EPS bearer in each PDU session, the SGW only needs to transmit the data on the EPS bearer received from anchor to the target base station through the tunnel corresponding to the same EPS bearer. As for this data forwarding method, the SGW allocates the tunnel information for the data forwarding between the SGW and the anchor UPF to each PDU session.

As for the data forwarding method 2, the SGW allocates the tunnel information for data forwarding to each PDU session. The SGW transmits the information to the MME by two methods.

Method 1: The SGW sets the forwarding tunnels of the E-RABs corresponding to the same PDU session to be the same in the message.

Method 2: A first response message of creating the forwarding tunnel includes the PDU session identification and the forwarding tunnel information of each E-RAB.

The MME transmits the information of the Qos flow (Qos flow information) in the PDU session and the information of the E-RAB to be mapped in the EPS to the 5GC CP. The information of the Qos flow (Qos flow information) includes flow identification and/or Qos information corresponding to the flow.

The Step 609 is executed when the indirect data forwarding is available.

Step 610, the MME transmits a relocation response message to the 5GC CP. The message includes the tunnel information for data forwarding allocated by the SGW. As for the data forwarding methods 1 and 2 between the anchor UPF and the SGW, the tunnel information is for each EPS bearer in the PDU session or corresponds to each PDU session. The message includes a target-to-source transparent container. As for the data forwarding method 1 between the anchor UPF and the SGW, the MME transmits the information of the E-RAB included in the PDU session and the tunnel information for data forwarding allocated to each E-RAB by the SGW to the 5GC CP. The message includes E-RAB setup list. The E-RAB setup list includes the E-RAB ID, the tunnel information for data forwarding if the target E-UTRAN accepts the data forwarding. The message may also include the E-RAB failed to be setup list.

The message includes information for the data forwarding between the SGW and the anchor UPF allocated by the SGW. The information for data forwarding between the SGW and the anchor UPF includes PDU session identification and/or information of an E-RAB (E-RABs) included in the PDU session. The information of the E-RAB (E-RABs) includes identification of the E-RAB and tunnel information for data forwarding of the E-RAB. As for the data forwarding method 1 between the anchor UPF and the SGW, the information for the data forwarding between the SGW and the anchor UPF includes the tunnel information for data forwarding allocated to each E-RAB in each PDU session by the SGW. The tunnel information for data forwarding may include uplink and/or downlink data forwarding tunnel information.

The MME determines correspondence relationship between a Qos flow and an E-RAB in the PDU session, or receives the correspondence relationship between a Qos flow and an E-RAB in the PDU session from the AMF.

If the MME performs the determination, the MME notifies the 5GC CP of the correspondence relationship between the Qos flow and the E-RAB in the PDU session. The message includes the Qos flow information included in the PDU session and the E-RAB information to be mapped by the Qos flow in the EPS. The information of the Qos flow (Qos flow information) includes flow identification and/or Qos information corresponding to the flow.

The MME converts the information of the E-RAB in the response message into the information of the PDU session and transmits it to the 5GC CP, or the MME directly transmits the information of the E-RAB to the 5GC CP and the 5GC CP performs the conversion.

Step 611, the 5GC CP requests the anchor UPF to create a data forwarding tunnel.

The anchor UPF is a 5GC UPF performing an anchor function for the PDU session of the UE.

The AMF in the 5GC CP transmits a request message of creating an indirect data forwarding tunnel to the SMF. The message includes information of a PDU session. The information of the PDU session includes PDU session identification, information of a Qos flow or Qos flows included in the PDU session, the EPS bearer(s) in the EPS system that require data forwarding for each PDU session, a mapping relationship between the Qos flow and the EPS bearer, identification of the EPS bearer and/or Qos information of the EPS bearer. The message includes the information for data forwarding received from the MME.

The SMF transmits a forwarding tunnel creation 2 message to the anchor UPF. The message includes information of a PDU session. The information of the PDU session includes PDU session identification, information of a Qos flow or Qos flows included in the PDU session, the EPS bearer(s) in the EPS system that require data forwarding for each PDU session, a mapping relationship between the Qos flow and the EPS bearer, identification of the EPS bearer and/or Qos information of the EPS bearer. The message includes the information for data forwarding received from the AMF.

As for the data forwarding method 1 between the anchor UPF and the SGW, the request message of creating the indirect data forwarding tunnel and a request message for forwarding tunnel creation 2 include information of the E-RAB(s) included in the PDU session. The information of the E-RAB includes identification of the E-RAB and tunnel information for data forwarding of the E-RAB. The 5GC CP notifies the anchor UPF of the mapping between the Qos flow and the E-RAB in the PDU session. The anchor UPF knows the information of the Qos flow in the PDU session in the 5GS, receives the information of the E-RAB and a mapping relationship between the Qos flow and the E-RAB in the PDU session included in the PDU session information from the 5GC CP.

As for the data forwarding method 2 between the anchor UPF and the SGW, the 5GC CP notifies the anchor UPF of the tunnel information for data forwarding of each PDU session.

The anchor UPF allocates the tunnel information for the data forwarding between the 5G-RAN or the 5GC CP and the anchor UPF and transmits it to the 5GC CP. There are two methods for data forwarding between the 5G-RAN and the anchor UPF:

Method A: The 5G-RAN and the anchor UPF performs data forwarding in accordance with one user plane tunnel for each PDU session. As for this data forwarding method, the anchor UPF allocates the tunnel information for each PDU session. The tunnel information includes a transport layer address and a Tunnel Endpoint Identifier (TEID).

Method B: The 5G-RAN and the anchor UPF performs data forwarding in accordance with one user plane tunnel for each E-RAB in each PDU session. As for this data forwarding method, the anchor UPF allocates the tunnel information for each E-RAB in each PDU session. The tunnel information includes a transport layer address and a Tunnel Endpoint Identifier (TEID).

The anchor UPF transmits the allocated tunnel information for data forwarding to the 5GC CP. The SMF receives a forwarding tunnel creation 2 response message from the anchor UPF. The message includes tunnel information for the data forwarding between the 5G-RAN and the anchor UPF allocated by the anchor UPF. The SMF transmits a response message of creating an indirect data forwarding tunnel to the AMF. The message includes tunnel information for the data forwarding between the 5G-RAN and the anchor UPF.

Step 612, if there is a 5GC UPF between the anchor UPF and the 5G-RAN, the 5GC CP requests the 5GC UPF to create the data forwarding tunnel. The 5GC CP transmits the tunnel information for data forwarding allocated by the anchor UPF to the 5GC UPF. The AMF transmits the message to the 5GC UPF through the SMF. The tunnel information corresponds to each PDU session or corresponds to each EPS bearer in each PDU session. The 5GC UPF allocates the tunnel information for the data forwarding between the 5GC UPF and the 5G-RAN and transmits it to the 5GC CP. The 5GC UPF transmits the message to the AMF through the SMF. The tunnel information corresponds to each PDU session or corresponds to each EPS bearer in each PDU session.

The messages in the process of the Step 611 and in the process of the Step 612 may be different messages or the same messages.

Step 613, the 5GC CP transmits a handover command message to the 5G-RAN. The message includes a target-to-source transparent container and tunnel information for data forwarding. The message includes Qos flow(s) accepted for data forwarding. The message further includes information of established PDU session or PDU session(s) and/or information of a PDU session or PDU sessions that is/are unsuccessfully established. The information of the established PDU session includes information of established Qos flow or Qos flow(s) and information of a Qos flow or Qos flows that is/are unsuccessfully established. As for the data forwarding method A between the 5G-RAN and the anchor UPF, the tunnel information for data forwarding corresponds to each PDU session. As for the data forwarding method B between the 5G-RAN and the anchor UPF, the message may further includes information of an E-RAB (E-RABs) in a PDU session, a mapping relationship between a Qos flow and an E-RAB, and/or tunnel information for data forwarding of each E-RAB. If the mapping relationship between the Qos flow and the E-RAB has been notified to the 5G-RAN in the process that the PDU session or GBR Qos flow is established, the step may not include said information.

In the Step 602, the AMF knows the mapping relationship from the Qos flow to the EPS bearer in the PDU session. The AMF knows information of an E-RAB or E-RABs for which downlink data forwarding is accepted by the target E-UTRAN through the Step 610. The AMF can know the information of PDU session(s) and the Qos flow(s) that downlink data forwarding is accepted according to the mapping relationship from the Qos flow to the E-RAB. The AMF may inform information of a PDU session or PDU sessions and a Qos flow or Qos flows for which downlink data forwarding is accepted to 5G-RAN through a handover command. The information of a PDU session and Qos flow for which the downlink data forwarding is accepted includes PDU session identification, downlink data forwarding tunnel information for a PDU session, and/or information of the Qos flow(s) for which downlink data forwarding is accepted in the PDU session. The downlink data forwarding tunnel information for the PDU session is the downlink data forwarding tunnel information assigned by SMF or anchor UPF received in the Step 611 or the downlink data forwarding tunnel information assigned by 5GC UPF received in the Step 612.

In the Step 602, the AMF knows the mapping relationship from the Qos flow to the EPS bearer in the PDU session. The AMF knows information of an E-RAB for which uplink data forwarding is proposed by the target E-UTRAN through the Step 610. The AMF may know the information of the Qos flow that requires uplink data forwarding according to the mapping relationship from the Qos flow to the E-RAB. The AMF may inform information of a PDU session and a Qos flow for which uplink data forwarding is proposed to 5G-RAN through a handover command. The information of the PDU session and the Qos flow for which the uplink data forwarding is proposed includes PDU session identification, uplink data forwarding tunnel information for a PDU session, and/or information of a Qos flow for which uplink data forwarding is proposed in the PDU session. The uplink data forwarding tunnel information for the PDU session is the uplink data forwarding tunnel information received in the Step 611 or the uplink data forwarding tunnel information received in the Step 612.

The AMF may notify the 5G-RAN of information of an E-RAB for which uplink data forwarding is proposed in the PDU session through a handover command. The information of the E-RAB includes identification of the E-RAB and/or tunnel information for uplink data forwarding. The method is adapted to the data forwarding method B between the 5G-RAN and the anchor UPF. The uplink data forwarding tunnel information is the uplink data forwarding tunnel information allocated by the UPF and received in the Step 611 or the uplink data forwarding tunnel information allocated by the 5GC UPF and received in the Step 612. The message includes a type of the handover, and the specific content is the same as that in the Step 602, which will not be repeated here.

Step 614, the 5G-RAN transmits a handover command message to the UE.

The 5G-RAN forwards data to the 5GC UPF or the anchor UPF. As stated in the Step 611, there are two methods for the 5G-RAN to forward data to the 5GC UPF or the anchor UPF, and the 5G-RAN forwards data to the 5GC UPF or the anchor UPF through the corresponding tunnel for the PDU session that requires data forwarding.

As for the data forwarding method B, the 5G-RAN transmits data of each Qos flow to the anchor UPF through the user plane tunnel allocated to the corresponding E-RAB. As for downlink data, the 5G-RAN transmits a downlink data packet to the anchor UPF through the tunnel allocated to the downlink data forwarding. In uplink, if the 5G-RAN accepts uplink data forwarding, there are two methods for the 5G-RAN to transmit an uplink data packet to the anchor UPF:

Method B-1: The 5G-RAN transmits data of all of the Qos flows in the PDU session that accepts the uplink data forwarding to the anchor UPF through the uplink data forwarding tunnel allocated to the EPS bearer corresponding to the Qos flow. The UPF obtains a mapping relationship between the Qos flow and the EPS bearer in the PDU session in the Step 611. The anchor UPF forwards the data of the Qos flow corresponding to the E-RAB for which the uplink data forwarding is proposed by the target E-UTRAN (the anchor UPF receives identification of the uplink data forwarding tunnel allocated by the SGW) to the SGW. The anchor UPF does not forward the data of the Qos flow corresponding to the E-RAB for which the uplink data forwarding is not proposed by the target E-UTRAN (the anchor UPF does not receive identification of the uplink data forwarding tunnel allocated by the SGW) to the SGW.

Method B-2: The 5G-RAN transmits the Qos flow that accepts the data forwarding to the anchor UPF through the uplink data forwarding tunnel allocated to the corresponding E-RAB. The anchor UPF directly forwards data to the SGW.

As for the data forwarding method A, the 5G-RAN transmits data of each Qos flow accepted for data forwarding to the anchor UPF through the user plane tunnel allocated to the PDU session. If there is a 5GC UPF between the 5G-RAN and the anchor UPF, the 5GC UPF forwards the received data to the anchor UPF. As for downlink data, the 5G-RAN transmits a downlink data packet to the anchor UPF through the tunnel allocated to the downlink data forwarding. In uplink, if the 5G-RAN accepts uplink data forwarding, there are two methods for the 5G-RAN to transmit an uplink data packet to the anchor UPF:

Method A-1: The 5G-RAN transmits data of all of the Qos flows in the PDU session that accepts the uplink data forwarding to the anchor UPF through the uplink data forwarding tunnel allocated to the PDU session. The UPF obtains the mapping relationship between the Qos flow and the EPS bearer in the PDU session in the Step 611. The anchor UPF forwards the data of the Qos flow corresponding to the E-RAB for which the uplink data forwarding is proposed by the target E-UTRAN (the anchor UPF receives identification of the uplink data forwarding tunnel allocated by the SGW) to the SGW. The anchor UPF does not forward the data of the Qos flow corresponding to the E-RAB for which the uplink data forwarding is not proposed by the target E-UTRAN (the anchor UPF does not receive identification of the uplink data forwarding tunnel allocated by the SGW) to the SGW Method A-2: The 5G-RAN transmits the Qos flow that accepts the data forwarding to the anchor UPF through the uplink data forwarding tunnel allocated to the corresponding PDU session.

The anchor UPF forwards data to the SGW. The anchor UPF and the SGW have different behaviors' according to the two data forwarding methods between the anchor UPF and the SGW in the Step 609.

Method 1: As for the data forwarding method B between the 5G-RAN and the anchor UPF, since the data forwarding at the interface between the 5G-RAN and the anchor UPF and the interface between the anchor UPF and the SGW is performed according to each EPS bearer in each PDU session, the anchor UPF directly forwards the data received from the 5G-RAN to the SGW through the user plane tunnel allocated to the corresponding EPS bearer. The SGW directly forwards data to the target base station. As for the data forwarding method B-1 between the 5G-RAN and the anchor UPF, the anchor UPF forwards the data of the Qos flow corresponding to the E-RAB for which the uplink data forwarding is proposed by the target E-UTRAN to the SGW, and does not forward the Qos flow corresponding to the E-RAB for which the uplink data forwarding is not proposed by the target E-UTRAN to the SGW. As for the data forwarding method A between the 5G-RAN and the anchor UPF, the anchor UPF forwards data of the different Qos flows in the PDU session to the SGW through the user plane tunnel allocated to the corresponding EPS bearer, according to the mapping relationship between the Qos flow and the EPS bearer. The anchor UPF knows the Qos flow(s) that the data forwarding is accepted according to the mapping relationship between the Qos flow and the EPS bearer and the information of the EPS bearer(s) that the data forwarding is accepted, and forwards data of the Qos flow that the data forwarding is accepted to the SGW through the user plane tunnel allocated to the mapped EPS bearer. As for the Qos flow that the data forwarding is not accepted, there is no corresponding data forwarding tunnel, and the UPF discards the data. The SGW directly forwards data to the target base station. As for the data forwarding method A-1 between the 5G-RAN and the anchor UPF, the anchor UPF forwards the data of the Qos flow corresponding to the E-RAB for which the uplink data forwarding is proposed by the target E-UTRAN to the SGW, and does not forward the Qos flow corresponding to the E-RAB for which the uplink data forwarding is not proposed by the target E-UTRAN to the SGW.

Method 2: As for the data forwarding method A between the 5G-RAN and the anchor UPF, the anchor UPF transmits the data received from the tunnels corresponding to the same PDU session to the SGW through one tunnel, and the SGW performs mapping from the PDU session to the EPS bearer and/or mapping from the Qos flow in the PDU session to the EPS bearer.

The 5G-RAN and the anchor UPF performs data forwarding in accordance with one user plane tunnel for each E-RAB in each PDU session, and the data forwarding between the anchor UPF and the 5G-RAN is also performed according to the method of each user plane tunnel for each EPS bearer in each PDU session.

The SGW forwards data to the E-UTRAN. The SGW have different actions according to the two data forwarding methods between the anchor UPF and the SGW.

Method 1: The SGW transmits the data received from the anchor UPF in the tunnel corresponding to each EPS bearer to the E-UTRAN through the corresponding tunnel allocated by the E-UTRAN, that is, the anchor UPF performs mapping from one tunnel to multiple tunnels. The SGW forwards data to the E-UTRAN in accordance with a session transmission method in the EPS.

Method 2: The SGW receives data from the tunnel corresponding to each PDU session of the anchor UPF. The SGW performs the mapping from the PDU session and/or the Qos flow in the PDU session to the E-RAB according to the information received in the Step 609, for example, how many of the E-RABs the PDU session uses to transmit downlink data to the E-UTRAN, and which E-RAB is used by the Qos flow in the PDU session to transmit the downlink data to the E-UTRAN.

In a process that a PDU session or a GRB Qos flow is established, the UE receives, from a network, EPS Qos information and/or EPS bearer identification information, to which a Qos flow is mapped. The UE correlates the ongoing Qos flow with the identification of the EPS bearer included in the handover command message. As for the Qos flows that does not have the corresponding EPS bearer identification, the UE may delete it.

Step 615, the UE transmits a handover completion message to the E-UTRAN.

Step 616, the E-UTRAN transmits the handover completion message to the MME. The message includes the tunnel information for the downlink data transmission allocated by the E-UTRAN.

Step 617, the MME transmits a bearer modification request message to the SGW. The message includes the tunnel information for the downlink data transmission over the S1 interface.

Step 618, the SGW transmits the bearer modification request message to the 5GC CP. Here, a function entity in the 5GC CP directly communicating with the SGW is a SMF.

The SMF may further include a function of PGW control plane. The SGW allocates tunnel information for the downlink data transmission between the SGW and the anchor UPF, and the tunnel information corresponds to each EPS bearer or each PDU session.

Step 619, the 5GC CP requests the anchor UPF to modify the session. Here, a function entity in the 5GC CP directly communicating with the anchor UPF is a SMF. The SMF may further include a function of PGW control plane. The 5GC CP transmits the tunnel information for the downlink data transmission between the SGW and the anchor UPF allocated by the SGW to the anchor UPF, and the tunnel information corresponds to each EPS bearer or each PDU session. The anchor UPF transmits a session modification response to the 5GC CP. The anchor UPF allocates the tunnel information for uplink data transmission between the SGW and the anchor UPF, and transmits the tunnel information for the uplink data transmission to the 5GC CP.

Step 620, the 5GC CP transmits a bearer modification response message to the SGW. The message includes the tunnel information for the uplink data transmission between the SGW and the anchor UPF.

Step 621, the SGW transmits the bearer modification response message to the MME. So far, the description of the fourth handover method supported by the present disclosure is completed. According to the method, the problem of the handover from the 5GS to the EPS is resolved, the data loss is avoided, and the service continuity is guaranteed.

FIG. 7 is a diagram illustrating a radio access network handover method according to another exemplary embodiment of the present disclosure. The method is used to support direct data forward during a process of handing over from an NGS or a 5GS to an EPS. The method describes a method for downlink data forwarding and a method for uplink data forwarding simultaneously. In the practical application, it is possible to only perform the downlink data forwarding without performing the uplink data forwarding. Regarding this case, the method for the uplink data forwarding may be omitted. The method includes the following steps:

Step 701, a 5G-RAN decides to hand over a UE to an E-UTRAN.

Here, the E-UTRAN may be an eNB connected to an EPC. The 5G-RAN may be a gNB or an eNB connected to a 5GC or a centralized unit (CU) in a gNB.

A user plane path before the handover is anchor UPF, non-terminal 5GC UPF and 5G-RAN. The non-terminal 5GC UPF is selectable. The SGW is required to support an interface with the anchor UPF. The anchor UPF may be in an NGC or EPC or a common entity. The anchor UPF may be a 5GC UPF serving the UE and performs a function of an anchor of user planes in an inter-RAT handover process. The anchor UPF may be a function of a PGW plus the 5GC UPF or a function of the 5GC UPF plus the PGW and performs a function of an anchor of user planes in the inter-RAT handover process.

There are one or more ongoing PDU sessions for the UE. Each of the PDU session includes one or more Qos flows. In a process that a PDU session or a Guaranteed Business Rate (GRB) Qos flow is established, the mapped EPS Qos information and/or EPS bearer identification is/are allocated to a Qos flow. Non-Guaranteed Business Rate (non-GBR) Qos flows are mapped to default EPS bearers. The GRB Qos flows are mapped to EPS specified bearers. The EPS Qos information and/or the EPS bearer identification to which the Qos flow is mapped is/are allocated by a PCC or SMF. In order to support the inter-system handover, the SMF may further include a function of PGW control plane. In a scene that a PCC is deployed, a Policy Control Function (PCF) provides an EPS Qos and/or EPS bearer identification to which the Qos flow is mapped to the SMF. In order to support the inter-system handover, the PCF may further include a Policy and Charging Rules Function (PCRF) thereon. The SMF transmits the EPS Qos information and/or the EPS bearer identification to which the Qos flow is mapped to the UE through the AMF, for example, a message of establishing a PDU session is transmitted to the UE through a non-access stratum message. In a process that a PDU session or a GRB Qos flow is established, the SMF may further transmit the EPS Qos information and/or E-RAB identification to which the Qos flow is mapped to the 5G-RAN through the AMF. The 5G-RAN may transmit the EPS Qos information and/or the E-RAB identification to which the Qos flow is mapped to the UE through a Radio Resource Control (RRC) message. An E-RAB and an EPS bearer are the same or correspond to each other. It is called as an EPS bearer in a core network, and called as an E-RAB in an access network. Identification of an E-RAB and identification of an EPS bearer are the same or correspond to each other. It is identification of an EPS bearer in a core network, and identification of an E-RAB in an access network.

Step 702, the 5G-RAN transmits a handover required message to a 5GC CP. The message includes identification of a target eNB and a source-to-target transparent container. The 5G-RAN notifies the 5GC CP of whether the direct data forward is available through the message. The 5G-TRAN determines whether the direct data forward is available according to whether an interface exists between the gNB and the target eNB, and the 5G-RAN may consider other factors to determine whether the direct data forward is available. The message further includes identification information indicating an MM to which the target eNB is connected. The identification information may be tracking area identification, or MME identification.

The 5G-RAN notifies the 5GC CP of a type of the handover. The type of the handover includes a handover inside NR, a handover from NR to LTE, a handover from NR to UTRAN, and a handover from NR to GERAN and/or GSM. As for the handover from NR to LTE, the 5G-RAN notifies the 5GC CP whether a target base station of the handover is a base station connected to a 5G core network or whether the handover is the inter-system handover, because an LTE base station eNB may support an interface with the 5GC, or may not support the interface with the 5GC. If the target base station is also connected to the 5GC, it is the handover inside the 5GS. If the target base station is not connected to the 5GC but to the EPC, it is the inter-system handover. A method of the 5G-RAN for notifying the 5GC CP is the same as that in the Step 602, which will not be repeated here.

A method of the 5G-RAN for knowing whether the eNB supports an interface with the 5GC is the same as that in the Step 602, which will not be repeated here.

If a base station within which a target cell to hand over is located is the eNB that does not support the interface with 5GC, the 5G-RAN includes a source eNB to a target eNB transparent container in the handover required message. According to identification of E-RAB to which a Qos flow is mapped obtained from the core network by the 5G-RAN in the process that the PDU session or the GBR Qos flow is established, the 5G-RAN includes a list of information of the E-RAB or E-RABs in the source eNB to the target eNB transparent container. Wherein the information of the E-RAB includes identification of the E-RAB; the source eNB to the target eNB transparent container further includes a RRC container. Content in the RRC container is organized according to handover preparation of the LTE. The source-to-target transparent container includes content of the source eNB to the target eNB transparent container.

If a base station within which a target cell to hand over is located is the eNB that supports the interface with the 5GC, the 5G-RAN includes a source eNB to a target eNB transparent container 2 in the handover required message. The 5G-RAN includes a list of information of a PDU session or PDU sessions in the source eNB to the target eNB transparent container 2. The information of the PDU session includes PDU session identification, information of a Qos flow or Qos flows and/or a mapping relationship from the Qos flow to a DRB. The source eNB to the target eNB transparent container 2 further includes a RRC container. Content in the RRC container is organized according to handover preparation of the LTE. The source-to-target transparent container includes content of the transparent container 2 from a source eNB to a target eNB.

The 5GC CP as stated in the Description of the Related Art may be further divided into an AMF function entity and an SMF function entity. An interface of the 5G-RAN an the 5GC CP is an interface with the AMF, thus, the described messages or procedures of the interface of the 5G-RAN with the 5GC CP are messages or processes between the 5G-RAN and the AMF. An interface of the 5GC CP with the MME is an interface of the AMF and the MME, thus, the described messages or procedures of the interface of the 5GC CP and the MME are messages or processes between the AMF and the MME. An interface of the 5GC CP with an anchor UPF is an interface of the SMF and the anchor UPF, thus, the described messages or procedures of the interface of the 5GC CP and the anchor UPF are messages or processes between the SMF and the anchor UPF; and the AMF transmits messages to the SMF, and the SMF communicates with the anchor UPF. Similarly, an interface of the 5GC CP and the 5GC UPF is an interface of the SMF and the 5GC UPF; and the AMF transmit messages to the SMF, and the SMF and the 5GC UPF communicate with each other, wherein the 5GC UPF may be called as UPF. In order to support the inter-system handover, the SMF may further include a function of PGW control plane. The AMF transmits a SM context request message to the SMF. According to the received information in the handover required message, the AMF knows that the handover is the inter-system handover, and requests the SMF to provide a SM context. The AMF may further request for an EPS bearer context. The AMF transmits the message to each SMF that serves the UE. The each SMF transmits a SM context response message to the AMF. The message includes a SM context of the UE. The SM context further includes the mapped EPS bearer context, such as identification of the EPS bearer and/or Qos information of the EPS. If the SMF has the mapped EPS bearer context when the AMF requests for the SM context, the SMF always return the mapped EPS bearer context to the AMF at the same time. Or, the SMF transmits the mapped EPS bearer context to the AMF while the AMF requests the mapped EPS context.

Step 703, the 5GC CP transmits a relocation request message to the MME. The 5GC CP selects and finds out the MME according to the identification information indicating the MME to which the target eNB is connected included in the handover required message. The message includes identification of the target eNB, a source-to-target transparent container, 5GS UE context information or the mapped EPS UE context information. The 5GS UE context information or the mapped EPS UE context information includes context information of Mobile Management (MM) of the UE and a session management (SM) context.

If the 5GC CP receives from the 5G-RAN that the direct data forward is available, the 5GC CP notifies this information to the MME. If the direct data forwarding is unavailable (for example, the 5GC CP does not receive from the 5G-RAN an indication indicating that the direct data forwarding is available), the 5GC CP or MME determines whether indirect data forwarding is available. If the 5GC performs the determination and indirect data forwarding is unavailable, the 5GC CP notifies this information to the MME.

If the data forwarding is available, there are two methods for determining whether the direct data forwarding or the indirect data forwarding is used in the present disclosure. One method is that the determination is made by the 5GC CP. The 5GC CP determines whether the direct data forward or the indirect data forward is performed according to whether factors of direct data forward available information and so on are received from the 5G-RAN. The 5GC CP directly transmits a result of the determination to the MME. The other method is that the 5GC CP transmits information indicating whether the direct data forward is available received from the 5G-RAN to the MME, and the MME determines whether the direct data forward or the indirect data forward is performed. The 5GC CP may also transmit information indicating that the data forward is unavailable to the MME, and the MME may determine that the data forward is not performed according to the received information.

If it is determined that the indirect data forward is performed, the specific indirect data forward methods and influences on the subsequent respective processes and steps in order to support the indirect data forward are the same as those in FIG. 6, which will not be repeated here.

The present disclosure emphasizes influences on the subsequent respective steps if it is determined that the direct data forwarding is performed.

The 5GC CP notifies the MME of information of a Qos flow included by a PDU session.

If the MME receives the 5GS UE context from the 5GC CP, Step 704 is executed, otherwise the Step 704 does not need to be executed.

Step 704, the MME converts the received 5GS UE context into an EPS UE context.

Step 705, the MME transmits a session creation request message to an SGW. The message includes EPS bearer context information.

It needs to explain that the E-RAB and the EPS bearer have a one-to-one correspondence relationship in an LTE system. The EPS bearer is a concept of a core network or a concept of a non-access stratum, and the E-RAB is a concept of an access stratum. Thus, the E-RAB and the EPS in the present disclosure both refer to a concept of bearer in the LTE system.

Step 706, the SGW transmits a session creation response message to the MME. The message includes tunnel information for uplink data transmission of a S1 interface allocated by the SGW.

Step 707, the MME transmits the handover request message to the E-UTRAN. The message includes a source-to-target transparent container, and an E-RAB context. The E-RAB context includes an E-RAB to be established and uplink tunnel information over the S1 interface allocated by the SGW. The message includes a type of the handover, and the specific content is the same as that in the Step 602, which will not be repeated here.

The MME determines a mapping relationship from the PDU session to the E-RAB or a mapping relationship from the Qos flow in the PDU session to the E-RAB.

The message includes information of the PDU session. The information of the PDU session includes identification of a PDU session, information of a Qos flow in the PDU session, information of an E-RAB (E-RABs) in the PDU session, and/or correspondence relationship between the Qos flow and the E-RAB in the PDU session. The Qos flow information in the PDU session includes Qos flow identification and/or Qos information of the Qos flow. The E-RAB information in the PDU session includes identification of the E-RAB. The correspondence relationship between the Qos flow and the E-RAB in the PDU session includes information indicating which E-RAB each Qos flow is mapped to.

Step 708, the E-UTRAN transmits a handover request confirmation message to the MME. The message includes a list of established E-RABs, a list of E-RABs that are unsuccessfully established, and a target-to-source transparent container. As for the established RAB, it further includes the tunnel information for downlink data transmission over the S1 interface. The message includes the tunnel information for data forward of the interface between the 5G-RAN and the E-UTRAN allocated by the E-UTRAN to each PDU session that requires data forward. The tunnel information for direct data forwarding allocated to each PDU session may be included in an AP message of an access stratum of an interface between the E-UTRAN and the MME, or may be included in the target-to-source transparent container. The E-UTRAN may identify that one data forward tunnel is allocated to each PDU session by setting that the tunnels for data forward of each E-RAB in the same PDU session are the same, or it may indicate the data forward tunnel allocated to the PDU session by including new information element in the handover request confirmation message.

Step 709, the MME transmits a relocation response message to the 5GC CP. The message includes a target-to-source transparent container.

The MME determines correspondence relationship between a Qos flow and an E-RAB in the PDU session, or receives the correspondence relationship between a Qos flow and an E-RAB in the PDU session from the AMF.

If the MME performs the determination, the MME notifies the 5GC CP of the correspondence relationship between the Qos flow and the E-RAB in the PDU session.

The message includes the Qos flow information included in the PDU session and the E-RAB information to be mapped by the Qos flow in the EPS. The information of the Qos flow (Qos flow information) includes flow identification and/or Qos information corresponding to the flow.

The message includes the tunnel information for data forward of the interface between the 5G-RAN and the E-UTRAN allocated by the E-UTRAN to each PDU session that requires data forward.

The MME converts the information of the E-RAB in the response message into the information of the PDU session and transmits it to the 5GC CP, or the MME directly transmits the information of the E-RAB to the 5GC CP and the 5GC CP performs the conversion.

Step 710, the 5GC CP transmits a handover command message to the 5G-RAN. The message includes a target-to-source transparent container. The message includes the tunnel information for data forward of the interface between the 5G-RAN and the E-UTRAN allocated by the E-UTRAN to each PDU session that requires data forward. The message includes a type of the handover, and the specific content is the same as that in the Step 602, which will not be repeated here.

Step 711, the 5G-RAN transmits a handover command message to the UE.

The 5G-RAN forwards data to the E-UTRAN. The data belonging to the same PDU session is forwarded through one tunnel. The E-UTRAN firstly transmits the forwarded data to the UE, and then transmits the data received from the SGW to the UE. The E-UTRAN determines mapping the received PDU session data to a DRB. The E-UTRAN determines mapping the received PDU session data to the DRB according to the received mapping relationship from the Qos flow to the E-RAB in the PDU session. The 5G-RAN determines the data of which Qos flow in the PDU session is mapped to which DRB. The E-UTRAN maps the E-RAB received from the SGW to the DRB. This may guarantee the service continuity and avoid the data loss.

In a process that a PDU session or a GRB Qos flow is established, the UE receives, from a network, EPS Qos information and/or EPS bearer identification information to which a Qos flow is mapped. The UE correlates the ongoing Qos flow with the identification of the EPS bearer included in the handover request message. As for the EPS bearer that does not have the corresponding Qos flow, the UE may delete it.

Step 712, the UE transmits a handover completion message to the E-UTRAN.

Step 713, the E-UTRAN transmits the handover completion message to the MME. The message includes the tunnel information for the downlink data transmission allocated by the E-UTRAN.

Step 714, the MME transmits a bearer modification request message to the SGW. The message includes the tunnel information for the downlink data transmission over the S1 interface.

Step 715, the SGW transmits the bearer modification request message to the 5GC CP. Here, a function entity in the 5GC CP directly communicating with the SGW is a SMF. The SMF may further include a function of PGW control plane. The SGW allocates tunnel information for the downlink data transmission between the SGW and the anchor UPF, and the tunnel information corresponds to each EPS bearer or each PDU session.

Step 716, the 5GC CP requests the anchor UPF to modify a session. Here, a function entity in the 5GC CP directly communicating with the anchor UPF is a SMF. The SMF may further include a function of PGW control plane. The 5GC CP transmits the tunnel information for the downlink data transmission between the SGW and the anchor UPF allocated by the SGW to the anchor UPF, and the tunnel information corresponds to each EPS bearer or each PDU session. The anchor UPF transmits a session modification response to the 5GC CP. The anchor UPF allocates the tunnel information for uplink data transmission between the SGW and the anchor UPF, and transmits the tunnel information for the uplink data transmission to the 5GC CP.

Step 717, the 5GC CP transmits the bearer modification response message to the SGW. The message includes the tunnel information for the uplink data transmission between the SGW and the anchor UPF allocated by the anchor UPF Step 718, the SGW transmits the bearer modification response message to the MME.

So far, the description of the fourth handover method supported by the present disclosure is completed. According to the method, the problem of the handover from the 5GS to the EPS is resolved, the data loss is avoided, and the service continuity is guaranteed.

FIG. 8 is a diagram illustrating a radio access network handover method according to another exemplary embodiment of the present disclosure. The method is used to support indirect data forwarding during a process of handing over from an NGS or a 5GS to an EPS. The method describes a method for downlink data forwarding and a method for uplink data forwarding simultaneously. In the practical application, it is possible to only perform the downlink data forwarding without performing the uplink data forwarding. Regarding this case, the method for the uplink data forwarding may be omitted. The method includes the following steps:

Step 801, a 5G-RAN decides to hand over a UE to an E-UTRAN.

Here, the E-UTRAN may be an eNB connected to an EPC. The 5G-RAN may be a gNB or an eNB connected to a 5GC or a centralized unit (CU) in a gNB.

A user plane path before the handover is anchor UPF, non-terminal 5GC UPF and 5G-RAN. The non-terminal 5GC UPF is selectable. The SGW is required to support an interface with the anchor UPF. The anchor UPF may be in an NGC or EPC or a common entity. The anchor UPF may be a 5GC UPF serving the UE and performs a function of an anchor of user planes in an inter-RAT handover process. The anchor UPF may be a function of a PGW plus the 5GC UPF or a function of the 5GC UPF plus the PGW and performs a function of an anchor of user planes in the inter-RAT handover process.

There are one or more ongoing PDU sessions for the UE. Each of the PDU session includes one or more Qos flows. In a process that a PDU session or a Guaranteed Business Rate (GRB) Qos flow is established, the mapped EPS Qos information and/or EPS bearer identification is/are allocated to a Qos flow. Non-Guaranteed Business Rate (non-GBR) Qos flows are mapped to default EPS bearers. The GRB Qos flows are mapped to EPS specified bearers. The EPS Qos information and/or the EPS bearer identification to which the Qos flow is mapped is/are allocated by a PCC or SMF. In order to support the inter-system handover, the SMF may further include a function of PGW control plane. In a scene that a PCC is deployed, a Policy Control Function (PCF) provides an EPS Qos and/or EPS bearer identification to which the Qos flow is mapped to the SMF. In order to support the inter-system handover, the PCF may further include a Policy and Charging Rules Function (PCRF) thereon. The SMF transmits the EPS Qos information and/or the EPS bearer identification to which the Qos flow is mapped to the UE through the AMF, for example, a message of establishing a PDU session is transmitted to the UE through a non-access stratum message. In a process that a PDU session or a GRB Qos flow is established, the SMF may further transmit the EPS Qos information and/or E-RAB identification to which the Qos flow is mapped to the 5G-RAN through the AMF. The 5G-RAN may transmit the EPS Qos information and/or the E-RAB identification to which the Qos flow is mapped to the UE through a Radio Resource Control (RRC) message. An E-RAB and an EPS bearer are the same or correspond to each other. It is called as an EPS bearer in a core network, and called as an E-RAB in an access network. Identification of an E-RAB and identification of an EPS bearer are the same or correspond to each other. It is identification of an EPS bearer in a core network, and identification of an E-RAB in an access network.

Step 802, the 5G-RAN transmits a handover required message to a 5GC CP. The message includes identification of a target eNB and a source-to-target transparent container. The 5G-RAN notifies the 5GC CP of whether the direct data forward is available through the message. The 5G-TRAN determines whether the direct data forward is available according to whether an interface exists between the gNB and the target eNB, and the 5G-RAN may consider other factors to determine whether the direct data forward is available. The message further includes identification information indicating an MM to which the target eNB is connected. The identification information may be tracking area identification, or MME identification.

The 5G-RAN notifies the 5GC CP of a type of the handover. The type of the handover includes a handover inside NR, a handover from NR to LTE, a handover from NR to UTRAN, and a handover from NR to GERAN and/or GSM. As for the handover from NR to LTE, the 5G-RAN notifies the 5GC CP whether a target base station of the handover is a base station connected to a 5G core network or whether the handover is the inter-system handover, because an LTE base station eNB may support an interface with the 5GC, or may not support the interface with the 5GC. If the target base station is also connected to the 5GC, it is the handover inside the 5GS. If the target base station is not connected to the 5GC but to the EPC, it is the inter-system handover. A method of the 5G-RAN for notifying the 5GC CP is the same as that in the Step 602, which will not be repeated here.

A method of the 5G-RAN for knowing whether the eNB supports an interface with the 5GC is the same as that in the Step 602, which will not be repeated here.

If a base station within which a target cell to hand over is located is the eNB that does not support the interface with 5GC, the 5G-RAN includes a source eNB to a target eNB transparent container in the handover required message. According to identification of E-RAB to which a Qos flow is mapped obtained from the core network by the 5G-RAN in the process that the PDU session or the GBR Qos flow is established, the 5G-RAN includes a list of information of the E-RAB or E-RABs in a source eNB to a target eNB transparent container. Wherein the information of the E-RAB includes identification of the E-RAB; The source eNB to the target eNB transparent container further includes a RRC container. Content in the RRC container is organized according to handover preparation of the LTE. The source-to-target transparent container includes content of the source eNB to the target eNB transparent container.

If a base station within which a target cell to hand over is located is the eNB that supports the interface with the 5GC, the 5G-RAN includes a source eNB to a target eNB transparent container 2 in the handover required message. The 5G-RAN includes a list of information of a PDU session or PDU sessions in the source eNB to the target eNB transparent container 2. The information of the PDU session includes PDU session identification, information of a Qos flow or Qos flows and/or a mapping relationship from the Qos flow to a DRB. The transparent container 2 from a further includes a RRC container. Content in the RRC container is organized according to handover preparation of the LTE. The source-to-target transparent container includes content of the source eNB to the target eNB transparent container 2.

The 5GC CP as stated in the Description of the Related Art may be further divided into an AMF function entity and an SMF function entity. An interface of the 5G-RAN an the 5GC CP is an interface with the AMF, thus, the described messages or procedures of the interface of the 5G-RAN with the 5GC CP are messages or processes between the 5G-RAN and the AMF. An interface of the 5GC CP with the MME is an interface of the AMF and the MME, thus, the described messages or procedures of the interface of the 5GC CP and the MME are messages or processes between the AMF and the MME. An interface of the 5GC CP with an anchor UPF is an interface of the SMF and the anchor UPF, thus, the described messages or procedures of the interface of the 5GC CP and the anchor UPF are messages or processes between the SMF and the anchor UPF; and the AMF transmits messages to the SMF, and the SMF communicates with the anchor UPF. Similarly, an interface of the 5GC CP and the 5GC UPF is an interface of the SMF and the 5GC UPF; and the AMF transmit messages to the SMF, and the SMF and the 5GC UPF communicate with each other, wherein the 5GC UPF may be called as UPF. In order to support the inter-system handover, the SMF may further include a function of PGW control plane. The AMF transmits a SM context request message to the SMF. According to the received information in the handover required message, the AMF knows that the handover is the inter-system handover, and requests the SMF to provide a SM context. The AMF may further request for an EPS bearer context. The AMF transmits the message to each SMF that serves the UE. The each SMF transmits a SM context response message to the AMF. The message includes a SM context of the UE. The SM context further includes the mapped EPS bear context, such as identification of the EPS bearer and/or Qos information of the EPS. If the SMF has the mapped EPS bearer context when the AMF requests for the SM context, the SMF always return the mapped EPS bearer context to the AMF at the same time. Or, the SMF transmits the mapped EPS bearer context to the AMF while the AMF requests the mapped EPS context.

Step 803, the 5GC CP transmits a relocation request message to the MME. The 5GC CP selects and finds out the MME according to the identification information indicating the MME to which the target eNB is connected included in the handover required message. The message includes identification of the target eNB, a source-to-target transparent container, and 5GS UE context information or the mapped EPS UE context information. The 5GS UE context information or the mapped EPS UE context information includes context information of Mobile Management (MM) of the UE and a session management (SM) context.

If the 5GC CP receives from the 5G-RAN that the direct data forward is available, the 5GC CP notifies this information to the MME. If the direct data forwarding is unavailable (for example, the 5GC CP does not receive from the 5G-RAN an indication indicating that the direct data forwarding is available, the 5GC CP or MME determines whether indirect data forwarding is available. If the 5GC performs the determination and indirect data forwarding is unavailable, the 5GC CP notifies this information to the MME.

If the data forwarding is available, there are two methods for determining whether the direct data forwarding or the indirect data forwarding is used in the present disclosure. One method is that the determination is made by the 5GC CP. The 5GC CP determines whether the direct data forward or the indirect data forward is performed according to whether factors of direct data forward available information and so on are received from the 5G-RAN. The 5GC CP directly transmits a result of the determination to the MME. The other method is that the 5GC CP transmits information indicating whether the direct data forward is available received from the 5G-RAN to the MME, and the MME determines whether the direct data forward or the indirect data forward is performed. The 5GC CP may also transmit information indicating that the data forward is unavailable to the MME, and the MME may determine that the data forward is not performed according to the received information.

If it is determined that the indirect data forward is performed, the specific indirect data forward methods and influences on the subsequent respective processes and steps in order to support the indirect data forward are the same as those in FIG. 6, which will not be repeated here.

The present disclosure emphasizes influences on the subsequent respective steps if it is determined that the direct data forwarding is performed.

The 5GC CP notifies the MME of information of a Qos flow included by a PDU session.

If the MME receives the 5GS UE context from the 5GC CP, Step 804 is executed, otherwise the Step 804 does not need to be executed.

Step 804, the MME converts the received 5GS UE context into an EPS UE context.

Step 805, the MME transmits a session creation request message to an SGW. The message includes EPS bearer context information.

It needs to explain that the E-RAB and the EPS bearer have a one-to-one correspondence relationship in an LTE system. The EPS bearer is a concept of a core network or a concept of a non-access stratum, and the E-RAB is a concept of an access stratum. Thus, the E-RAB and the EPS in the present disclosure both refer to a concept of bearer in the LTE system.

Step 806, the SGW transmits a session creation response message to the MME. The message includes tunnel information for uplink data transmission over a S1 interface allocated by the SGW.

Step 807, the MME transmits the handover request message to the E-UTRAN. The message includes a source-to-target transparent container, and an E-RAB context. The E-RAB context includes an E-RAB to be established and uplink tunnel information over a S1 interface allocated by the SGW. The message includes a type of the handover, and the specific content is the same as that in the Step 602, which will not be repeated here.

The MME determines a mapping relationship from the PDU session to the E-RAB or a mapping relationship from the Qos flow in the PDU session to the E-RAB.

Step 808, the E-UTRAN transmits a handover request confirmation message to the MME. The message includes a list of established E-RABs, a list of E-RABs that are unsuccessfully established, and a target-to-source transparent container. As for the established RAB, it further includes the tunnel information for downlink data transmission over the S1 interface. The message includes the tunnel information for data forwarding of the interface between the 5G-RAN and the E-UTRAN allocated by the E-UTRAN to each E-RAB that requires data forwarding. The tunnel information for direct data forwarding allocated to each E-RAB that requires data forwarding may be included in an AP message of an access stratum of an interface between the E-UTRAN and the MME, or may be included in the target-to-source transparent container.

Step 809, the MME transmits a relocation response message to the 5GC CP. The message includes a target-to-source transparent container.

The MME determines correspondence relationship between a Qos flow and an E-RAB in the PDU session, or receives the correspondence relationship between a Qos flow and an E-RAB in the PDU session from the AMF.

If the MME performs the determination, the MME notifies the 5GC CP of the correspondence relationship between the Qos flow and the E-RAB in the PDU session. The message includes information of an E-RAB (E-RABs) included in the PDU session. wherein the information of the E-RAB includes identification of the E-RAB; The message includes the tunnel information for data forward of the interface between the 5G-RAN and the E-UTRAN allocated by the E-UTRAN to each E-RAB that requires data forward.

The message includes the Qos flow information included in the PDU session and the E-RAB information to be mapped by the Qos flow in the EPS. The information of the Qos flow (Qos flow information) includes flow identification and/or Qos information corresponding to the flow.

The MME converts the information of the E-RAB in the response message into the information of the PDU session and transmits it to the 5GC CP, or the MME directly transmits the information of the E-RAB to the 5GC CP and the 5GC CP performs the conversion.

Step 810, the 5GC CP transmits a handover command message to the 5G-RAN. The message includes a combination of one or more of the flowing information:
  a target-to-source transparent container; and
  information of an accepted PDU session or PDU sessions, wherein the information of the PDU session includes PDU session identification, information of a PDU flow or PDU flows accepted by the PDU session, information of an unaccepted PDU flow or PDU flows. The message includes information of an E-RAB (E-RABs) included in a PDU session and/or a mapping relationship from a Qos flow to an E-RAB in the PDU session. If the mapping relationship between the Qos flow and the E-RAB has been notified to the 5G-RAN in the process that the PDU session or GBR Qos flow is established, the step may include said information. The information of the E-RAB includes identification of the E-RAB and/or user plane tunnel information allocated for direct data forwarding. The information of the PDU session further includes the tunnel information for direct data forwarding allocated to each E-RAB that requires data forwarding in the PDU session. The direct data forwarding is performed through an interface Xx (an interface between the eNB and the gNB), an interface X2, or an interface Xn. The interface X2 is an interface between the eNBs regardless of whether the core network connected to the eNBs is the EPC or the 5GC, or an interface between the eNB and the gNB. The tunnel information for direct data forwarding allocated to each E-RAB may be included in an AP message of an access stratum of an interface between the 5G-RAN and the 5GC CP, or may be included in the target-to-source transparent container;

The message includes information of a Qos flow or Qos flows included in the PDU session or the PDU sessions and information of an E-RAB or E-RABs to which the Qos flow or the Qos flows is mapped in the EPS. The information of the Qos flow or the Qos flows (Qos flow information) includes flow identification and/or Qos information corresponding to the flow or flows.

A list of information of an established PDU session or PDU sessions that is/are unaccepted. The PDU session information list includes identification of a PDU session or PDU sessions and reasons for being un-accepted.

The message includes a type of the handover, and the specific content is the same as that in the Step 602, which will not be repeated here.

Step 811, the 5G-RAN transmits a handover command message to the UE.

The 5G-RAN forwards data to the E-UTRAN. The 5G-RAN forwards the data belonging to the same PDU session to the E-UTRAN through the tunnels allocated to different E-RABs. The 5G-RAN forwards the data of the same PDU session through the tunnels corresponding to different E-RABs according to the received E-RAB list included in the PDU session or the mapping relationship between the Qos flow and the E-RAB in the PDU session to the E-UTRAN. The E-UTRAN firstly transmits the forwarded data to the UE, and then transmits the data received from the SGW to the UE. The E-UTRAN determines mapping the received E-RAB data to a DRB. The E-UTRAN maps the E-RAB data received from the SGW to the DRB. This may guarantee the service continuity and avoid the data loss.

In a process that a PDU session or a GRB Qos flow is established, the UE receives, from a network, EPS Qos information and/or identification information of an EPS bearer, to which a Qos flow is mapped. The UE correlates the ongoing Qos flow with the identification of the EPS bearer included in the handover command message. As for the EPS bearer that does not have the corresponding Qos flow, the UE may delete it.

Step 812, the UE transmits a handover completion message to the E-UTRAN.

Step 813, the E-UTRAN transmits the handover completion message to the MME. The message includes the tunnel information for the downlink data transmission allocated by the E-UTRAN.

Step 814, the MME transmits a bearer modification request message to the SGW. Here, a function entity in the 5GC CP directly communicating with the SGW is a SMF. The SMF may further include a function of PGW control plane. The message includes the tunnel information for the downlink data transmission over the S1 interface.

Step 815, the SGW transmits the bearer modification request message to the 5GC CP. Here, a function entity in the 5GC CP directly communicating with the SGW is a SMF. The SMF may further include a function of PGW control plane. The SGW allocates tunnel information for the downlink data transmission between the SGW and the anchor UPF, and the tunnel information corresponds to each EPS bearer or each PDU session.

Step 816, the 5GC CP requests the anchor UPF to modify a session. Here, a function entity in the 5GC CP directly communicating with the anchor UPF is a SMF. The SMF may further include a function of PGW control plane. The 5GC CP transmits the tunnel information for the downlink data transmission between the SGW and the anchor UPF allocated by the SGW to the anchor UPF, and the tunnel information corresponds to each EPS bearer or each PDU session. The anchor UPF transmits a session modification response to the 5GC CP. The anchor UPF allocates the tunnel information for uplink data transmission between the SGW and the anchor UPF, and transmits the tunnel information for the uplink data transmission to the 5GC CP.

Step 817, the 5GC CP transmits the bearer modification response message to the SGW. The message includes the tunnel information for the uplink data transmission between the SGW and the anchor UPF allocated by the anchor UPF Step 818, the SGW transmits the bearer modification response message to the MME.

So far, the description of the sixth handover method supported by the present disclosure is completed. According to the method, the problem of the handover from the 5GS to the EPS is resolved, the data loss is avoided, and the service continuity is guaranteed.

The radio access network handover method as mentioned above is further described in aspects of system, base station and UE, respectively, in order to understand the conception of the present disclosure more comprehensively from respective aspects.

Firstly, the radio access network handover method of FIGS. 3-5 is further described in aspects of an EPS and a 5GS by referring to FIGS. 9 and 10, respectively. It should be understood that FIGS. 9 and 10 are combinations of FIGS. 3-5. FIG. 9 describes the radio access network handover method of FIGS. 3-5 in an aspect of an EPS, while FIG. 10 describes the radio access network handover method of FIGS. 3-5 in an aspect of a 5GS. Thus, the description and explanations for the related terms, steps and so on in FIGS. 3-5 are also adapted to FIGS. 9 and 10, which will not be repeated here.

FIG. 9 is a flow chart illustrating a radio access network handover method according to an exemplary embodiment of the present disclosure. Referring to FIG. 9, in Step S901, a base station in an E-UTRAN makes a decision of handing over a UE to a 5G-RAN, and transmits a handover required message to a MME. According to the exemplary embodiment, the handover required message includes identification of a 5G-RAN node, and identification information indicating a 5GC CP to which the target 5G-RAN node is connected. In addition, the handover required message may further include a source-to-target transparent container. Here, the identification information may be tracking area identification, network fragment identification, 5GC CP pool identification, or 5GC CP identification. In Step S902, the MME transmits a relocation request message to the 5GC CP and receives a relocation response message from the 5GC CP. Here, the 5GC CP is an AMF in the 5GC CP. In Step S903, the MME transmits a handover command message to the base station in the E-UTRAN. In Step S904, the base station in the E-UTRAN transmits a handover command message to the UE such that the UE is handed over from the E-UTRAN to the 5G-RAN. Subsequently, in Step S905, the base station in the E-UTRAN performs direct data forwarding or indirect data forwarding with a base station in the 5G-RAN perform in a process that the UE is handed over from the E-UTRAN to the Specifically, according to the exemplary embodiment of the present disclosure, the MME determines whether the direct data forwarding or the indirect data forwarding is performed between the base station in the E-UTRAN and the base station in the 5G-RAN, and notifies a result of the determination to the 5GC CP, wherein the MME determines whether the direct data forwarding or the indirect data forwarding is performed between the base station in the E-UTRAN and the base station in the 5G-RAN according to whether information about direct data forwarding being available is received from the base station in the E-UTRAN.

If it is determined that the base station in the E-UTRAN performs indirect data forwarding with the base station in the 5G-RAN, the 5GC CP makes the relocation response message include tunnel information for data forwarding allocated by an anchor UPF, wherein the anchor UPF is a 5GC UPF servicing for the UE and performs a function of an anchor of user planes in an inter-radio access technologies (RAT) handover process.

If the MME receives the tunnel information for data forwarding, the MME transmits a request message of creating a indirect data forwarding tunnel to an SGW of the E-UTRAN, and then receives a response message of creating the indirect data forwarding tunnel from the SGW, wherein the request message of creating the indirect data forwarding tunnel includes the tunnel information for data forwarding allocated by the anchor UPF, the response message of creating the indirect data forwarding tunnel includes uplink tunnel information for data forwarding over a S1 interface of the EPS allocated by the SGW, and the handover command message includes a target-to-source transparent container and the tunnel information for data forwarding over the S1 interface. The target-to-source transparent container may include a mapping relationship from a Qos flow to an EPS bearer in a PDU session, that is, identification of the EPS bearer to which the Qos flow is mapped and/or the mapped Qos information.

In the process that the UE is handed over from the E-UTRAN to the 5G-RAN, the base station in the E-UTRAN performs the indirect data forwarding with the base station in the 5G-RAN by means of: the base station in the E-UTRAN forwarding data to the SGW; and the SGW forwarding the data to the anchor UPF. Specifically, the SGW forwards the data to the anchor UPF by one of three means of: the SGW forwarding the data to the anchor UPF through the corresponding tunnel for each EPS bearer that requires data forwarding, and the anchor UPF performing mapping from multiple tunnels to one tunnel; the SGW transmitting data belonging to the same PDU session received from the tunnel corresponding to each EPS bearer to the anchor UPF through the same tunnel, wherein the anchor UPF performs mapping from the PDU session to a Qos flow; and the SGW transmitting the data belonging to the same PDU session received from the tunnel corresponding to each E-RAB to the anchor UPF through the same tunnel, and adding information on a Qos and/or flow to a data packet header, wherein the SGW performs mapping from the PDU session to the Qos flow.

If the SGW forwards the data to the anchor UPF by the third means among the three means, the 5GC CP and the MME make the relocation response message and the request message of creating the indirect data forwarding tunnel further include information of a Qos flow to which the PDU session is to be mapped in the 5GS, respectively, wherein the information of the Qos flow includes flow identification and/or Qos information corresponding to the flow.

According to the exemplary embodiment of the present disclosure, if it is determined that the direct data forwarding is performed between the E-UTRAN and the 5G-RAN, the 5GC CP and the MME may respectively make the relocation response message and the handover command message include one or more of: information of an E-RAB or E-RABs accepted by a target 5G-RAN, wherein the information of the E-RAB includes identification of the E-RAB; information of an unaccepted E-RAB or E-RABs, wherein the information of the unaccepted E-RAB includes identification of the E-RAB and reasons for being unaccepted; and a target-to-source transparent container. In this case, in the process that the UE is handed over from the E-UTRAN to the 5G-RAN, the base station in the E-UTRAN directly forwards the data to the base station in the 5G-RAN, wherein the base station in the E-UTRAN forwards the data to the 5G-RAN through one data forwarding tunnel for each E-RAB that requires data forwarding.

According to the exemplary embodiment of the present disclosure, if it is determined that the direct data forwarding is performed between the E-UTRAN and the 5G-RAN, the 5GC CP and the MME may respectively make the relocation response message and the handover command message include one or more of: information of an E-RAB or E-RABs accepted by the target 5G-RAN, wherein the information of the E-RAB includes identification of the E-RAB; information of an unaccepted E-RAB or E-RABs, wherein the information of the unaccepted E-RAB includes identification of the E-RAB and reasons for being unaccepted; a target-to-source transparent container; and a list of information of an established PDU session or PDU sessions accepted by the 5G-RAN, wherein the list of the information of the PDU session includes PDU session identification, information of a Qos flow or Qos flows accepted by the PDU session, and/or Qos information of the Qos flow or the Qos flows. Preferably, the information of the PDU session may further include tunnel information for direct data forwarding, wherein the direct data forwarding is performed by an interface between the base station in the E-UTRAN and the base station in the 5G-RAN. Preferably, the information of the PDU session may further include the mapping relationship between the E-RAB and the Qos flow in each PDU session. The information of the E-RAB may further include at least one of: tunnel information for data forwarding, information indicating which PDU session the E-RAB belongs to, and information indicating which Qos flow the E-RAB is mapped to. In this case, in the process that the UE is handed over from the E-UTRAN to the 5G-RAN, the base station in the E-UTRAN directly forwards the data to the base station in the 5G-RAN, wherein the base station in the E-UTRAN forwards the E-RAB data belonging to the same PDU session through the same tunnel.

FIG. 10 is a flow chart illustrating a radio access network handover method according to an exemplary embodiment of the present disclosure.

Referring to FIG. 10, the radio access network handover method according to an exemplary embodiment of the present disclosure is described from an aspect of a 5GS in conjunction with FIGS. 3-5. In Step S1001, a 5GC CP receiving a relocation request message from a MME, wherein the relocation request message includes EPS UE context information and identification of a target 5G-RAN node. Here, the 5GC CP is an AMF in the 5GC CP. In Step S1002, the 5GC CP converts the received EPS UE context into a 5GS UE context, and transmits a session request message to an anchor UPF and receives a session response from the anchor UPF, wherein the anchor UPF is a 5GC UPF performing an anchor function for a PDU session of the UE. Here, the EPS UE context includes context information of Mobile Management (MM) EPS of the UE and a session management (SM) context. In Step S1003, the 5GC CP transmits a handover request message to a base station in the 5G-RAN, and transmits a relocation response message to the MME after receiving a handover request confirmation message from the base station in the 5G-RAN. The handover request confirmation message includes a list of established E-RABs, a list of E-RABs that are unsuccessfully established, and a target-to-source transparent container. As for the established RAB, it further includes tunnel information for downlink data transmission over the S1 interface. The message includes the tunnel information for data forwarding over the S1 interface allocated by the E-UTRAN to each E-RAB that requires data forwarding. In Step S1004, a base station in the E-UTRAN performs direct data forwarding or indirect data forwarding with the base station in the 5G-RAN in a process that the UE is handed over from the E-UTRAN to the 5G-RAN.

According to the exemplary embodiment, the MME may determine whether the direct data forwarding or the indirect data forwarding is performed between the base station in the E-UTRAN and the base station in the 5G-RAN, and notifies a result of the determination to the 5GC CP, wherein the MME determines whether the direct data forwarding or the indirect data forwarding is performed between the base station in the E-UTRAN and the base station in the 5G-RAN according to whether information about the direct data forwarding being available is received from the base station in the E-UTRAN. If the MME performs the determination, the MME notifies the 5GC CP of the correspondence relationship between the Qos flow and the E-RAB in the PDU session.

If the indirect forwarding is performed, the session request message includes information of a PDU session, wherein the information of the PDU session includes PDU session identification, Qos information of the PDU session, an EPS bearer list of the PDU session in an EPS and/or a mapping relationship from a Qos flow to an EPS bearer in the PDU session, wherein the EPS bearer list includes identification of an EPS bearer and/or Qos information of the EPS bearer. According to the exemplary embodiment, the handover request message may include information of a PDU session or PDU sessions to be established, wherein the information of the PDU session includes session identification, Qos information of the session, flow information, uplink tunnel information of each session, and a source-to-target transparent container. In addition, the handover request confirmation message may include one or more of: a target-to-source transparent container; a list of information of an established PDU session or PDU sessions accepted by the 5G-RAN, wherein the list of the information of the PDU session includes PDU session identification, tunnel information for the PDU session over a NG3 interface, information of a PDU flow or PDU flows accepted by the PDU session or the PDU sessions, information of an unaccepted PDU flow or PDU flows, and tunnel information for data forwarding over the NG3 interface; and a list of information of an established PDU session or PDU sessions unaccepted by 5G-RAN, wherein the list of the information of the PDU session includes PDU session identification and reasons for being unaccepted.

If the base station in the E-UTRAN performs the indirect data forwarding with the base station in the 5G-RAN: the anchor UPF transmits the data belonging to the same PDU session received from the tunnel corresponding to each EPS bearer of the SGW to the base station in the 5G-RAN through the same tunnel; or the anchor UPF directly receives the data from the tunnel corresponding to each PDU session of the SGW and forwards the data to the base station in the 5G-RAN in accordance with a session transmitting method in the 5GS; or the anchor UPF directly receives the data that needs to be forwarded in the 5GS from the SGW, and forwards the data to the base station in the 5G-RAN.

If the anchor UPF directly receives the data that needs to be forwarded in the 5GS from the SGW and forwards it to the base station in the 5G-RAN, the relocation response message may include the information of a Qos flow to which the PDU session is to be mapped in the 5GS. The relocation response message may include a mapping relationship from the Qos flow to the E-RAB bearer in the PDU session in the 5GS.

If it is determined that the direct data forwarding is performed between the base station in the 5G-RAN and the base station in the E-UTRAN in the process that the UE is handed over from the E-UTRAN to the 5G-RAN, the session response message may further include the information of a Qos flow of each PDU session and the mapping relationship between the E-RAB and the Qos flow in each PDU session, and the handover request message may further include the information of an E-RAB included in each PDU session in the EPS and the mapping relationship between the E-RAB and the Qos flow in each PDU session, wherein the information of the E-RAB includes identification of the E-RAB and/or Qos information of the E-RAB.

According to the exemplary embodiment, if it is determined that the indirect data forwarding is performed between the base station in the 5G-RAN and the base station in the E-UTRAN in the process that the UE is handed over from the 5G-RAN to the E-UTRAN, the handover request confirmation message may include one or more of: a target-to-source transparent container; a list of information of an established PDU session or PDU sessions accepted by the 5G-RAN, wherein the list of the information of the PDU session includes PDU session identification, tunnel information for the PDU session over the NG3 interface, information of a PDU flow or PDU flows accepted by the PDU session or the PDU sessions, information of an unaccepted PDU flow or PDU flows, and tunnel information for data forwarding over the NG3 interface; and a list of information of an established PDU session or PDU sessions unaccepted by the 5G-RAN, wherein the list of the information of the PDU session includes PDU session identification and reasons for being unaccepted. If it is determined that the direct data forwarding is performed between the base station in the 5G-RAN and the EPS in the process that the UE is handed over from the E-UTRAN to the 5G-RAN, the relocation response message may include one or more of: information of an E-RAB or E-RABs accepted by the target 5G-RAN, wherein the information of the E-RAB includes identification of the E-RAB; information of an unaccepted E-RAB or E-RABs, wherein the information of the unaccepted E-RAB includes identification of the E-RAB and reasons for being unaccepted; and a target-to-source transparent container.

According to another exemplary embodiment, if it is determined that the direct data forwarding is performed between the base station in the 5G-RAN and the base station in the E-UTRAN in the process that the UE is handed over from the E-UTRAN to the 5G-RAN, the relocation response message may include one or more of: information of an E-RAB or E-RABs accepted by the target 5G-RAN, wherein the information of the E-RAB includes identification of the E-RAB; information of an unaccepted E-RAB or E-RABs, wherein the information of the unaccepted E-RAB includes identification of the E-RAB and reasons for being unaccepted; a target-to-source transparent container; and a list of information of an established PDU session or PDU sessions accepted by the 5G-RAN, wherein the list of the information of the PDU session includes PDU session identification, information of a Qos flow or Qos flows accepted by the PDU session, and/or Qos information of the Qos flow or Qos flows.

In the process that the UE is handed over from the E-UTRAN to the 5G-RAN, the base station in the 5G-RAN may directly receive the data forwarded from the E-UTRAN, wherein the base station in the E-UTRAN forwards the data to the base station in the 5G-RAN through the corresponding tunnel for each E-RAB that requires data forwarding, and the base station in the 5G-RAN determines the mapping from the E-RAB data to the DRB.

In the process that the UE is handed over from the E-UTRAN to the 5G-RAN, the base station in the 5G-RAN may directly receive the data forwarded from the base station in the E-UTRAN, wherein the E-RAB data belonging to the same PDU session is forwarded through one tunnel.

FIG. 11 is a block diagram illustrating a system for performing a radio access network handover according to an exemplary embodiment of the present disclosure.

Referring to FIG. 11, a system 1100 for performing the radio access network handover according to the exemplary embodiment of the present disclosure includes a base station 1101 in an E-UTRAN and a MME 1102, wherein the base station 1101 in the E-UTRAN may make a decision of handing over a UE connected to the E-UTRAN to a 5G-RAN, transmit a handover required message to the MME, and transmit a handover command message to the UE connected to the E-UTRAN such that the UE is handed over from the E-UTRAN to the 5G-RAN. According to the exemplary embodiment, the handover required message includes identification of a target 5G-RAN node, a source-to-target transparent container, and identification information indicating a 5GC CP to which the target 5G-RAN node is connected, wherein the identification information is tracking area identification, network fragment identification, 5GC CP pool identification, or 5GC CP identification.

The MME 1102 may receive the handover required message from the base station in the E-UTRAN, transmit a relocation request message to the 5GC CP and receive a relocation response message from the 5GC CP, and transmit a handover command message to the base station in the E-UTRAN, wherein the base station in the E-UTRAN performs direct data forwarding or indirect data forwarding with a base station in the 5G-RAN in a process that the UE is handed over from the E-UTRAN to the 5G-RAN.

The MME may be further configured to determine whether the direct data forwarding or the indirect data forwarding is performed between the base station in the E-UTRAN and the base station in the 5G-RAN, and notifies a result of the determination to the 5GC CP, wherein the MME determines whether the direct data forwarding or the indirect data forwarding is performed between the base station in the E-UTRAN and the base station in the 5G-RAN according to whether information about direct data forwarding being available is received from the base station in the E-UTRAN.

If it is determined that the indirect data forwarding is performed between the base station in the E-UTRAN and the base station in the 5G-RAN, the relocation response message received by the MME 102 includes tunnel information for data forwarding allocated by an anchor UPF, wherein the anchor UPF is a 5GC UPF serving the UE and performs a function of an anchor of user planes in an inter-RAT handover process.

The system according to the exemplary embodiment may further includes an SGW of the E-UTRAN, wherein if the MME 102 receives the tunnel information for data forwarding, the MME is further configured to transmit a request message of creating a indirect data forwarding tunnel to the SGW 1103 of the E-UTRAN, and then receive a response message of creating the indirect data forwarding tunnel from the SGW, wherein the request message of creating the indirect data forwarding tunnel includes the tunnel information for data forwarding allocated by the anchor UPF, the response message of creating the indirect data forwarding tunnel includes uplink tunnel information for data forwarding over a S1 interface of the EPS allocated by the SGW, and the handover command message includes a target-to-source transparent container and the tunnel information for data forwarding over the S1 interface.

In the process that the UE is handed over from the E-UTRAN to the 5G-RAN, the base station in the E-UTRAN is configured to perform the indirect data forwarding with the base station in the 5G-RAN by means of: the base station in the E-UTRAN forwarding data to the SGW; and the SGW forwarding the data to the anchor UPF.

Specifically, the SGW is configured to forward the data to the anchor UPF by one of three means of: the SGW forwarding the data to the anchor UPF through the corresponding tunnel for each EPS bearer that requires data forwarding, and the anchor UPF performing mapping from multiple tunnels to one tunnel; the SGW transmitting data belonging to the same PDU session received from the tunnel corresponding to each EPS bearer to the anchor UPF through the same tunnel, wherein the anchor UPF performs mapping from the PDU session to a Qos flow; and the SGW transmitting the data belonging to the same PDU session received from the tunnel corresponding to each E-RAB to the anchor UPF through the same tunnel, and adding information on a Qos and/or flow to a data packet header, wherein the SGW performs mapping from the PDU session to the Qos flow.

If the SGW forwards the data to the anchor UPF by the third means among the three means, the relocation response message and the request message of creating the indirect data forwarding tunnel further include the information of a Qos flow to which the PDU session is to be mapped in the 5GS, wherein the information of the Qos flow includes flow identification and/or Qos information corresponding to the flow.

According to the exemplary embodiment of the present disclosure, if it is determined that the direct data forwarding is performed between the E-UTRAN and the 5G-RAN, the relocation response message and the handover command message may include one or more of: information of an E-RAB or E-RABs accepted by the target 5G-RAN, wherein the information of the E-RAB includes identification of the E-RAB; information of an unaccepted E-RAB or E-RABs, wherein the information of the unaccepted E-RAB includes identification of the E-RAB and reasons for being unaccepted; and a target-to-source transparent container.

In the process that the UE is handed over from the E-UTRAN to the 5G-RAN, the base station in the E-UTRAN directly forwards data to the base station in the 5G-RAN, wherein the base station in the E-UTRAN forwards the data to the 5G-RAN through one data forwarding tunnel for each E-RAB that requires data forwarding.

Preferably, according to another exemplary embodiment of the present disclosure, if it is determined that the direct data forwarding is performed between the E-UTRAN and the 5G-RAN, the relocation response message and the handover command message may include one or more of: information of an E-RAB or E-RABs accepted by the target 5G-RAN, wherein the information of the E-RAB includes identification of the E-RAB; information of an unaccepted E-RAB or E-RABs, wherein the information of the unaccepted E-RAB includes identification of the E-RAB and reasons for being unaccepted; a target-to-source transparent container; and a list of information of an established PDU session or PDU sessions accepted by the 5G-RAN, wherein the list of the information of the PDU session includes PDU session identification, information of a Qos flow or Qos flows accepted by the PDU session, and/or Qos information of the Qos flow or Qos flows. Preferably, the information of the PDU session may further include the tunnel information for direct data forwarding, wherein the direct data forwarding is performed by an interface between the base station in the E-UTRAN and the base station in the 5G-RAN. The information of the PDU session may further include the mapping relationship between the E-RAB and the Qos flow in each PDU session. The information of the E-RAB may further include at least one of: tunnel information for data forwarding, information indicating which PDU session the E-RAB belongs to, and information indicating which Qos flow the E-RAB is mapped to. In this case, in the process that the UE is handed over from the E-UTRAN to the 5G-RAN, the base station in the E-UTRAN is configured to directly forward the data to the base station in the 5G-RAN, wherein the base station in the E-UTRAN forwards FIG. 12 is a block diagram illustrating another system 1200 for performing a radio access network handover according to an exemplary embodiment of the present disclosure.

The system 1200 performs the radio access network handover method in FIG. 10. Referring to FIG. 12, the system 1200 includes: a base station 1201 in a 5G-RAN configured to receive a handover request message for handing over a UE connected to an E-UTRAN from the E-UTRAN to the 5G-RAN, and transmit a handover request confirmation message to a 5GC CP; and a 5GC CP 1202 configured to: receive a relocation request message from a MME, wherein the relocation request message includes EPS UE context information and identification of a target 5G-RAN node; convert the received EPS UE context into a 5GS UE context, and transmit a session request message to an anchor UPF and receive a session response from the anchor UPF, wherein the anchor UPF is a 5GC UPF servicing the UE and performs a function of an anchor of user planes in an inter-RAT handover process; and transmit the handover request message to the base station in the 5G-RAN, and transmit a relocation response message to the MME after receiving a handover request confirmation message from the base station in the 5G-RAN, wherein a base station in the E-UTRAN performs direct data forwarding or indirect data forwarding with the base station in the 5G-RAN in a process that the UE is handed over from the E-UTRAN to the 5G-RAN. The EPS UE context information includes context information of Mobile Management (MM) EPS of the UE and a session management (SM) context.

The MME determines whether the direct data forwarding or the indirect data forwarding is performed between the base station in the E-UTRAN and the base station in the 5G-RAN, and notifies a result of the determination to the 5GC CP, wherein the MME determines whether the direct data forwarding or the indirect data forwarding is performed between the base station in the E-UTRAN and the base station in the 5G-RAN according to whether information about direct data forwarding being available is received from the base station in the E-UTRAN. If the MME performs the determination, the MME notifies the 5GC CP of the correspondence relationship between the Qos flow and the E-RAB in the PDU session.

If the indirect forwarding is performed, the 5GC CP may make the session request message include information of a PDU session, wherein the information of the PDU session includes PDU session identification, Qos information of the PDU session, an EPS bearer list of the PDU session in an EPS and/or a mapping relationship from a Qos flow to an EPS bearer in the PDU session, wherein the EPS bearer list includes EPS bearer identification and/or Qos information of the EPS bearer. The handover request message may include information of a PDU session or PDU sessions to be established, wherein the information of the PDU session includes session identification, Qos information of the session, flow information, uplink tunnel information of each session, and a source-to-target transparent container. The handover request confirmation message may include one or more of: a target-to-source transparent container; a list of information of an established PDU session or PDU sessions accepted by the 5G-RAN, wherein the list of the information of the PDU session includes PDU session identification, tunnel information for the PDU session over a NG3 interface, information of a PDU flow or PDU flows accepted by the PDU session or PDU sessions, information of an unaccepted PDU flow or PDU flows, and tunnel information for data forwarding over the NG3 interface; and a list of information of an established PDU session or PDU sessions unaccepted by the 5G-RAN, wherein the list of the information of the PDU session includes PDU session identification and reasons for being unaccepted.

According to the exemplary embodiment, the system may further include an anchor UPF 1203, wherein if the base station in the E-UTRAN performs the indirect data forwarding with the base station in the 5G-RAN: the anchor UPF transmits the data belonging to the same PDU session received from the tunnel corresponding to each EPS bearer of the SGW to the base station in the 5G-RAN through the same tunnel; or the anchor UPF directly receives the data from the tunnel corresponding to each PDU session of the SGW and forwards the data to the base station in the 5G-RAN in accordance with a session transmitting method in the 5GS; or the anchor UPF directly receives the data that needs to be forwarded in the 5GS from the SGW, and forwards the data to the base station in the 5G-RAN.

If the anchor UPF directly receives the data that needs to be forwarded in the 5GS from the SGW and forwards it to the base station in the 5G-RAN, the relocation response message may include information of a Qos flow to which the PDU session is to be mapped in the 5GS.

According to the exemplary embodiment, if it is determined that the direct data forwarding is performed between the base station in the 5G-RAN and the base station in the E-UTRAN in the process that the UE is handed over from the E-UTRAN to the 5G-RAN, the session response message may further include information of a Qos flow of each PDU session and a mapping relationship between the E-RAB and the Qos flow in each PDU session, and the handover request message may further include the information of an E-RAB (E-RABs) included in each PDU session in the EPS and the mapping relationship between the E-RAB and the Qos flow in each PDU session, wherein the information of the E-RAB includes identification of the E-RAB and/or Qos information of the E-RAB. If it is determined that the direct data forwarding is performed between the base station in the 5G-RAN and the base station in the E-UTRAN in the process that the UE is handed over from the E-UTRAN to the 5G-RAN, the 5GC CP makes the relocation response message include one or more of: information of an E-RAB or E-RABs accepted by the target 5G-RAN, wherein the information of the E-RAB includes identification of the E-RAB; information of an unaccepted E-RAB or E-RABs, wherein the information of the unaccepted E-RAB includes identification of the E-RAB and reasons for being unaccepted; and a target-to-source transparent container. In the process that the UE is handed over from the E-UTRAN to the 5G-RAN, the base station in the 5G-RAN may directly receive the data forwarded from the E-UTRAN, wherein the E-UTRAN forwards the data to the base station in the 5G-RAN through the corresponding tunnel for each E-RAB that requires data forwarding, and the base station in the 5G-RAN determines the mapping from the E-RAB data to the DRB.

According to another exemplary embodiment, if it is determined that the direct data forwarding is performed between the base station in the 5G-RAN and the base station in the E-UTRAN in the process that the UE is handed over from the E-UTRAN to the 5G-RAN, the base station in the 5G-RAN makes the handover request confirmation message include one or more of: a target-to-source transparent container; a list of information of an established PDU session or PDU sessions accepted by the 5G-RAN, wherein the list of the information of the PDU session includes PDU session identification, tunnel information for the PDU session over the NG3 interface, information of a PDU flow or PDU flows accepted by the PDU session, information of an unaccepted PDU flow or PDU flows, and tunnel information for data forwarding over the NG3 interface; and a list of information of an established PDU session or PDU sessions unaccepted by the 5G-RAN, wherein the list of the information of the PDU session includes PDU session identification and reasons for being unaccepted. If it is determined that the direct data forwarding is performed between the base station in the 5G-RAN and the base station in the E-UTRAN in the process that the UE is handed over from the E-UTRAN to the 5G-RAN, the 5GC CP makes the relocation response message include one or more of: information of an E-RAB or E-RABs accepted by the target 5G-RAN, wherein the information of the E-RAB includes identification of the E-RAB;

information of an unaccepted E-RAB or E-RABs, wherein the information of the unaccepted E-RAB includes identification of the E-RAB and reasons for being unaccepted; a target-to-source transparent container; and a list of information of an established PDU session or PDU sessions accepted by the 5G-RAN, wherein the list of the information of the PDU session includes PDU session identification, information of a Qos flow or Qos flows accepted by the PDU session, and/or Qos information of the Qos flow or Qos flows. In the process that the UE is handed over from the E-UTRAN to the 5G-RAN, the base station in the 5G-RAN directly receives the data forwarded from the base station in the E-UTRAN, and determines that the E-RAB data belonging to the same PDU session is forwarded through one tunnel.

Subsequently, the radio access network handover method of FIGS. 6-8 is further described in aspects of an EPS and a 5GS by referring to FIGS. 13 and 14, respectively. It should be understood that FIGS. 13 and 14 are combinations of FIGS. 6-8 as described above. FIG. 13 describes the radio access network handover method of FIGS. 6-8 in an aspect of an EPS, while FIG. 14 describes the radio access network handover method of FIGS. 6-8 in an aspect of a 5GS. Thus, the description and explanations for the related terms, steps and so on in FIGS. 6-5 are also adapted to FIGS. 13 and 14, which will not be repeated here.

FIG. 13 is a flow chart illustrating a radio access network handover method according to another exemplary embodiment of the present disclosure.

Referring to FIG. 13, in Step S1301, a base station in a 5G-RAN makes a decision of handing over a UE to an E-UTRAN, and transmits a handover required message to a 5GC CP. According to the exemplary embodiment, the handover required message may include identification of a target base station, a source-to-target transparent container, and identification information indicating a MME to which the target base station is connected, wherein the identification information is tracking area identification or MME identification. In Step S1302, the 5GC CP transmits a relocation request message to the MME and receives a relocation response message from the MME. In Step S1303, the 5GC CP transmits a handover command message to the base station in the 5G-RAN. In Step S1304, the base station in the 5G-RAN transmits a handover command message to the UE such that the UE is handed over from the 5G-RAN to the E-UTRAN. In Step S1305, the base station in the 5G-RAN performs direct data forwarding or indirect data forwarding with a base station in the E-UTRAN in a process that the UE is handed over from the 5G-RAN to the E-UTRAN.

The 5GC CP may determine whether the direct data forwarding or the indirect data forwarding is performed between the base station in the 5G-RAN and the base station in the E-UTRAN, wherein the 5GC CP determines whether the direct data forwarding or the indirect data forwarding is performed according to whether information about direct data forwarding being available is received from the base station in the 5G-RAN, and notifies a result of whether the direct data forwarding or the indirect data forwarding to the MME. Or, the 5GC CP may transmit information indicating whether the direct data forwarding is available received from the 5G-RAN to the MME such that the MME determines whether the direct data forwarding or the indirect data forwarding is performed. If the MME performs the determination, the MME notifies the 5GC CP of correspondence relationship between a Qos flow and an E-RAB in the PDU session.

If it is determined that the indirect data forwarding is performed between the base station in the 5G-RAN and the base station in the E-UTRAN in the process that the UE is handed over from the 5G-RAN to the E-UTRAN, the relocation response message includes information for data forwarding between an SGW and an anchor UPF allocated by the SGW of the E-UTRAN, wherein the information for the data forwarding between the SGW and the anchor UPF includes PDU session identification and/or information of an E-RAB (E-RABs) included in a PDU session, and wherein the anchor UPF is a 5GC UPF serving the UE and performs a function of an anchor of user planes in an inter-RAT handover process; and the handover command message includes a target-to-source transparent container and tunnel information for data forwarding allocated by the 5GC UPF or the anchor UPF.

If it is determined that the indirect data forwarding is performed between the base station in the 5G-RAN and the base station in the E-UTRAN in the process that the UE is handed over from the 5G-RAN to the E-UTRAN, the method may further include: the 5GC CP transmitting a request message of creating a forwarding tunnel to the anchor UPF to request the anchor UPF to create a data forwarding tunnel, wherein the request message of creating the forwarding tunnel includes PDU session identification and/or information of an E-RAB (E-RABs) included in the PDU session and correspondence relationship between a Qos flow and an E-RAB in the PDU session, or the request message of creating the forwarding tunnel includes tunnel information for data forwarding of each PDU session; and the 5GC CP receiving the tunnel information for data forwarding allocated by the anchor UPF from the anchor UPF.

Alternatively, the method may further include: if there is another 5GC UPF between the anchor UPF and the 5G-RAN, the 5GC CP requesting the 5GC UPF to create the data forwarding tunnel.

If it is determined that the indirect data forwarding is performed between the base station in the 5G-RAN and the base station in the E-UTRAN in the process that the UE is handed over from the 5G-RAN to the E-UTRAN, the indirect data forwarding is performed by one of two means of: the anchor UPF forwarding data to the SGW of the E-UTRAN through the corresponding tunnel for each EPS bearer that requires data forwarding, and then the SGW forwarding the data to the base station in the E-UTRAN according to a session transmitting method in the EPS; or the anchor UPF transmitting the data received from the tunnels corresponding to the same PDU session to the SGW through one tunnel, the SGW performing mapping from the PDU session to the EPS bearer and/or mapping from the Qos flow to the EPS bearer in the PDU session and transmitting the data to the base station in the E-UTRAN through the corresponding EPS bearer.

Alternatively, the method may further include: the 5GC CP receiving a bearer modification request message from the SGW, requesting the anchor UPF to perform a session modification and transmitting a bearer modification response message to the SGW, wherein the bearer modification request message includes tunnel information for uplink data transmission between the SGW and the anchor UPF allocated by the anchor UPF. Here, a function entity in the 5GC CP directly communicating with the SGW is a SMF.

If it is determined that the direct data forwarding is performed between the base station in the 5G-RAN and the base station in the E-UTRAN in the process that the UE is handed over from the 5G-RAN to the E-UTRAN, the relocation response message includes information of a Qos flow in the PDU session and information of an E-RAB to which the Qos flow is mapped in the EPS, wherein the information of the Qos flow includes flow identification and/or Qos information corresponding to the flow; the handover command message may include one or more of: a target-to-source transparent container; information of a PDU session or PDU sessions accepted by the E-UTRAN, wherein the information of the PDU session includes PDU session identification, information of a Qos flow or Qos flows accepted by the PDU session, and information of an unaccepted PDU flow or PDU flows; a list of information of an established PDU session or PDU sessions unaccepted by the E-UTRAN, wherein the list of the information of the PDU session includes PDU session identification and reasons for being unaccepted. The information of the PDU session may further include the tunnel information for direct data forwarding allocated to each E-RAB that requires data forwarding in the PDU session.

In the process that the UE is handed over from the 5G-RAN to the E-UTRAN, the base station in the 5G-RAN may directly forward data to the base station in the E-UTRAN, wherein the data belonging to the same PDU session is forwarded through one tunnel.

Alternatively, in the process of handing over from the 5G-RAN to the E-UTRAN, the base station in the 5G-RAN may directly forward the data to the base station in the E-UTRAN, wherein the base station in the 5G-RAN forwards the data of the same PDU session to the base station in the E-UTRAN through the tunnels allocated to different E-RABs.

FIG. 14 is a flow chart illustrating a radio access network handover method according to another exemplary embodiment of the present disclosure.

Referring to FIG. 14, in Step S1401, the MME receives the relocation request message from the 5GC CP, wherein the relocation request message includes a 5GS UE context and identification of the target 5G-RAN node. In Step S1402, the MME converts the received 5GS UE context into an EPS UE context, and transmits a session creation request to and receives a session creation response from the SGW of the E-UTRAN. In Step S1403, the MME transmits the handover request message to the base station in the E-UTRAN, and transmits a relocation response message to the 5GC CP after the MME receives a handover request confirmation message from the base station in the E-UTRAN. In Step S1404, the base station in the 5G-RAN and the base station in the E-UTRAN perform direct data forwarding or indirect data forwarding in the process that the UE is handed over from the 5G-RAN to the E-UTRAN.

The 5GC CP may determines whether the direct data forwarding or the indirect data forwarding is performed between the base station in the 5G-RAN and the base station in the E-UTRAN, wherein the 5GC CP determines whether the direct data forwarding or the indirect data forwarding is performed according to whether information about direct data forwarding being available is received from the base station in the 5G-RAN, and notifies a result of whether the direct data forwarding or the indirect data forwarding to the MME. Or, the 5GC CP transmits information indicating whether the direct data forwarding is available received from the 5G-RAN to the MME such that the MME determines whether the direct data forwarding or the indirect data forwarding is performed. If the MME performs the determination, the MME notifies the 5GC CP of correspondence relationship between a Qos flow and an E-RAB in the PDU session.

If it is determined that the indirect data forwarding is performed between the base station in the 5G-RAN and the base station in the E-UTRAN in the process that the UE is handed over from the 5G-RAN to the E-UTRAN, the method may further include: after the MME receives the handover request confirmation message from the base station in the E-UTRAN, the MME requesting the SGW to create an indirect data forwarding tunnel, receiving a response message of creating the indirect data forwarding tunnel from the SGW, and then transmitting a relocation response message to the 5GC UPF, wherein the response message of creating the indirect data forwarding tunnel and the relocation response message include tunnel information for data forwarding between the SGW and the anchor UPF allocated by the SGW, wherein the anchor UPF is a 5GC UPF serving the UE and performs a function of an anchor of user planes in an inter-RAT handover process. The information for the data forwarding between the SGW and the anchor UPF may include PDU session identification and/or information of an E-RAB (E-RABs) included in the PDU session, wherein the information of the E-RAB includes identification of the E-RAB and tunnel information for data forwarding of the E-RAB. The response message of creating the indirect data forwarding tunnel and the relocation response message may further include information of a Qos flow in the PDU session and the information of the E-RAB to which the Qos flow is to be mapped in the EPS, wherein the MME converts the information of the E-RAB in the response message of creating the indirect data forwarding tunnel into information of the PDU session and transmits it to the 5GC CP so as to notify the anchor UPF of the tunnel information for data forwarding.

If it is determined that the indirect data forwarding is performed between the base station in the 5G-RAN and the base station in the E-UTRAN in the process that the UE is handed over from the 5G-RAN to the E-UTRAN, the indirect data forwarding is performed by one of two means of: the SGW transmitting the data belonging to the same PDU session received from the tunnel corresponding to each EPS bearer of the anchor UPF to the base station in the E-UTRAN through the same tunnel; the SGW receiving the data from the tunnel corresponding to each PDU session of the anchor UPF, using the received data to perform the mapping from the PDU session and/or the Qos flow in the PDU session to the E-RAB, and transmitting downlink data to the base station in the E-UTRAN through the E-RAB. If it is determined that the indirect data forwarding is performed between the base station in the 5G-RAN and the base station in the E-UTRAN in the process that the UE is handed over from the 5G-RAN to the E-UTRAN, the handover request message may include information of a PDU session, wherein the information of the PDU session may include PDU session identification, information of a Qos flow in the PDU session, information of an E-RAB (E-RABs) in the PDU session, and correspondence relationship between the Qos flow and the E-RAB in the PDU session, wherein the information of the Qos flow in the PDU session includes identification of the Qos flow and/or Qos information of the Qos flow, and the information of the E-RAB in the PDU session includes identification of the E-RAB, the correspondence relationship between the Qos flow and the E-RAB in the PDU session includes information indicating which E-RAB each Qos flow is mapped to.

According to the exemplary embodiment, the handover request confirmation message may include tunnel information for direct data forwarding allocated by the E-UTRAN to each PDU session that requires data forwarding, wherein the tunnel information may be included in AP messages of access stratums of the E-UTRAN and the MME or in the target-to-source transparent container. Alternatively, according to another exemplary embodiment, the handover request confirmation message may include tunnel information for direct data forwarding allocated by the E-UTRAN to each E-RAB, wherein the tunnel information may be included in AP messages of access stratums of the E-UTRAN and the MME or in the target-to-source transparent container. The relocation response message may include information of a Qos flow in the PDU session and information of an E-RAB to which the Qos flow is mapped in the EPS, wherein the information of the Qos flow includes flow identification and/or Qos information corresponding to the flow.

According to the exemplary embodiment, in the process that the UE is handed over from the 5G-RAN to the E-UTRAN, the base station in the E-UTRAN may directly receive data from the base station in the 5G-RAN, wherein the data belonging to the same PDU session is received through one tunnel. According to another exemplary embodiment, in the process of handing over from the 5G-RAN to the E-UTRAN, the base station in the E-UTRAN may directly receive data from the base station in the 5G-RAN, wherein the data belonging to the same PDU session is received through tunnels allocated to different E-RABs.

According to the exemplary embodiment, the method may further include: after the UE is handed over from the 5G-RAN to the E-UTRAN, the base station in the E-UTRAN receiving a handover completion message from the UE and transmitting it to the MME, wherein the handover completion message includes tunnel information for downlink data transmission allocated by the E-UTRAN. Alternatively, the method may further include: the MME transmitting a bearer modification request to the SGW after receiving the handover completion message so as to transmit the bearer modification request to the 5GC CP through the SGW to perform the session modification.

FIG. 15 is a block diagram illustrating a system 1500 for performing a radio access network handover according to another exemplary embodiment of the present disclosure.

Referring to FIG. 15, the system 1500 includes: a base station 1501 in a 5G-RAN configured to make a decision of handing over a UE to an E-UTRAN, transmit a handover required message to a 5GC CP, and transmit a handover command message to the UE connected to the 5G-RAN such that the UE is handed over from the 5G-RAN to the E-UTRAN; a 5GC CP 1502 configured to transmit a relocation request message to and receive a relocation response message from a MME, and transmit a handover command message to a base station in the 5G-RAN, wherein the base station in the 5G-RAN performs direct data forwarding or indirect data forwarding with a base station in the E-UTRAN in a process that the UE is handed over from the 5G-RAN to the E-UTRAN. Here, the handover required message includes identification of a target base station, a source-to-target transparent container, and identification information indicating a MME to which the target base station is connected, wherein the identification information is tracking area identification or MME identification.

In addition, the system 1500 may further include an anchor UPF 1503, wherein the anchor UPF 1503 may be a 5GC UPF performing an anchor function for a PDU session of the UE.

The 5GC CP 1502 may be further configured to determine whether the direct data forwarding or the indirect data forwarding is performed between the base station in the 5G-RAN and the base station in the E-UTRAN, wherein the 5GC CP determines whether the direct data forwarding or the indirect data forwarding is performed according to whether information about direct data forwarding being available is received from the base station in the 5G-RAN, and notifies a result of whether the direct data forwarding or the indirect data forwarding to the MME. Or, alternatively, the 5GC CP may be configured to transmit information indicating whether the direct data forwarding is available received from the 5G-RAN to the MME such that the MME determines whether the direct data forwarding or the indirect data forwarding is performed. If the MME performs the determination, the MME notifies the 5GC CP of correspondence relationship between a Qos flow and an E-RAB in the PDU session.

If it is determined that the indirect data forwarding is performed between the base station in the 5G-RAN and the base station in the E-UTRAN in the process that the UE is handed over from the 5G-RAN to the E-UTRAN, the relocation response message may include information for data forwarding between an SGW and the anchor UPF allocated by the SGW of the E-UTRAN, wherein the information for the data forwarding between the SGW and the anchor UPF includes PDU session identification and/or information of an E-RAB (E-RABs) included in the PDU session, and wherein the anchor UPF is a 5GC UPF serving the UE and performs a function of an anchor of user planes in an inter-RAT handover process; and the handover command message may include a target-to-source transparent container and tunnel information for data forwarding allocated by the 5GC UPF or the anchor UPF.

As stated above, the system 1500 may further include an anchor UPF. In this case, if it is determined that the indirect data forwarding is performed between the base station in the 5G-RAN and the base station in the E-UTRAN in the process that the UE is handed over from the 5G-RAN to the E-UTRAN, the 5GC CP may be further configured to: transmit a request message of creating a forwarding tunnel to the anchor UPF to request the anchor UPF to create the data forwarding tunnel, wherein the request message of creating the forwarding tunnel includes PDU session identification and/or information of an E-RAB included in the PDU session and correspondence relationship between a Qos flow and an E-RAB in the PDU session, or the request message of creating the forwarding tunnel includes the tunnel information for data forwarding of each PDU session. In addition, the 5GC CP 1502 may further receive the tunnel information for data forwarding allocated by the anchor UPF from the anchor UPF.

If there is another 5GC UPF between the anchor UPF and the 5G-RAN, the 5GC CP requests the 5GC UPF to create the data forwarding tunnel.

Specifically, if the indirect data forwarding is performed between the base station in the 5G-RAN and the base station in the E-UTRAN in the process that the UE is handed over from the 5G-RAN to the E-UTRAN, the base station in the 5G-RAN forwards data to the base station in the E-UTRAN by one of two means of:

the base station in the 5G-RAN firstly transmitting data to the anchor, and then the anchor UPF forwarding the data to the SGW of the E-UTRAN through the corresponding tunnel for each EPS bearer that requires data forwarding, and then the SGW forwarding the data to the base station in the E-UTRAN according to a session transmitting method in the EPS; or the base station in the 5G-RAN firstly transmitting data to the anchor, subsequently, the anchor UPF transmitting the data received from the tunnel corresponding to the same PDU session to the SGW through one tunnel, the SGW performing mapping from the PDU session to the EPS bearer and/or mapping from the Qos flow in the PDU session to the EPS bearer and transmitting the data to the base station in the E-UTRAN through the corresponding EPS bearer.

According to the exemplary embodiment, the 5GC CP may receive a bearer modification request message from the SGW, requesting the anchor UPF to perform a session modification and transmit a bearer modification response message to the SGW, wherein the bearer modification request message includes tunnel information for uplink data transmission between the SGW and the anchor UPF allocated by the anchor UPF. Here, a function entity in the 5GC CP directly communicating with the SGW is a SMF.

According to another exemplary embodiment, if the direct data forwarding is performed between the base station in the 5G-RAN and the base station in the E-UTRAN in the process that the UE is handed over from the 5G-RAN to the E-UTRAN, the relocation response message includes information of a Qos flow in the PDU session and information of an E-RAB to which the Qos flow is mapped in the EPS, wherein the information of the Qos flow includes flow identification and/or Qos information corresponding to the flow; and the handover command message may include one or more of: a target-to-source transparent container; information of a PDU session or PDU sessions accepted by the E-UTRAN, wherein the information of the PDU session includes PDU session identification, information of a PDU flow or PDU flows accepted by the PDU session, and information of an unaccepted PDU flow or PDU flows; a list of information of an established PDU session or PDU sessions unaccepted by the E-UTRAN, wherein the list of the information of the PDU session includes PDU session identification and reasons for being unaccepted. Here, the information of the PDU session may further include tunnel information for direct data forwarding allocated to each E-RAB that requires data forwarding in the PDU session.

According to the exemplary embodiment, in the process that the UE is handed over from the 5G-RAN to the E-UTRAN, the base station 1501 in the 5G-RAN directly forwards data to the base station in the E-UTRAN, wherein the data belonging to the same PDU session is forwarded through one tunnel.

According to another exemplary embodiment, in the process that the UE is handed over from the 5G-RAN to the E-UTRAN, the base station 1501 in the 5G-RAN directly forwards data to the base station in the E-UTRAN, wherein the base station in the 5G-RAN forwards the data of the same PDU session to the base station in the E-UTRAN through the tunnels allocated to different E-RABs.

FIG. 16 is a block diagram illustrating a system 1600 for performing a radio access network handover according to another exemplary embodiment of the present disclosure.

Referring to FIG. 16, the system 1600 includes: a base station 1601 in an E-UTRAN and a MME 1602. The base station 1601 in the E-UTRAN may receive a handover request message from and transmit a handover request confirmation message to the MME. the MME 1602 is configured to: receive a relocation request message from a 5GC CP, wherein the relocation request message includes a 5GS UE context and identification of a target 5G-RAN node; convert the received 5GS UE context into an EPS UE context, and transmit a session creation request to and receive a session creation response from an SGW of the E-UTRAN; and transmit the handover request message to a base station in the E-UTRAN, and transmit a relocation response message to the 5GC CP after the MME receives the handover request confirmation message from the base station in the E-UTRAN, wherein the base station in the E-UTRAN receives the data forwarded by a base station in the 5G-RAN through direct forwarding or indirect forwarding from the base station in the 5G-RAN in a process that the UE is handed over from the 5G-RAN to the E-UTRAN.

The MME 1602 may further receive a determination of whether the base station in the 5G-RAN and the base station in the E-UTRAN perform direct data forwarding or indirect data forwarding made by the 5GC CP from the 5GC CP. Or, the MME may receive information indicating whether the direct data forwarding is available transmitted by the 5G-RAN from the 5GC CP to determine whether the base station in the 5G-RAN and the base station in the E-UTRAN perform the direct data forwarding or the indirect data forwarding.

If it is determined that the indirect data forwarding is performed between the base station in the 5G-RAN and the base station in the E-UTRAN in the process that the UE is handed over from the 5G-RAN to the E-UTRAN, after the MME 1602 receives the handover request confirmation message from the base station in the E-UTRAN, the MME 1602 requests the SGW to create an indirect data forwarding tunnel, receives a response message of creating the indirect data forwarding tunnel from the SGW, and then transmits a relocation response message to the 5GC CP, wherein the response message of creating the indirect data forwarding tunnel and the relocation response message include tunnel information for data forwarding between the SGW and the anchor UPF allocated by the SGW, wherein the anchor UPF is a 5GC UPF serving the UE and performs a function of an anchor of user planes in an inter-RAT handover process. Here, the information for the data forwarding between the SGW and the anchor UPF includes PDU session identification and/or information of an E-RAB included in the PDU session, wherein the information of the E-RAB may include identification of the E-RAB and tunnel information for data forwarding of the E-RAB.

The response message of creating the indirect data forwarding tunnel and the relocation response message may further include information of a Qos flow in the PDU session and information of an E-RAB to which the Qos flow is to be mapped in the EPS, wherein the MME 1602 converts the information of the E-RAB in the response message of creating the indirect data forwarding tunnel into the PDU session information and transmits it to the 5GC CP so as to notify the anchor UPF of the tunnel information for data forwarding.

In addition, the system 1600 may further include an SGW 1603 of the E-UTRAN, wherein if the indirect data forwarding is performed between the base station in the E-UTRAN and the base station in the 5G-RAN in the process that the UE is handed over from the 5G-RAN to the E-UTRAN, after receiving the data forwarded by the base station in the 5G-RAN from the base station in the 5G-RAN, the SGW 1603 indirectly forwards data to the base station in the E-UTRAN by one of two means of: the SGW transmitting the data belonging to the same PDU session received from the tunnel corresponding to each EPS bearer of the anchor UPF to the base station in the E-UTRAN through the same tunnel; the SGW receiving the data from the tunnel corresponding to each PDU session of the anchor UPF, using the received data to perform the mapping from the PDU session and/or the Qos flow in the PDU session to the E-RAB, and transmitting downlink data to the base station in the E-UTRAN through the E-RAB.

If it is determined that the indirect data forwarding is performed between the base station in the 5G-RAN and the base station in the E-UTRAN in the process that the UE is handed over from the 5G-RAN to the E-UTRAN, the handover request message may include information of a PDU session, wherein the information of the PDU session may include PDU session identification, information of a Qos flow in the PDU session, information of an E-RAB in the PDU session, and/or correspondence relationship between the Qos flow and the E-RAB in the PDU session, wherein the information of the Qos flow in the PDU session may include identification of the Qos flow and/or Qos information of the Qos flow, and the information of the E-RAB in the PDU session may include identification of the E-RAB, the correspondence relationship between the Qos flow and the E-RAB in the PDU session may include information indicating which E-RAB each Qos flow is mapped to.

In addition, according to the exemplary embodiment, the handover request confirmation message may include tunnel information for direct data forwarding allocated by the E-UTRAN to each PDU session that requires data forwarding, wherein the tunnel information may be included in AP messages of access stratums of the E-UTRAN and the MME or in the target-to-source transparent container. Alternatively, the handover request confirmation message may include tunnel information for direct data forwarding allocated by the E-UTRAN to each E-RAB, wherein the tunnel information may be included in AP messages of access stratums of the E-UTRAN and the MME or in the target-to-source transparent container.

According to the exemplary embodiment, the relocation response message may include information of a Qos flow in the PDU session and information of an E-RAB to which the Qos flow is mapped in the EPS, wherein the information of the Qos flow includes flow identification and/or Qos information corresponding to the flow.

According to the exemplary embodiment, if the direct data forwarding is performed, in the process that the UE is handed over from the 5G-RAN to the E-UTRAN, the base station in the E-UTRAN directly receives data from the base station in the 5G-RAN, wherein the data belonging to the same PDU session is received through one tunnel.

According to another exemplary embodiment, if the direct data forwarding is performed, in the process that the UE is handed over from the 5G-RAN to the E-UTRAN, the base station in the E-UTRAN directly receives data from the base station in the 5G-RAN, wherein the data belonging to the same PDU session is received through the tunnels allocated to different E-RABs.

Preferably, after the UE is handed over from the 5G-RAN to the E-UTRAN, the base station 1601 in the E-UTRAN may further receive a handover completion message from the UE and transmit it to the MME 1602. Here, the handover completion message may include the tunnel information for downlink data transmission allocated by the E-UTRAN.

In addition, the MME 1602 may transmit a bearer modification request to the SGW 1603 after receiving the handover completion message so as to transmit the bearer modification request to the 5GC CP through the SGW to perform the session modification.

Hereinafter, the radio access network handover method according to an exemplary embodiment of the present disclosure will be further described from an aspect of a base station by referring to FIGS. 17-18.

FIG. 17 is a block diagram illustrating a base station 1700 for performing a radio access network handover method according to an exemplary embodiment of the present disclosure.

Referring to FIG. 17, the base station 1700 is a base station in a first radio access network. The base station 1700 includes a determination unit 1701, a transmission unit 1702, and a receiving unit 1703. The determination unit 1701 may be configured to make a decision of handing over a UE connected to the base station from the first radio access network to a second radio access network. The transmission unit 1702 may be configured to transmit a handover required message for requesting for handing over the UE from the first radio access network to the second radio access network to a MME, and transmit a handover command message to the UE such that the UE is handed over from the first radio access network to the second radio access network. The receiving unit 1703 may be configured to receive a handover command message from the MME, wherein the base station forwards data to a base station in the second radio access network in a process that the UE is handed over from the first radio access network to the second radio access network.

Here, the first radio access network may be an E-UTRAN, and the second radio access network may be a 5G-RAN. The handover required message may include: identification of a target 5G-RAN node, and a source-to-target transparent container. The handover required message may further include identification information indicating a 5GC CP to which the target 5G-RAN node is connected, wherein the identification information is tracking area identification, network fragment identification, 5GC CP pool identification, or 5GC CP identification. The handover command message may include a target-to-source transparent container, and tunnel information for data forwarding over a S1 interface, wherein the S1 interface is a communication interface between the base station in the first radio access network and an EPC.

As another embodiment, the handover command message may further include one or more kinds of the following information: information of an E-RAB or E-RABs accepted by the target 5G-RAN, wherein the information of E-RAB or E-RABs includes identification of the E-RAB or E-RABs; information of an E-RAB or E-RABs unaccepted by the target 5G-RAN, wherein the information of the unaccepted E-RAB includes identification of the E-RAB and reasons for being unaccepted; and a target-to-source transparent container. The information of the E-RAB or E-RABs accepted by the 5G-RAN may further include at least one of: tunnel information for data forwarding, information indicating which PDU session the E-RAB belongs to, information indicating which Qos flow the E-RAB is mapped to, and Qos information of each Qos flow.

In addition, the handover command message may further include information of a PDU session. The information of the PDU session may include PDU session identification, a list of identification of E-RABs included in the PDU session, the information of a Qos flow included in the PDU session, the information indicating which Qos flow each E-RAB is mapped to in the PDU session, and/or the tunnel information for direct data forwarding. In this case, the base station 1700 may indirectly forward data to the based station in the second radio access network in the process that the UE is handed over from the first radio access network to the second radio access network. Specifically, the base station 1700 may firstly forward the data to an SGW of the E-UTRAN, and the SGW forwards the data to an anchor UPF, and then the anchor forwards the data to the base station in the 5G-RAN. Specifically, the SGW may forward data to the anchor UPF through the corresponding tunnel for each EPS bearer that requires data forwarding, and subsequently, the anchor UPF transmits the data belonging to the same PDU session received through the tunnel corresponding to each EPS bearer from the SGW to the base station in the 5G-RAN through the same tunnel; or the SGW may transmit the data belonging to the same PDU session received from the tunnel corresponding to each EPS bearer to the anchor UPF through the same tunnel, and subsequently, the anchor UPF directly receives the data from the SGW through the tunnel corresponding to each PDU session and forwards the data to the base station in the 5G-RAN according to a session transmitting method in a 5GS; or the SGW may transmit the data belonging to the same PDU session received from the tunnel corresponding to each E-RAB to the anchor UPF through the same tunnel, and adds information on the Qos and/flow to the data packet header, and subsequently, the anchor UPF directly forwards the data to the base station in the 5G-RAN.

According to the exemplary embodiment, in the process of handing over the UE from the E-UTRAN to the 5G-RAN, the base station 1700 may directly forward data to the base station in the 5G-RAN, wherein the E-UTRAN forwards data to the base station in the 5G-RAN through the corresponding tunnel for each E-RAB that requires data forwarding. According to another exemplary embodiment, in the process that the UE is handed over from the E-UTRAN to the 5G-RAN, the base station 1700 may directly forward data to the base station in the 5G-RAN, wherein the E-UTRAN forwards data to the 5G-RAN according to the tunnel information for data forwarding, wherein the E-RAB data belonging to the same PDU session is forwarded through one tunnel, the E-UTRAN determines which Qos flow the E-RAB uses to transmit data according to the mapping relationship between the E-RAB and the flow, and the E-UTRAN sets the packet header of the forwarded data according to the received Qos information of each Qos flow.

The receiving unit 1703 may be further configured to receive a handover completion message from the UE after the UE is handed over from the 5G-RAN to the E-UTRAN, and the transmission unit may be further configured to transmit the handover completion message to the MME, wherein the handover completion message includes tunnel information for downlink data transmission allocated by the E-UTRAN.

In addition, the receiving unit 1703 may be further configured to receive the handover request message from the MME, wherein the handover request message includes a source-to-target transparent container and an E-RAB context, and wherein the E-RAB context includes uplink tunnel information over the S1 interface allocated by the SGW of the E-UTRAN.

Here, the handover request message may further include information of the PDU session, wherein the information of the PDU session may include PDU session identification, information of a Qos flow in the PDU session, information of an E-RAB in the PDU session, and/or correspondence relationship between the Qos flow and the E-RAB in the PDU session, wherein the information of the E-RAB in the PDU session may include identification of the E-RAB, and the correspondence relationship between the Qos flow and the E-RAB in the PDU session may include information indicating which E-RAB each Qos flow is mapped to.

The transmitting unit 1701 may be further configured to transmit the handover request confirmation message to the MME, wherein the handover request confirmation message includes a list of established E-RABs, a list of E-RABs that are unsuccessfully established, and a target-to-source transparent container. As for the established RAB, it further includes tunnel information for downlink data transmission over the S1 interface. The message includes the tunnel information for data forwarding over the S1 interface allocated by the E-UTRAN to each E-RAB that requires data forwarding.

The transmitting unit 1701 may be further configured to transmit the handover request confirmation message to the MME, wherein the handover request confirmation message includes a list of established E-RABs, a list of E-RABs that are unsuccessfully established, and a target-to-source transparent container. As for the established RAB, it further includes tunnel information for downlink data transmission over the S1 interface. The message includes tunnel information for data forwarding over the S1 interface allocated by the E-UTRAN to each E-RAB or PDU session that requires data forwarding, wherein the tunnel information for direct data forwarding allocated to each PDU session may be included in AP messages of access stratums of the E-UTRAN and the MME or in the target-to-source transparent container, and the E-UTRAN identifies that one data forwarding tunnel is allocated for each PDU session by setting the tunnels for data forwarding of the E-RAB in the same PDU session to be the same.

FIG. 18 is a flow chart illustrating a communication method performed by the base station shown in FIG. 17 according to an exemplary embodiment of the present disclosure. Referring to FIG. 18, in Step S1801, the base station 1700 makes a decision of handing over a UE connected to the base station from the first radio access network to a second radio access network. In Step S1802, a handover required message for requesting for handing over the UE from the first radio access network to the second radio access network is transmitted to a MME. In Step S1803, a handover command message is received from the MME, and a handover command message is transmitted to the UE such that the UE is handed over from the first radio access network to the second radio access network, In Step S1804, the base station 1700 in the first radio access network forwards data to a based station in the second radio access network in the process that the UE is handed over from the first radio access network to the second radio access network.

Here, the first radio access network may be an E-UTRAN, and the second radio access network may be a 5G-RAN. The handover required message may include: identification of a target 5G-RAN node, and a source-to-target transparent container. The handover required message may further include identification information indicating a 5GC CP to which the target 5G-RAN node is connected, wherein the identification information is tracking area identification, network fragment identification, 5GC CP pool identification, or 5GC CP identification. The handover command message may include a target-to-source transparent container, and tunnel information for data forwarding over a S1 interface, wherein the S1 interface is a communication interface between the base station in the first radio access network and an EPC. As another embodiment, the handover command message may further include one or more kinds of the following information: information of an E-RAB or E-RABs accepted by the target 5G-RAN, wherein the information of the E-RAB includes identification of the E-RAB; information of an E-RAB or E-RABs unaccepted by the target 5G-RAN, wherein the information of the unaccepted E-RAB includes identification of the E-RAB and reasons for being unaccepted; and a target-to-source transparent container. The information of the E-RAB accepted by the 5G-RAN may further include at least one of: tunnel information for data forwarding, information indicating which PDU session the E-RAB belongs to, information indicating which Qos flow the E-RAB is mapped to, and Qos information of each Qos flow. The handover command message may further include information of a PDU session or PDU sessions. The information of the PDU session may include PDU session identification, a list of identification of E-RABs included in the PDU session, information of a Qos flow included in the PDU session, information indicating which Qos flow each E-RAB is mapped to in the PDU session, and/or tunnel information for direct data forwarding.

According to the exemplary embodiment, the base station in the first radio access network indirectly forwards data to the based station in the second radio access network in the process that the UE is handed over from the first radio access network to the second radio access network. Specifically, the base station 1700 may firstly forward the data to an SGW of the E-UTRAN, and the SGW forwards the data to an anchor UPF, and then the anchor UPF forwards the data to the base station in the 5G-RAN. Specifically speaking, the SGW may forward data to the anchor UPF through the corresponding tunnel for each EPS bearer that requires data forwarding, and subsequently, the anchor UPF transmits the data belonging to the same PDU session received through the tunnel corresponding to each EPS bearer from the SGW to the base station in the 5G-RAN through the same tunnel; or the SGW may transmit the data belonging to the same PDU session received from the tunnel corresponding to each EPS bearer to the anchor UPF through the same tunnel, and subsequently, the anchor UPF directly receives the data from the SGW through the tunnel corresponding to each PDU session and forwards the data to the base station in the 5G-RAN according to a session transmitting method in a 5GS; or the SGW may transmit the data belonging to the same PDU session received from the tunnel corresponding to each E-RAB to the anchor UPF through the same tunnel, and adds information on the Qos and/flow to the data packet header, and subsequently, the anchor UPF directly forwards the data to the base station in the 5G-RAN.

According to the exemplary embodiment, in the process that the UE is handed over from the E-UTRAN to the 5G-RAN, the base station 1700 may directly forward data to the base station in the 5G-RAN, wherein the E-UTRAN forwards data to the base station in the 5G-RAN through the corresponding tunnel for each E-RAB that requires data forwarding.

According to another exemplary embodiment, in the process that the UE is handed over from the E-UTRAN to the 5G-RAN, the base station 1700 may directly forward data to the base station in the 5G-RAN, wherein the E-UTRAN directly forwards data to the 5G-RAN according to the tunnel information for data forwarding, wherein the E-RAB data belonging to the same PDU session is forwarded through one tunnel, the E-UTRAN determines which Qos flow the E-RAB uses to transmit data according to the received mapping relationship between the E-RAB and the flow, and the E-UTRAN sets the packet header of the forwarded data according to the received Qos information of each Qos flow.

In addition, the method may further include: after the UE is handed over from the 5G-RAN to the E-UTRAN, receiving a handover completion message from the UE and transmitting it to the MME, wherein the handover completion message includes tunnel information for downlink data transmission allocated by the E-UTRAN.

The method may further include: receiving the handover request message from the MME, wherein the handover request message includes a source-to-target transparent container and an E-RAB context, wherein the E-RAB context includes uplink tunnel information over the S1 interface allocated by the SGW of an E-RAB to be established and the E-UTRAN.

Here, the handover request message may further include information of the PDU session, wherein the information of the PDU session may include PDU session identification, information of a Qos flow in the PDU session, information of an E-RAB in the PDU session, and/or correspondence relationship between the Qos flow and the E-RAB in the PDU session, wherein the information of the E-RAB in the PDU session may include identification of the E-RAB, and the correspondence relationship between the Qos flow and the E-RAB in the PDU session may include information indicating which E-RAB each Qos flow is mapped to.

The method may further include: transmitting the handover request confirmation message to the MME, wherein the handover request confirmation message includes a list of established E-RABs, a list of E-RABs that are unsuccessfully established, and a target-to-source transparent container. As for the established RAB, it further includes tunnel information for downlink data transmission over the S1 interface. The message includes the tunnel information for data forwarding over the S1 interface allocated by the E-UTRAN to each E-RAB that requires data forwarding.

The method may further include: transmitting the handover request confirmation message to the MME, wherein the handover request confirmation message includes a list of established E-RABs, a list of E-RABs that are unsuccessfully established, and a target-to-source transparent container. As for the established RAB, it further includes tunnel information for downlink data transmission over the S1 interface. The message includes tunnel information for data forwarding over the S1 interface allocated by the E-UTRAN to each E-RAB or PDU session that requires data forwarding, wherein the tunnel information for direct data forwarding allocated to each PDU session may be included in AP messages of access stratums of the E-UTRAN and the MME or in the target-to-source transparent container, and the E-UTRAN identifies one data forwarding tunnel that is allocated for each PDU session by setting the tunnels for data forwarding of the E-RABs in the same PDU session to be the same.

FIG. 19 is a block diagram illustrating a base station 1900 for performing a radio access network handover method according to another exemplary embodiment of the present disclosure.

Here, the base station 1900 is a based station in a second radio access network. According to an exemplary embodiment, the base station 1900 may include a determination unit 1901, a transmission unit 1902, and a receiving unit 1903. The determination unit 1901 is configured to make a decision of handing over a UE connected to the base station from the second radio access network to a first radio access network. The transmission unit 1902 is configured to transmit a handover required message for requesting for handing over the UE from the second radio access network to the first radio access network to a second core network control plane corresponding to the second radio access network, and transmit a handover command message to the UE such that the UE is handed over from the second radio access network to the first radio access network. The receiving unit 1903 is configured to receive a handover command message from the second core network control plane, wherein the base station 1900 may directly or indirectly forward data to a base station in the first radio access network in the process that the UE is handed over from the second radio access network to the first radio access network. Here, the first radio access network may be an E-UTRAN, the second radio access network may be a 5G-RAN, and the second core network control plane may be a 5GC CP.

According to the exemplary embodiment, the handover required message may include: identification of a target base station, and a source-to-target transparent container. Preferably, the handover required message may further include identification information indicating a MME to which the target base station is connected, wherein the identification information is tracking area identification or MME identification. According to the exemplary embodiment, the handover command message may include a target-to-source transparent container and tunnel information for data forwarding allocated by the 5GC UPF or an anchor UPF, wherein the anchor UPF is a 5GC UPF serving the UE and perform a function of an anchor of user planes in an inter-RAT handover process.

According to another exemplary embodiment, the handover command message may further include one or more kinds of the following information: a target-to-source transparent container; information of a PDU session or PDU sessions accepted by the E-UTRAN, wherein the information of the PDU session includes PDU session identification, information of a PDU flow or PDU flows accepted by the PDU session, and information of an unaccepted PDU flow or PDU flows; a list of information of an established PDU session or PDU sessions unaccepted by the E-UTRAN, wherein the list of the information of the PDU session includes PDU session identification and reasons for being unaccepted. The information of the PDU session may further include tunnel information for direct data forwarding allocated to each E-RAB that requires data forwarding in the PDU session.

In the process that the UE is handed over from the 5G-RAN to the E-UTRAN, the base station 1900 in the 5G-RAN may indirectly forward data to the base station in the E-UTRAN. Specifically, the base station in the 5G-RAN may firstly forward data to the 5GC UPF or the anchor UPF, and subsequently the 5GC UPF or the anchor UPF forwards the data to the base station in the E-UTRAN, wherein the base station 1900 in the 5G-RAN forwards the data to the 5GC UPF or the anchor UPF through the corresponding tunnel for each PDU session that requires data forwarding.

Specifically speaking, the anchor UPF may forward the data to the SGW of the E-UTRAN through the corresponding tunnel for each EPS bearer that requires data forwarding, and the SGW forwards the data to the base station in the E-UTRAN according to a session transmitting method in the EPS; or the anchor UPF transmits the data received from the tunnel corresponding to the same PDU session to the SGW through one tunnel, the SGW performs mapping from the PDU session to the EPS bearer and/or mapping from the Qos flow in the PDU session to the EPS bearer and transmits the data to the base station in the E-UTRAN through the corresponding EPS bearer.

According to the exemplary embodiment, in the process that the UE is handed over from the 5G-RAN to the E-UTRAN, the base station 1900 in the 5G-RAN may directly forward data to the base station in the E-UTRAN, wherein the data belonging to the same PDU session is forwarded through one tunnel.

According to another exemplary embodiment, in the process that the UE is handed over from the 5G-RAN to the E-UTRAN, the base station 1900 in the 5G-RAN may directly forward data to the base station in the E-UTRAN, wherein the base station in the 5G-RAN forwards the data of the same PDU session to the base station in the E-UTRAN through the tunnels allocated to different E-RABs.

The receiving unit 1903 may be further configured to receive a handover completion message from the UE after the UE is handed over from the E-UTRAN to the 5G-RAN, and the transmission unit may be further configured to transmit the handover completion message to the 5GC CP, wherein the handover completion message includes tunnel information for downlink data transmission allocated by the 5G-RAN.

The receiving unit 1903 may be further configured to receive a handover request message from the 5GC CP, wherein the handover request message includes information of a PDU session or PDU sessions to be established, wherein the information of the PDU session includes session identification, Qos information of the session, flow information, uplink tunnel information of each session, and a source-to-target transparent container.

The transmission unit may be further configured to transmit a handover request confirmation message to the 5GC CP, wherein the handover request confirmation message includes one or more of: a target-to-source transparent container; a list of information of an established PDU session or PDU sessions accepted by the 5G-RAN, wherein the list of the information of the PDU session includes PDU session identification, tunnel information for the PDU session over a NG3 interface, information of a PDU flow or PDU flows accepted by the PDU session, information of an unaccepted PDU flow or PDU flows, and tunnel information for data forwarding over the NG3 interface; and a list of information of an established PDU session or PDU sessions unaccepted by the 5G-RAN, wherein the list of the information of the PDU session includes PDU session identification and reasons for being unaccepted.

The handover request message may further include information of an E-RAB or E-RABs included in each PDU session in an EPS, or the handover request message may further include a mapping relationship between the E-RAB and the Qos flow in each PDU session. The list of the information of the PDU session as mentioned above may further include the information of an accepted E-RAB or E-RABs in the PDU session, and tunnel information for direct data forwarding allocated to each E-RAB that requires data forwarding in the PDU session.

The handover request message may further include information indicating how to determine a Qos flow mapping policy, wherein after receiving the data of the tunnel with respect to one PDU session from the E-UTRAN, the base station in the 5G-RAN can determine how to map the received data to different Qos flows according to the policy information.

The list of the information of the PDU session as mentioned above may further include tunnel information for direct data forwarding, wherein the direct data forwarding is performed by an interface between the base station in the 5G-RAN and the base station in the E-UTRAN.

FIG. 20 is a flow chart illustrating a communication method performed by the base station 1900 shown in FIG. 19 according to an exemplary embodiment of the present disclosure.

Referring to FIG. 20, in Step S2001, the base station 1900 makes a decision of handing over a UE connected to the base station from the second radio access network to the first radio access network. In Step S2002, the base station 1900 transmits a handover required message for requesting for handing over the UE from the second radio access network to the first radio access network to a second core network control plane corresponding to the second radio access network, receives a handover command message from the second core network control plane, and transmits a handover command message to the UE such that the UE is handed over from the second radio access network to the first radio access network. In Step S2003, the base station 1900 directly or indirectly forwards data to a based station in the first radio access network in the process that the UE is handed over from the second radio access network to the first radio access network. Here, the first radio access network may be an E-UTRAN, the second radio access network may be a 5G-RAN, and the second core network control plane may be a 5GC CP.

The handover required message may include: identification of a target base station, and a source-to-target transparent container. The handover required message may further include identification information indicating a MME to which the target base station is connected, wherein the identification information is tracking area identification or MME identification.

According to the exemplary embodiment, the handover command message may include a target-to-source transparent container and tunnel information for data forward allocated by the 5GC UPF or an anchor UPF, wherein the anchor UPF is a 5GC UPF serving the UE and performs a function of an anchor of user planes in an inter-RAT handover process.

According to another exemplary embodiment, the handover command message may further include one or more kinds of the following information: a target-to-source transparent container; information of a PDU session or PDU sessions accepted by the E-UTRAN, wherein the information of the PDU session includes PDU session identification, information of a PDU flow or PDU flows accepted by the PDU session, and information of an unaccepted PDU flow or PDU flows; and a list of information of an established PDU session or PDU sessions unaccepted by the E-UTRAN, wherein the list of the information of the PDU session includes PDU session identification and reasons for being unaccepted. The information of the PDU session may further include tunnel information for direct data forwarding allocated to each E-RAB that requires data forwarding in the PDU session.

According to the exemplary embodiment, in the process that the UE is handed over from the 5G-RAN to the E-UTRAN, the base station 1900 in the 5G-RAN may indirectly forward data to the base station in the E-UTRAN. Specifically, the base station in the 5G-RAN may firstly forward data to the 5GC UPF or the anchor UPF, and subsequently the 5GC UPF or the anchor UPF forwards the data to the base station in the E-UTRAN, wherein the base station in the 5G-RAN forwards data to the 5GC UPF or the anchor UPF through the corresponding tunnel for each PDU session that requires data forwarding. Specifically speaking, the anchor UPF may forward the data to the SGW of the E-UTRAN through the corresponding tunnel for each EPS bearer that requires data forwarding, and the SGW forwards the data to the base station in the E-UTRAN according to a session transmitting method in the EPS; or the anchor UPF may transmit the data received from the tunnel corresponding to the same PDU session to the SGW through one tunnel, the SGW performs mapping from the PDU session to the EPS bearer and/or mapping from the Qos flow in the PDU session to the EPS bearer and transmits the data to the base station in the E-UTRAN through the corresponding EPS bearer.

According to the exemplary embodiment, in the process that the UE is handed over from the 5G-RAN to the E-UTRAN, the base station 1900 in the 5G-RAN may directly forward data to the base station in the E-UTRAN, wherein the data belonging to the same PDU session is forwarded through one tunnel.

According to another exemplary embodiment, in the process that the UE is handed over from the 5G-RAN to the E-UTRAN, the base station in the 5G-RAN may directly forward data to the base station in the E-UTRAN, wherein the base station in the 5G-RAN forwards the data of the same PDU session to the base station in the E-UTRAN through the tunnels allocated to different E-RABs.

The method may further include: receiving a handover completion message from the UE after the UE is handed over from the E-UTRAN to the 5G-RAN, and transmitting the handover completion message to the 5GC CP, wherein the handover completion message includes tunnel information for downlink data transmission allocated by the 5G-RAN.

The method may further include: receiving a handover request message from the 5GC CP, wherein the handover request message includes information of a PDU session or PDU sessions to be established, wherein the information of the PDU session includes session identification, Qos information of the session, flow information, uplink tunnel information of each session, and a source-to-target transparent container.

The method may further include: transmitting a handover request confirmation message to the 5GC CP, wherein the handover request confirmation message includes one or more of: a target-to-source transparent container; a list of information of an established PDU session or PDU sessions accepted by the 5G-RAN, wherein the list of the information of the PDU session includes PDU session identification, tunnel information for the PDU session over a NG3 interface, information of a PDU flow or PDU flows accepted by the PDU session, information of an unaccepted PDU flow or PDU flows, and tunnel information for data forwarding over the NG3 interface; and a list of information of an established PDU session or PDU sessions unaccepted by the 5G-RAN, wherein the list of the information of the PDU session includes PDU session identification and reasons for being unaccepted. The handover request message may further include information of an E-RAB or E-RABs included in each PDU session in an EPS, or the handover request message may further include a mapping relationship between the E-RAB and the Qos flow in each PDU session. The list of the information of the PDU session may further include information of the accepted E-RAB or E-RABs in the PDU session, and tunnel information for direct data forwarding allocated to each E-RAB that requires data forwarding in the PDU session.

The handover request message may further include information indicating how to determine a Qos flow mapping policy, wherein after receiving the data of the tunnel with respect to one PDU session from the E-UTRAN, the base station in the 5G-RAN can determine how to map the received data to different Qos flows according to the policy information. The list of the information of the PDU session as mentioned above may further include tunnel information for direct data forwarding, wherein the direct data forwarding is performed by an interface between the base station in the 5G-RAN and the base station in the E-UTRAN.

Hereinafter, the radio access network handover method described by referring to FIGS. 3-8 will be further described from an aspect of a UE by referring to FIGS. 21-22. It should be understood that the description and explanations for the related terms, steps and so on in FIGS. 3-8 are also adapted to FIGS. 21 and 22, which will not be repeated here.

FIG. 21 is a block diagram illustrating a UE 2100 according to an exemplary embodiment of the present disclosure.

Referring to FIG. 21, the UE 2100 includes a receiving unit 2101, a handover unit 2102, and a transmission unit 2103. The receiving unit 2101 may be configured to receive a handover command message for handing over the UE from a first radio access network to a second radio access network from a first base station, or receive a handover command message for handing over the UE from the second radio access network to the first radio access network from a second base station. The handover unit 2102 may be configured to hand over the UE from the first radio access network to the second radio access network according to the handover command message received from the first base station, or handover the UE from the second radio access network to the first radio access network according to a handover command message received from the second base station. The transmission unit 2103 may be configured to transmit a handover completion message to the first base station after the UE is handed over from the first radio access network to the second radio access network, or transmit a handover completion message to the second base station after the UE is handed over from the second radio access network to the first radio access network.

Here, the first radio access network may be an E-UTRAN, the second radio access network may be a 5G-RAN, the first base station may be a base station in the E-UTRAN, and the second base station may be a base station in the 5G-RAN.

According to the exemplary embodiment, the handover command message received from the first base station may include a target-to-source transparent container, and tunnel information for data forwarding over a S1 interface, wherein the S1 interface is a communication interface between the first base station and an EPC.

According to another exemplary embodiment, the handover command message received from the first base station may further include one or more kinds of the following information: information of an E-RAB or E-RABs accepted by the target 5G-RAN, wherein the information of the E-RAB includes identification of the E-RAB; information of an E-RAB or E-RABs unaccepted by the target 5G-RAN, wherein the information of the unaccepted E-RAB includes identification of the E-RAB and reasons for being unaccepted; and a target-to-source transparent container. The information of the E-RAB accepted by the 5G-RAN may further include at least one of: tunnel information for data forwarding, information indicating which PDU session the E-RAB belongs to, information indicating which Qos flow the E-RAB is mapped to, and Qos information of each Qos flow. According to another exemplary embodiment, the handover command message received from the first base station may further include information of a PDU session. The information of the PDU session may include PDU session identification, a list of identification of E-RAB or E-RABs included in the PDU session, information of a Qos flow or Qos flows included in the PDU session, information indicating which Qos flow each E-RAB is mapped to in the PDU session, and/or tunnel information for direct data forwarding.

According to the exemplary embodiment, the handover completion message transmitted to the first base station may include tunnel information for downlink data transmission allocated by the E-UTRAN. The receiving unit 2101 may be further configured to receive the data forwarded by the E-UTRAN to the 5G-RAN from the 5G-RAN, and receive the data transmitted by a 5GC UPF or an anchor UPF to the 5G-RAN from the 5G-RAN, wherein the anchor UPF is a 5GC UPF serving the UE and performs a function of an anchor of user planes in an inter-RAT handover process.

According to the exemplary embodiment, the handover command message received from the second base station may include a target-to-source transparent container and tunnel information for data forwarding allocated by a 5GC UPF or an anchor UPF, wherein the anchor UPF is a 5GC UPF serving the UE and performs a function of an anchor of user planes in an inter-RAT handover process.

According to another exemplary embodiment, the handover command message received from the second base station may further include one or more kinds of the following information: a target-to-source transparent container; information of a PDU session or PDU sessions accepted by the E-UTRAN, wherein the information of the PDU session includes PDU session identification, information of a PDU flow or PDU flows accepted by the PDU session o, and information of an unaccepted PDU flow or PDU flows; and a list of information of an established PDU session or PDU sessions unaccepted by the E-UTRAN, wherein the list of the information of the PDU session includes PDU session identification and reasons for being unaccepted. Here, the information of the PDU session may further include tunnel information for direct data forwarding allocated to each E-RAB that requires data forwarding in the PDU session. The handover completion message transmitted to the second base station may include tunnel information for downlink data transmission allocated by the 5G-RAN.

The receiving unit 2101 may be further configured to receive the data forwarded by the second base station to the first base station from the first base station, and receive the data transmitted by an SGW of an EPS to the first base station from the first base station.

FIG. 22 is a flow chart illustrating a communication method performed by the UE shown in FIG. 21 according to an exemplary embodiment of the present disclosure.

Referring to FIG. 22, in Step 2201, a handover command message for handing over the UE from a first radio access network to a second radio access network is received from a first base station, or a handover command message for handing over the UE from the second radio access network to the first radio access network is received from a second base station. In Step 2202, the UE is handed over from the first radio access network to the second radio access network according to the handover command message received from the first base station, or the UE is handed over from the second radio access network to the first radio access network according to the handover command message received from the second base station. In Step 2203, a handover completion message is transmitted to the first base station after the UE is handed over from the first radio access network to the second radio access network, or a handover completion message is transmitted to the second base station after the UE is handed over from the second radio access network to the first radio access network. Here, the first radio access network may be an E-UTRAN, the second radio access network may be a 5G-RAN, the first base station may be a base station in the E-UTRAN, and the second base station may be a base station in the 5G-RAN. According to the exemplary embodiment, the handover command message received from the first base station may include a target-to-source transparent container, and tunnel information for data forwarding over a S1 interface, wherein the S1 interface is a communication interface between the first base station and an EPC.

According to another exemplary embodiment, the handover command message received from the first base station may further include one or more kinds of the following information: information of an E-RAB or E-RABs accepted by the target 5G-RAN, wherein the information of the E-RAB includes identification of the E-RAB; information of an E-RAB or E-RABs unaccepted by the target 5G-RAN, wherein the information of the unaccepted E-RAB includes identification of the E-RAB and reasons for being unaccepted; and a target-to-source transparent container. The information of the E-RAB accepted by the 5G-RAN may further include at least one of: tunnel information for data forwarding, information indicating which PDU session the E-RAB belongs to, information indicating which Qos flow the E-RAB is mapped to, and Qos information of each Qos flow. The handover command message received from the first base station may further include information of a PDU session. Here, the information of the PDU session may include PDU session identification, a list of identification of E-RAB or E-RABs included in the PDU session, information of a Qos flow or Qos flows included in the PDU session, information indicating which Qos flow each E-RAB is mapped to in the PDU session, and/or tunnel information for direct data forwarding.

According to the exemplary embodiment, the handover completion message transmitted to the first base station may include tunnel information for downlink data transmission allocated by the E-UTRAN.

The method may further include: receiving the data forwarded by the E-UTRAN to the 5G-RAN from the 5G-RAN, and receiving the data transmitted by a 5GC UPF or an anchor UPF to the 5G-RAN from the 5G-RAN, wherein the anchor UPF is a 5GC UPF serving the UE and performs a function of an anchor of user planes in an inter-RAT handover process.

According to the exemplary embodiment, the handover command message received from the second base station may include a target-to-source transparent container and tunnel information for data forwarding allocated by a 5GC UPF or an anchor UPF, wherein the anchor UPF is a 5GC UPF serving the UE and performs a function of an anchor of user planes in an inter-RAT handover process.

According to another exemplary embodiment, the handover command message received from the second base station may further include one or more kinds of the following information: a target-to-source transparent container; information of a PDU session or PDU sessions accepted by the E-UTRAN, wherein the information of the PDU session includes PDU session identification, information of a PDU flow or PDU flows accepted by the PDU session, and information of an unaccepted PDU flow or PDU flows; a list of information of an established PDU session or PDU sessions unaccepted by the E-UTRAN, wherein the list of the information of the PDU session includes PDU session identification and reasons for being unaccepted. The information of the PDU session may further include tunnel information for direct data forwarding allocated to each E-RAB that requires data forwarding in the PDU session.

According to another exemplary embodiment, the handover completion message transmitted to the second base station may include tunnel information for downlink data transmission allocated by the 5G-RAN.

The method may further include: receiving the data forwarded by the second base station to the first base station from the first base station, and receiving the data transmitted by an SGW of an EPS to the first base station from the first base station.

FIG. 23 is a diagram illustrating a radio access network handover method according to another exemplary embodiment of the present disclosure.

The method is used to support indirect data forwarding during a process of handing over from an NGS or a 5GS to an EPS. As for a PDU session in the 5GS, it is called as a Packet Data Network (PDN) connection in the EPS. Their meanings are the same, and they have a one-to-one correspondence relationship. Thus, it is also called as a PDU session in the EPS, which actually refers to a PDN connection. The method includes the following steps:

Step 2301, an NG-RAN decides to hand over a UE to an E-UTRAN.

Here, the E-UTRAN may be an eNB connected to an EPC. The NG-RAN may be a gNB or a concentration unit of a gNB or an eNB connected to a 5GC.

A user plane path before the handover is from a UPF to an NG-RAN. The UPF may further include a function of a PGW user plane (PGW-U) and performs a function of an anchor of user planes in an inter-RAT handover process. The SGW is required to support an interface with the anchor UPF.

There are one or more ongoing PDU sessions for the UE. Each of the PDU session includes one or more Qos flows. In a process that a PDU session or a Guaranteed Business Rate (GRB) Qos flow is established, the mapped EPS Qos information and/or EPS bearer identification is/are allocated to a Qos flow. Non-Guaranteed Business Rate (non-GBR) Qos flows are mapped to default EPS bearers. The GRB Qos flows are mapped to EPS specified bearers. The EPS Qos information and/or the EPS bearer identification to which the Qos flow is mapped is/are allocated by a PCC or SMF. In order to support the inter-system handover, the SMF may further include a function of PGW control plane (PGW-C function). In a scene that a PCC is deployed, a Policy Control Function (PCF) provides an EPS Qos and/or EPS bearer identification to which the Qos flow is mapped to the SMF. In order to support the inter-system handover, the PCF may further include a Policy and Charging Rules Function (PCRF) thereon. The SMF transmits the EPS Qos information and/or the EPS bearer identification to which the Qos flow is mapped to the UE through the AMF, for example, a message of establishing a PDU session is transmitted to the UE through a non-access stratum message. An E-RAB and an EPS bearer are the same or correspond to each other. It is called as an EPS bearer in a core network, and called as an E-RAB in an access network. Identification of an E-RAB (E-RAB identification) and identification of an EPS bearer (EPS bearer identification) are the same or correspond to each other. It is called as identification of an EPS bearer in a core network, and called as identification of an E-RAB in an access network.

Step 2302, the NG-RAN transmits a handover required message to an AMF. The message includes identification of a target eNB and a source-to-target transparent container. The message further includes identification information indicating an MM to which the target eNB is connected. The identification information may be tracking area identification, or MME identification.

The NG-RAN notifies the AMF of a type of the handover. The type of the handover includes a handover inside NR, a handover from NR to LTE, a handover from NR to UTRAN, and a handover from NR to GERAN and/or GSM. The type of the handover may be a handover inside an LTE, a handover from an LTE connected to EPC to an LTE connected to EPC, a handover from an E-UTRAN to an E-UTRAN, a handover from an LTE connected to EPC to an LTE connected to 5GC, a handover from an E-UTRAN to an NG-RAN, a handover from an LTE connected to 5GC to an LTE connected to EPC, a handover from an NG-RAN to an E-UTRAN, a handover from an LTE connected to EPC to an LTE connected to NR, a handover from an E-UTRAN to an NR, a handover from an LTE connected to EPC to an NR, or a handover from an E-UTRAN to an NR. As for the handover from an NR to an LTE, the NG-RAN notifies the AMF of whether a target base station of the handover is a base station connected to a 5G core network (5GC) or a base station connected to an EPC. If the target base station is connected to the 5GC, it is the handover inside the 5GS. If the target base station is connected to the EPC but not connected to the 5GC, it is the inter-system handover. Since an LTE base station eNB may support an interface with the 5GC, or may not support the interface with the 5GC but is merely connected to the EPC, the NG-RAN may notify the AMF of the handover is not the inter-system handover by including information about a inter-system handover or information about there being no interface between the target base station and the 5GC. If a length of identification of an eNB connected to the 5GC is different from a length of identification of an eNB that is not connected to the 5GC, the AMF may determine whether it is the inter-system handover according to the length of identification of the target base station included in the received handover required message. If a definition of identification of the MME to which the target base station is connected is different from that of identification of the 5GC CP node (for example, the lengths are different), the AMF may determine whether it is the inter-system handover according to a length of identification of a core network to which the target base station is connected included in the received handover required message. Or, the NG-RAN notifies the AMF of the type of the handover by directly setting the type of the handover as a handover from NR to the eNB connected to the EPC or the handover from NR to the eNB connected to the 5GC in the handover required message. The type of the handover indicates whether the core network to which the target eNB is connected is the EPC or the 5GC. If it is the 5GC, it is the handover inside the system. If it is the EPC, it is the inter-system handover.

The NG-RAN may know whether the target eNB supports an interface with the 5GC by the following methods:

Method 1: The eNB broadcasting whether it supports the interface with the 5GC. The UE reads broadcast information of the eNB, and transmits information about whether a neighboring base station supports the interface with the 5GC to a service base station, such as a gNB, of the UE.

Method 2: The eNB notifies the gNB of whether it supports the interface with the 5GC through a process of establishing an interface between the gNB and the eNB.

Method 3: The gNB knows whether the eNB supports the interface with the 5GC though O&M configuration.

As for the handover from an NG-RAN to an E-UTRAN, the source-to-target transparent container includes content of a source eNB to a target eNB transparent container. The NG-RAN includes the source eNB to the target eNB transparent container in the handover required message. The NG-RAN does not need to include a list of information of the E-RAB or E-RABs in the source eNB to the target eNB transparent container. The source eNB to the target eNB transparent container further includes a RRC container. Content in the RRC container is organized according to handover preparation of the LTE.

If a base station within which a target cell of the handover is located is an eNB that supports an interface with the 5GC, the NG-RAN includes a source base station to a target base station transparent container 2 in the handover required message. The NG-RAN includes a list of information of a PDU session or PDU sessions in the source based station to the target base station transparent container 2. The information of the PDU session includes PDU session identification, information of a Qos flow or Qos flows and/or a mapping relationship from a Qos flow to a DRB. The source base station to the target base station transparent container 2 further includes a RRC container. Content in the RRC container is organized according to handover preparation of the LTE. The source-to-target transparent container includes content of the source base station to the target base station transparent container 2.

The NG-RAN proposes downlink data forwarding for a PDU session. The NG-RAN includes PDU session identification and a downlink data forwarding proposal in the handover request message. The information may be included in the target-to-source transparent container or may be directly included in the handover required message.

Step 2303*a*, the AMF transmits a SM context request message to the AMF. The AMF requests a SMF to provide a SM context. The AMF transmits the message to each SMF that serves the UE. The AMF may further request for an EPS bearer context. According to the information about the target base station being not connected to the 5GC or the information about the handover being the inter-system handover or the handover from NR to the eNB connected to the EPC received from the source NG-RAN, the AMF knows that the handover is the inter-system handover, and requests the SMF to provide information of the mapped EPS bearer context. The AMF may transmit information of downlink data forwarding proposal for the PDU session received from the NG-RAN to the SMF. The AMF transmits PDU session identification and the information of the downlink data forwarding proposal to the SMF. The information of the downlink data forwarding proposal may be transmitted to the SMF through the AMF.

Step 2303*b*, the SMF transmits a SM context response message to the AMF. The message includes a SM context of the UE. The SM context further includes the mapped EPS bearer context, such as identification of the EPS bearer and/or Qos information of the EPS. If the SMF has the mapped EPS bearer context when the AMF requests for the SM context, the SMF always return the mapped EPS bearer context to the AMF at the same time. Or, when the AMF also indicates to request for the EPS bearer context while requesting for the SM context from the SMF, the SMF transmits the mapped EPS bearer context to the AMF while the AMF requests for the mapped EPS context. The SMF transmits the PDU session identification and the information of the downlink data forwarding proposal to the AMF.

Step 2304, the AMF transmits a relocation request message to the MME. The AMMF selects and finds out the MME according to the identification information indicating the MME to which the target eNB is connected included in the handover required message. The identification information of the MME to which the target eNB is connected may be TAI or MME identification. The message includes identification of the target eNB, a source-to-target transparent container, 5GS UE context information or mapped EPS UE context information. The 5GS UE context information or the mapped EPS UE context information includes context information of Mobile Management (MM) of the UE and a session management (SM) context. The message includes a type of the handover. The specific type of handover is the same as that in the Step 2302, which will not be repeated here.

If the NG-RAN proposes downlink data forwarding for a PDU session, the AMF may include information of downlink data forwarding proposal in the information of the EPS bearer included in the PDU session. The AMF obtains the EPS bearer context included in the PDU session in the Step 2303.

The AMF transmits information of downlink data forwarding proposed with respect to the EPS bearer to the MME.

The 5GC CP notifies the MME of information of a Qos flow included in a PDU session or a mapping relationship from a Qos flow to an EPS bearer.

Step 2305, the MME transmits a session creation request message to an SGW. The message includes EPS bearer context information.

Step 2306, the SGW transmits a session creation response message to the MME. The message includes tunnel information for uplink data transmission over a S1 interface allocated by the SGW.

Step 2307, the MME transmits the handover request message to the E-UTRAN. The message includes a source-to-target transparent container, and a list of E-RABs to be established. The information of an E-RAB to be established include identification of the E-RAB to be established, Qos information of the E-RAB, and uplink tunnel information over a S1 interface allocated by the SGW. The information of the E-RAB to be established includes information indicating whether data forwarding is available. The MME determines whether data forwarding is available. The MME transmits information of downlink data forwarding proposed for the E-RAB (i.e., the EPS bearer) to the E-UTRAN. The information of the E-RAB to be established includes a downlink data forwarding proposal. The message includes a type of the handover, and the specific content is the same as that in the Step 2302, which will not be repeated here.

Step 2308, the E-UTRAN transmits a handover request confirmation message to the MME. The message includes a list of established E-RABs, a list of E-RABs that are unsuccessfully established, and a target-to-source transparent container. As for the established RAB, it further includes tunnel information for downlink data transmission over the S1 interface. As for the established RAB, if the target base station receives the downlink data forwarding proposal, and data forwarding is available and the target eNB accepts the downlink data forwarding, the target base station includes tunnel information for data forwarding over the S1 interface allocated by the E-UTRAN to each E-RAB that requires data forwarding. Different the prior art, the target eNB needs to know whether the source base station proposes the downlink data forwarding according to the downlink data forwarding proposal corresponding to the E-RAB in the handover required message.

Step 2309, the MME requests the SGW to create an indirect data forwarding tunnel. This step is executed when it needs to perform the indirect data forwarding. If the MME receives the downlink tunnel information for data forwarding over the S1 interface from the E-UTRAN, the MME requests the SGW to create the indirect data forwarding tunnel. The MME transmits the transport layer address and TEID for data forwarding allocated by the eNB to the SGW. The transport layer address and TEID correspond to each E-RAB.

The SGW transmits a response message of creating a indirect data forwarding tunnel to the MME. The message includes information for the data forwarding between the SGW and the UPF allocated by the SGW. The information for the data forwarding between the SGW and the UPF includes identification of the EPS bearer and tunnel information for data forwarding allocated to the EPS bearer allocated by the SGW. The tunnel information includes a transport layer address and a TEID allocated by the SGW. The SGW allocates downlink data forwarding tunnel information to the EPS bearer that requires downlink data forwarding. The data forwarding tunnel information included in the information of the E-RAB is downlink data forwarding tunnel information.

There are two methods for data forwarding between the UPF and the SGW:

Method 1: A data transmission method between the UPF and the SGW is that one tunnel is for each EPS bearer of each PDU session. The UPF transmits data of a plurality of Qos flows belonging to the same PDU session received from the NG-RAN to the SGW through the tunnels of the EPS bears corresponding to each Qos flow, respectively, that is, the anchor UPF performs mapping from one tunnel to multiple tunnels. The UPF performs the mapping from one tunnel to multiple tunnels according to the correspondence relationship between the Qos flow and the EPS bearer or E-RAB in the PDU session. As for this forwarding method, the SGW allocates tunnel information for the data forwarding between the SGW and the UPF to each EPS bearer that requires data forwarding in each PDU session. As for each PDU session, the number of the data forwarding tunnels equals to the number of the EPS bearers. The UPF knows information of an EPS bearer in each PDU session, information of an EPS bear that requires data forwarding, a mapping relationship between a Qos flow and an EPS bearer and/or identification of the EPS bearer according to the information received from the SMF in the Step 2312. The UPF knows information of a Qos flow included in the PDU session in the 5GS.

Method 2: A data transmission method between the UPF and the SGW is that one tunnel is for each PDU session. The SGW maps the data received from the tunnels belonging to the same PDU session to the tunnel corresponding to each EPS bearer, and transmits the data to the E-UTRAN.

As for the data forwarding method 2, the SGW allocates the tunnel information for data forwarding to each PDU session. The SGW transmits the information to the MME by two methods:

Method i: The SGW sets the forwarding tunnels of the E-RABs corresponding to the same PDU session to be the same in the message.

Method ii: A first response message of creating the forwarding tunnel includes the PDU session identification and the forwarding tunnel information of each E-RAB.

The Step 2309 is executed when the indirect data forwarding is available.

Step 2310, the MME transmits a relocation response message to the AMF. The message includes information of established E-RABs (or EPS bearers) and information of E-RABs (or EPS bearers) that are unsuccessfully established. The information of the established E-RABs includes tunnel information for data forwarding allocated by the SGW. As for the data forwarding methods 1 and 2 between the UPF and the SGW, the tunnel information is with respect to each EPS bearer or corresponds to each PDU session. The message includes a target-to-source transparent container. As for the data forwarding method 1 between the UPF and the SGW, the MME transmits the information of the EPS bearer and the tunnel information for data forwarding allocated to each EPS bearer by the SGW to the AMF.

The message includes information for the data forwarding between the SGW and the UPF allocated by the SGW. The information for data forwarding between the SGW and the UPF includes PDU session identification and/or a list of information of an E-RAB or E-RABs (or an EPS bearer or EPS bearers). The information of the E-RAB includes identification of the E-RAB and tunnel information for data forwarding of the E-RAB. As for the data forwarding method 1 between the UPF and the SGW, the information for the data forwarding between the SGW and the UPF includes the tunnel information for data forwarding allocated to each E-RAB in each PDU session by the SGW. The tunnel information for data forwarding may include downlink data forwarding tunnel information.

Step 2311, the AMF transmits a request message of creating a indirect data forwarding tunnel to the SMF. The message includes information of a PDU session. The information of the PDU session includes PDU session identification, information of a Qos flow included in the PDU session, a mapping relationship between a Qos flow and an EPS bearer, and/or Qos information of the EPS bearer. The information of the EPS bearer includes identification of the EPS bearer, Qos information of the EPS bearer, and/or tunnel information for data forwarding. The tunnel information for data forwarding is received from the MME. The UPF knows the EPS bearer that requires data forwarding according to the tunnel information for data forwarding. The UPF knows the information of the Qos flow that requires data forwarding according to the mapping relationship between the Qos flow and the EPS bearer. The information of the PDU session may further include information of the Qos flow that requires data forwarding.

As for the data forwarding method 1 between the UPF and the SGW, the information of the EPS bearer further includes the tunnel information for data forwarding which is received from the MME. The UPF knows the EPS bearer that requires data forwarding according to the tunnel information for data forwarding. The UPF knows the information of the Qos flow that requires data forwarding according to the mapping relationship between the Qos flow and the EPS bearer. The information of the PDU session may further include information of the Qos flow that requires data forwarding.

As for the data forwarding method 2 between the UPF and the SGW, the information of the PDU session includes tunnel information for data forwarding.

The AMF notifies the SMF of correspondence relationship between a Qos flow and an E-RAB in the PDU session. The SMF knows the information of the Qos flow in the PDU session in the 5GS, receives the information of the E-RAB and a mapping relationship between the Qos flow and the E-RAB included in the PDU session.

Step 2312, the SMF transmits a N4 session modification message to the UPF. The message includes information of a PDU session. The information of the PDU session includes PDU session identification, information of a Qos flow included in the PDU session, a mapping relationship between a Qos flow and an EPS bearer, and/or information of the EPS bearer. The information of the EPS bearer includes identification of the EPS bearer, Qos information of the EPS bearer, and/or tunnel information for data forwarding. The tunnel information for data forwarding is received from the MME. The UPF knows the EPS bearer that requires data forwarding according to the tunnel information for data forwarding. The UPF knows the information of the Qos flow that requires data forwarding according to the mapping relationship between the Qos flow and the EPS bearer. The information of the PDU session may further include information of the Qos flow that requires data forwarding.

As for the data forwarding method 1 between the UPF and the SGW, the information of the EPS bearer further includes the tunnel information for data forwarding which is received from the MME. The UPF knows the EPS bearer that requires data forwarding according to the tunnel information for data forwarding. The UPF knows the information of the Qos flow that requires data forwarding according to the mapping relationship between the Qos flow and the EPS bearer. The information of the PDU session may further include information of the Qos flow that requires data forwarding.

As for the data forwarding method 2 between the UPF and the SGW, the information of the PDU session includes tunnel information for data forwarding.

The SMF notifies the UPF of correspondence relationship between a Qos flow and an E-RAB in the PDU session. The UPF knows the information of the Qos flow in the PDU session in the 5GS, receives the information of the E-RAB and a mapping relationship between the Qos flow and the E-RAB included in the PDU session.

The UPF allocates the tunnel information for the data forwarding between the NG-RAN and the UPF and transmits it to the SMF. The NG-RAN and the UPF performs data forwarding in accordance with one user plane tunnel for each PDU session. As for this data forwarding method, the UPF allocates the tunnel information for each PDU session. The tunnel information includes a transport layer address and a Tunnel Endpoint Identifier (TEID).

The UPF transmits the allocated tunnel information for data forwarding to the SMF. The SMF receives an N4 session modification response message from the UPF. The message includes tunnel information for the data forwarding between the NG-RAN and the UPF allocated by the UPF.

Step 2313, the SMF transmits a response message of creating a indirect data forwarding tunnel to the AMF. The message includes tunnel information for the data forwarding between the NG-RAN and the UPF. The tunnel information for the data forwarding between the NG-RAN and the UPF is received from the UPF or is allocated by the SMF.

Step 2314, the AMF transmits a handover command message to the NG-RAN. The message includes a target-to-source transparent container, and tunnel information for data forwarding. The tunnel information for data forwarding is used for the data forwarding between the NG-RAN and the UPF. The tunnel information for data forwarding is allocated by the UPF or the SMF. The message further includes information of an established PDU session and information of a PDU session that is unsuccessfully established. The information of the established PDU session includes PDU session identification, information of an established Qos flow and information of a Qos flow that is unsuccessfully established. The tunnel information for data forwarding corresponds to each PDU session. An existence of the tunnel information for data forwarding represents that the target base station accepts the data forwarding the PDU session. An absence of the tunnel information for data forwarding represents that the target base station does accept the data forwarding the PDU session.

In the Step 2303, the AMF knows the mapping relationship from the Qos flow to the EPS bearer in the PDU session. The AMF knows information of the E-RAB forwarded by downlink data accepted by the target E-UTRAN. The AMF may know the information of the PDU session that accepts the downlink data forwarding according to the mapping relationship from the Qos flow to the E-RAB.

The AMF may notify the NG-RAN of information of the PDU session that accepts the downlink data forwarding through a handover command. The AMF may notify the NG-RAN of the PDU session forwarded by the downlink data accepted by the target base station by including the downlink data forwarding tunnel information of the PDU session included in the information of the established PDU session. The downlink data forwarding tunnel information for the PDU session is the downlink data forwarding tunnel information received in the Step 2313.

Step 2315, the NG-RAN transmits a handover command message to the UE.

The NG-RAN forwards data to the UPF. The NG-RAN forwards data to the UPF through the corresponding tunnel for each PDU session that requires data forwarding.

The NG-RAN transmits data of each Qos flow to the UPF through the user plane tunnel allocated to the PDU session. As for downlink data, the NG-RAN transmits a downlink data packet to the UPF through the tunnel allocated to the downlink data forwarding.

The UPF forwards data to the SGW. The UPF and the SGW have different actions according to the two data forwarding methods between in the UPF and the SGW in the Step 2309.

Method 1: The UPF forwards data of different Qos flows in the PDU session to the SGW through the user plane tunnel allocated to the corresponding EPS bearer, according to the mapping relationship between the Qos flow and the EPS bearer. The SGW directly forwards data to the target base station. Method 2: The UPF transmits the data received from the tunnels corresponding to the same PDU session to the SGW through one tunnel, the SGW performs mapping from the PDU session to the EPS bearer and/or mapping from the Qos flow in the PDU session to the EPS bearer.

The SGW forwards the data to the E-UTRAN. The SGW have different actions according to the two data forwarding methods between the UPF and the SGW.

Method 1: The SGW transmits the data received from the tunnel corresponding to each EPS bearer of the UPF to the E-UTRAN through the corresponding tunnel allocated by the E-UTRAN, that is, the UPF performs mapping from multiple tunnels to one tunnel. The SGW forwards the data to the E-UTRAN in accordance with a session transmitting method in the EPS.

Method 2: The SGW receives the data from the tunnel corresponding to each PDU session of the UPF. The SGW performs the mapping from the PDU session and/or the Qos flow in the PDU session to the E-RAB according to the information received in the Step 2309, for example, how many of the E-RABs the PDU session uses to transmit downlink data to the E-UTRAN, and which E-RAB is used by the Qos flow in the PDU session to transmit the downlink data to the E-UTRAN.

In a process that a PDU session or a GRB Qos flow is established, the UE receives, from a network, EPS Qos information and/or EPS bearer identification information, to which a Qos flow is mapped. The UE correlates the ongoing Qos flow with the identification of the EPS bearer included in the handover command message. As for the EPS bearer that does not have the corresponding Qos flow, the UE may delete it.

Step 2316, the UE transmits a handover completion message to the E-UTRAN.

Step 2317, the E-UTRAN transmits the handover completion message to the MME. The message includes the tunnel information for the downlink data transmission allocated by the E-UTRAN.

Step 2318, the MME transmits a bearer modification request message to the SGW. The message includes the tunnel information for the downlink data transmission over the S1 interface.

Step 2319, the SGW transmits the bearer modification request message to the SMF. The SMF may further include a function of PGW control plane. The SGW allocates tunnel information for the downlink data transmission between the SGW and the UPF, and the tunnel information corresponds to each EPS bearer or each PDU session.

Step 2320, the SMF transmits a session modification message to the UPF. The SMF transmits the tunnel information for the downlink data transmission between the SGW and the UPF allocated by the SGW to the anchor UPF, and the tunnel information corresponds to each EPS bearer or each PDU session. The UPF transmits a session modification response to the SMF. The UPF allocates the tunnel information for uplink data transmission between the SGW and the UPF. The UPF transmits a session modification response to the SMF. The UPF allocates the tunnel information for uplink data transmission between the SGW and the UPF.

Step 2312, the SMF transmits the bearer modification response message to the SGW. The message includes the tunnel information for uplink data transmission between the SGW and the UPF allocated by the UPF Step 2322, the SGW transmits the bearer modification response message to the MME.

So far, the description of the seventh handover method supported by the present disclosure is completed. According to the method, the problem of the handover from the 5GS to the EPS is resolved, the data loss is avoided, and the service continuity is guaranteed.

FIG. 24 is a diagram illustrating a radio access network handover method according to another exemplary embodiment of the present disclosure.

The method is used to support indirect data forwarding during a process of handing over from an NGS or a 5GS to an EPS. As for a PDU session in the 5GS, it is called as a Packet Data Network (PDN) connection in the EPS. Their meanings are the same, and they have a one-to-one correspondence relationship. Thus, it is also called as a PDU session in the EPS. The method includes the following steps:

Step 2401 is the same as the Step 2301, which will not be repeated here.

Step 2402, the NG-RAN transmits a handover required message to an AMF. The message includes identification of a target eNB and a source-to-target transparent container. The message further includes identification information indicating an MM to which the target eNB is connected. The identification information may be tracking area identification, or MME identification.

The NG-RAN notifies the AMF of a type of the handover. The type of the handover is the same as that in the Step 2302, which will not be repeated here.

A method of the NG-RAN for knowing whether the target base station eNB supports an interface with the 5GC is the same as that in the Step 2302, which will not be repeated here.

As for the handover from an NG-RAN to an E-UTRAN, the source-to-target transparent container includes content of a source eNB to a target eNB transparent container. The NG-RAN includes the source eNB to the target eNB transparent container in the handover required message. The NG-RAN does not need to include a list of information of the E-RAB or E-RABs in the source eNB to the target eNB transparent container. The source eNB to the target eNB transparent container further includes a RRC container. Content in the RRC container is organized according to handover preparation of the LTE.

If a base station within which a target cell of the handover is located is an eNB that supports an interface with the 5GC, the NG-RAN includes a source base station to a target base station transparent container 2 in the handover required message. The NG-RAN includes a list of information of a PDU session or PDU sessions in the source based station to the target base station transparent container 2. The information of the PDU session includes PDU session identification, information of a Qos flow or Qos flows and/or a mapping relationship from a Qos flow to a DRB. The source base station to the target base station transparent container 2 further includes a RRC container. Content in the RRC container is organized according to handover preparation of the LTE. The source-to-target transparent container includes content of the source base station to the target base station transparent container 2.

The NG-RAN proposes downlink data forwarding for a Qos flow in a PDU session. The NG-RAN includes PDU session identification and/or a list of information of the Qos flow or Qos flows in the PDU session or PDU sessions in the handover required message. The information of the Qos flow or Qos flows includes identification of the Qos flow or Qos flows, and a downlink data forwarding proposal. The information may be included in the target-to-source transparent container or may be directly included in the handover required message.

Step 2403a, the AMF transmits a SM context request message to the SMF. The AMF requests a SMF to provide a SM context. The AMF transmits the message to each SMF that serves the UE. The AMF may further request for an EPS bearer context. According to the information about the target base station being not connected to the 5GC or the information about the handover being the inter-system handover or the handover from NR to the eNB connected to the EPC received from the source NG-RAN, the AMF knows that the handover is the inter-system handover, and requests the SMF to provide information of the mapped EPS bearer context. The AMF may transmit information of downlink data forwarding proposed for the Qos flow in the PDU session received from the NG-RAN to the SMF. The AMF transmits PDU session identification, identification of the Qos flow and/or the information of the downlink data forwarding proposal to the SMF. The identification of the Qos flow and/or the information of the downlink data forwarding proposal may be transmitted to the SMF through the AMF.

Step 2403b, the SMF transmits a SM context response message to the AMF. The message includes a SM context of the UE. The SM context further includes the mapped EPS bearer context, such as identification of the EPS bearer and/or Qos information of the EPS. If the SMF has the mapped EPS bearer context when the AMF requests for the SM context, the SMF always return the mapped EPS bearer context to the AMF at the same time. Or, when the AMF also indicates to request for the EPS bearer context while requesting for the SM context from the SMF, the SMF transmits the mapped EPS bearer context to the AMF while the AMF requests for the mapped EPS context. The SMF transmits PDU session identification, identification of the Qos flow and/or the information of the downlink data forwarding proposal to the AMF.

Step 2404, the AMF transmits a relocation request message to the MME. The AMF selects and finds out the MME according to the identification information indicating the MME to which the target eNB is connected included in the handover required message. The identification information of the MME to which the target eNB is connected may be TAI or MME identification. The message includes identification of the target eNB, a source-to-target transparent container, 5GS UE context information or mapped EPS UE context information. The 5GS UE context information or the mapped EPS UE context information includes context information of Mobile Management (MM) of the UE and a session management (SM) context.

If the NG-RAN proposes downlink data forwarding for a Qos flow in a PDU session, the AMF may include a downlink data forwarding proposal in the information of the EPS bearer to which the Qos flow is mapped. The AMF obtains the mapping relationship from the Qos flow to the EPS bearer in the PDU session in the Step 2403.

The AMF transmits information of the downlink data forwarding proposed for the EPS bearer to the MME.

The 5GC CP notifies the MME of information of a Qos flow included in a PDU session or a mapping relationship from a Qos flow to an EPS bearer.

Steps 2405 through 2410 are the same as the Steps 2305 through 2310, which will not be repeated here.

Step 2411, the AMF transmits a request message of creating a indirect data forwarding tunnel to the SMF. The message includes information of a PDU session. The information of the PDU session includes PDU session identification, information of a Qos flow included in the PDU session, a mapping relationship between a Qos flow and an EPS bearer, and/or information of the EPS bearer. The information of the EPS bearer includes identification of the EPS bearer, Qos information of the EPS bearer, and/or tunnel information for data forwarding. The tunnel information for data forwarding is received from the MME. The UPF knows the EPS bearer that requires data forwarding according to the tunnel information for data forwarding. The UPF knows the information of the Qos flow that requires data forwarding according to the mapping relationship between the Qos flow and the EPS bearer. The information of the PDU session may further include information of the Qos flow that requires data forwarding. The information of the Qos flow that requires data forwarding includes information of the Qos flow that requires downlink data forwarding. The Qos flow that requires downlink data forwarding is the Qos flow corresponding to the EPS bearer that accepts the downlink data forwarding of the target base station.

As for the data forwarding method 1 between the UPF and the SGW, the information of the EPS bearer further includes the tunnel information for data forwarding which is received from the MME. The tunnel information for data forwarding corresponds to each EPS bearer. The UPF knows the EPS bearer that requires data forwarding according to the tunnel information for data forwarding. The UPF knows the information of the Qos flow that requires data forwarding according to the mapping relationship between the Qos flow and the EPS bearer. The information of the PDU session may further include information of the Qos flow that requires data forwarding.

As for the data forwarding method 2 between the UPF and the SGW, the information of the PDU session includes tunnel information for data forwarding. The tunnel information for data forwarding corresponds to each PDU session.

The AMF knows information of the E-RAB that accepts the downlink data of the target base station according to the information received in the Step 2410. The AMF knows the information of the Qos flow that accepts the downlink data forwarding according to the mapping relationship from the Qos flow to the EPS bearer. The AMF transmits the information of the Qos flow that requires downlink data forwarding in the PDU session or the information of the EPS bearer that requires downlink data forwarding to the SMF.

Step 2412, the SMF transmits a N4 session modification message to the UPF. The message includes information of a PDU session. The information of the PDU session includes PDU session identification, information of a Qos flow included in the PDU session, a mapping relationship between a Qos flow and an EPS bearer, and/or information of the EPS bearer. The information of the EPS bearer includes identification of the EPS bearer, Qos information of the EPS bearer, and/or tunnel information for data forwarding. The tunnel information for data forwarding is received from the MME. The UPF knows the EPS bearer that requires data forwarding according to the tunnel information for data forwarding. The UPF knows the information of the Qos flow that requires data forwarding according to the mapping relationship between the Qos flow and the EPS bearer. The information of the PDU session may further include information of the Qos flow that requires data forwarding. The information of the Qos flow that requires data forwarding includes information of the Qos flow that requires downlink data forwarding. The Qos flow that requires downlink data forwarding is the Qos flow corresponding to the EPS bearer that accepts the downlink data forwarding of the target base station.

As for the data forwarding method 1 between the UPF and the SGW, the information of the EPS bearer further includes the tunnel information for data forwarding which is received from the AMF. The tunnel information for data forwarding corresponds to each EPS bearer. The UPF knows the EPS bearer that requires data forwarding according to the tunnel information for data forwarding. The UPF knows the information of the Qos flow that requires data forwarding according to the mapping relationship between the Qos flow and the EPS bearer. The information of the PDU session may further include information of the Qos flow that requires data forwarding.

As for the data forwarding method 2 between the UPF and the SGW, the information of the PDU session includes tunnel information for data forwarding. The tunnel information for data forwarding corresponds to each PDU session.

The SMF may further transmit the information of the Qos flow that requires downlink data forwarding in the PDU session or the information of the EPS bearer that requires downlink data forwarding to the UPF.

There are three methods for data forwarding between the NG-RAN and the UPF:

Method A: The AMF notifies the NG-RAN of a Qos flow that accepts downlink data forwarding. The data forwarding tunnel between the NG-RAN and the UPF corresponds to each Qos flow that requires data forwarding.

Method B: The AMF notifies the NG-RAN of a Qos flow that accepts downlink data forwarding. The data forwarding tunnel between the NG-RAN and the UPF corresponds to each PDU session that requires data forwarding.

Method C: The AMF notifies the NG-RAN of a PDU session that accepts downlink data forwarding. The data forwarding tunnel between the NG-RAN and the UPF corresponds to each PDU session that requires data forwarding.

The UPF allocates the tunnel information for data forwarding between the NG-RAN and the UPF and transmits it to the SMF. As for the data forwarding methods B and C between the NG-RAN and the UPF, the UPF allocates a piece of user plane tunnel information to each PDU session that requires data forwarding The tunnel information includes a transport layer address and a Tunnel Endpoint Identifier (TEID). As for the data forwarding method A between the NG-RAN and the UPF, the UPF allocates a piece of user plane tunnel information to each Qos flow that requires data forwarding in the PDU session. The tunnel information includes a transport layer address and a Tunnel Endpoint Identifier (TEID).

The UPF transmits the allocated tunnel information for data forwarding to the SMF. The SMF receives an N4 session modification response message from the UPF. The message includes tunnel information for the data forwarding between the NG-RAN and the UPF allocated by the UPF.

Step 2413, the SMF transmits a response message of creating a indirect data forwarding tunnel to the AMF. The message includes tunnel information for the data forwarding between the NG-RAN and the UPF. The tunnel information for the data forwarding between the NG-RAN and the UPF is received from the UPF or is allocated by the SMF.

Step 2414, the AMF transmits a handover command message to the NG-RAN. The message includes a target-to-source transparent container. The message further includes information of an established PDU session and information of a PDU session that is unsuccessfully established. The information of the established PDU session includes information of an established Qos flow and information of a Qos flow that is unsuccessfully established. The message includes the tunnel information for data forwarding allocated by the UPF. As for the data forwarding method A between the NG-RAN and the UPF, the tunnel information for data forwarding corresponds to each Qos flow in each PDU session. As for the data forwarding methods B, C and D between the 5G-RAN and the UPF, the tunnel information for data forwarding corresponds to each PDU session. The handover command message may further include information of the Qos flow that accepts data forwarding. The information of the Qos flow that accepts data forwarding includes identification of the Qos flow. The AMF knows information of the EPS bearer that accepts the downlink data forwarding of the target base station according to the information received in the Step 2410. The AMF knows the information of the Qos flow that accepts the downlink data forwarding according to the mapping relationship from the Qos flow to the EPS bearer. As for the data forwarding method A between the NG-RAN and the UPF, the NG-RAN knows the information of the Qos flow that accepts data forwarding according to the received tunnel information for data forwarding corresponding to each Qos flow in each PDU session. An absence of the tunnel information for data forwarding represent that the data forwarding corresponding to the Qos flow is not accepted.

In the Step 2403, the AMF knows the mapping relationship from the Qos flow to the EPS bearer in the PDU session.

As for the data forwarding method A between the NG-RAN and the UPF, the AMF includes downlink data forwarding tunnel information in the accepted Qos information in the handover command message. The tunnel information for downlink data forwarding is allocated by the UPF or the SMF. The Qos flow that accepts the downlink data forwarding is notified to the NG-RAN through the downlink data forwarding tunnel information.

As for the data forwarding method B between the NG-RAN and the UPF, the AMF includes information of accepting the downlink data forwarding in the accepted Qos information in the handover command message. The AMF includes the downlink data forwarding tunnel information in the information of the established PDU session in the handover command message. The downlink data forwarding tunnel information corresponds to the PDU session. The tunnel information for data forwarding is used for the data forwarding between the NG-RAN and the UPF. The tunnel information for data forwarding is allocated by the UPF or the SMF.

As for the data forwarding method C between the NG-RAN and the UPF, the AMF includes the downlink data forwarding tunnel information in the information of the established PDU session in the handover command message. The downlink data forwarding tunnel information corresponds to the PDU session. The PDU session that accepts the downlink data forwarding is notified to the NG-RAN through the downlink data forwarding tunnel information. The tunnel information for data forwarding is used for the data forwarding between the NG-RAN and the UPF. The tunnel information for data forwarding is allocated by the UPF or the SMF.

Step 2415, the NG-RAN transmits a handover command message to the UE.

The NG-RAN forwards data to the UPF.

As for the data forwarding method A between the NG-RAN and the UPF, for the Qos flow that accepts downlink data forwarding, the NG-RAN forwards downlink data to the UPF through the downlink data tunnel corresponding to the Qos flow.

As for the data forwarding method A between the NG-RAN and the UPF, for the Qos flow that accepts downlink data forwarding, the NG-RAN forwards downlink data to the UPF through the downlink data tunnel corresponding to the PDU session.

As for the data forwarding method C between the NG-RAN and the UPF, for the PDU session that accepts downlink data forwarding, the NG-RAN forwards downlink data to the UPF through the downlink data tunnel corresponding to the PDU session.

As for the data forwarding method A between the NG-RAN and the UPF, the UPF forwards the receive data of the Qos flow to the SGW through the tunnel of the EPS bearer corresponding to the Qos flow. The UPF obtains the mapping relationship between the Qos flow and the EPS bearer in the PDU session and the tunnel information for data forwarding allocated to the EPS bearer by the SGW in the Step 2412.

As for the data forwarding method B between the NG-RAN and the UPF, the UPF forwards the received data of the Qos flow to the SGW through the tunnel of the EPS bearer corresponding to the Qos flow. The UPF obtains the mapping relationship between the Qos flow and the EPS bearer in the PDU session and the tunnel information for data forwarding allocated to the EPS bearer by the SGW in the Step 2412.

As for the data forwarding method C between the NG-RAN and the UPF, the UPF obtains the mapping relationship between the Qos flow and the EPS bearer in the PDU session, and/or the information of the EPS bear or the Qos flow that requires downlink data forwarding in the Step 2412. As for the downlink data forwarding, the UPF forwards the data of the Qos flow that accepts downlink data forwarding to the SGW through the tunnel corresponding to the EPS bearer. The UPF does not transmit the data of the Qos flow that does not accept downlink data forwarding to the SGW.

The SGW directly forwards data to the target base station.

In a process that a PDU session or a GRB Qos flow is established, the UE receives, from a network, Qos information of an EPS and/or identification information of an EPS bearer, to which a Qos flow is mapped. The UE correlates the ongoing Qos flow with the identification of the EPS bearer included in the handover request message. As for the EPS bearer that does not have the corresponding Qos flow, the UE may delete it.

Steps 2415 through 2422 are the same as the Steps 2315 through 2322, which will not be repeated here.

So far, the description of the eighth handover method supported by the present disclosure is completed. According to the method, the problem of the handover from the 5GS to the EPS is resolved, the data loss is avoided, and the service continuity is guaranteed.

FIG. 25 is a diagram illustrating a radio access network handover method according to another exemplary embodiment of the present disclosure.

The method is used to support indirect data forwarding during a process of handing over from an NGS or a 5GS to an EPS. As for a PDU session in the 5GS, it is called as a Packet Data Network (PDN) connection in the EPS. Their meanings are the same, and they have a one-to-one correspondence relationship. Thus, it is also called as a PDU session in the EPS. The method includes the following steps:

Step 2501 is the same as the Step 2301, which will not be repeated here.

Step 2502, the NG-RAN transmits a handover required message to an AMF. The message includes identification of a target eNB and a source-to-target transparent container. The message further includes identification information indicating an MM to which the target eNB is connected. The identification information may be tracking area identification, or MME identification.

The NG-RAN notifies the AMF of a type of the handover. The type of the handover is the same as that in the Step 2302, which will not be repeated here.

A method of the NG-RAN for knowing whether the target base station eNB supports an interface with the 5GC is the same as that in the Step 2302, which will not be repeated here.

As for the handover from an NG-RAN to an E-UTRAN, the source-to-target transparent container includes content of a source eNB to a target eNB transparent container. The NG-RAN includes the source eNB to the target eNB transparent container in the handover required message. The NG-RAN does not need to include a list of information of the E-RAB or E-RABs in the source eNB to the target eNB transparent container. The source eNB to the target eNB transparent container further includes a RRC container. Content in the RRC container is organized according to handover preparation of the LTE.

If a base station within which a target cell of the handover is located is an eNB that supports an interface with the 5GC, the NG-RAN includes a source base station to a target base station transparent container 2 in the handover required message. The NG-RAN includes a list of information of a PDU session or PDU sessions in the source based station to the target base station transparent container 2. The information of the PDU session includes PDU session identification, information of a Qos flow or Qos flows and/or a mapping relationship from a Qos flow to a DRB. The source base station to the target base station transparent container 2 further includes a RRC container. Content in the RRC container is organized according to handover preparation of the LTE. The source-to-target transparent container includes content of the source base station to the target base station transparent container 2.

The NG-RAN includes PDU session identification and/or a list of information of the Qos flow or Qos flows in the PDU session or PDU sessions in the handover required message. The information of the Qos flow or Qos flows includes identification of the Qos flow or Qos flows. The information may be included in the target-to-source transparent container or may be directly included in the handover request message.

Steps 2503*a* through 2503*b* are the same as the Steps 2303*a* through 2303*b*, which will not be repeated here.

Step 2504, the AMF transmits a relocation request message to the MME. The AMMF selects and finds out the MME according to the identification information indicating the MME to which the target eNB is connected included in the handover required message. The identification information of the MME to which the target eNB is connected may be TAI or MME identification. The message includes identification of the target eNB, a source-to-target transparent container, 5GS UE context information or mapped EPS UE context information. The 5GS UE context information or the mapped EPS UE context information includes context information of Mobile Management (MM) of the UE and a session management (SM) context. The message includes a type of the handover. The specific type of handover is the same as that in the Step 2302, which will not be repeated here.

The AMF notifies the MME of information of a Qos flow included in a PDU session or a mapping relationship from a Qos flow to an EPS bearer.

Steps 2505 through 2507 are the same as the Steps 2305 through 2307, which will not be repeated here.

Step 2508, the E-UTRAN transmits a handover request confirmation message to the MME. The message includes a list of established E-RABs, a list of E-RABs that are unsuccessfully established, and a target-to-source transparent container. As for the established RAB, it further includes tunnel information for downlink data transmission over the S1 interface.

If the data forwarding is available, as for the established E-RAB, the target base station may include downlink data forwarding tunnel information. The downlink data forwarding tunnel information includes a transport layer address and a Tunnel Endpoint Identifier (TEID). Different from the prior art, when the data forwarding is available, the target base station may always allocate tunnel information for downlink data forwarding without the proposal of the source base station, and the source base station determines whether the downlink data forwarding is performed. Or, when the data forwarding is available, the target base station proposes downlink data forwarding, and the source base station determines whether the downlink data forwarding is performed. The target base station indicates the proposed downlink data forwarding by including the downlink data forwarding tunnel information in the information of the established E-RAB.

If the data forwarding is available, as for that the handover process is the handover from an NR to an LTE connected to EPC or the handover from an NR to an E-UTRAN, the handover from an LTE connected to 5GC to an LTE connected to EPC or the handover from an LTE connected to 5GC to an E-UTRAN, or the handover from an NR-RAN to an E-UTRAN, for the established E-RAB, the target base station may include the downlink data forwarding tunnel information. The downlink data forwarding tunnel information includes a transport layer address and a Tunnel Endpoint Identifier (TEID). Different from the prior art, when the data forwarding is available and it is the handover from an NG-RAN to an E-UTRAN, the target base station may always allocate tunnel information for downlink data forwarding to the established E-RAB without the downlink data forwarding proposal of the source base station, and the source base station determines whether the downlink data forwarding is performed. Or, when the data forwarding is available and it is the handover from an NG-RAN to an E-UTRAN, the target base station proposes downlink data forwarding, and the source base station determines whether the downlink data forwarding is performed. The target base station indicates the proposed downlink data forwarding by including the downlink data forwarding tunnel information in the information of the established E-RAB. As for the handover from an NR to an E-UTRAN stated here, the source base station refers to the base station connected to the 5GC and includes a GNB and NG-NB, and the target base station refers to the base station connected to the EPC, such as an eNB. The target base station knows whether it is the handover from the NG-RAN to the E-UTRAN according to the type of the handover in the handover request message. The target base station may know whether it is the handover from the NG-RAN to the E-UTRAN according to other methods without affecting the main content of the present disclosure.

Steps 2509 through 2510 are the same as the Steps 2309 through 2310, which will not be repeated here.

Step 2511, the AMF transmits a request message of creating a indirect data forwarding tunnel to the SMF. The message includes information of a PDU session. The information of the PDU session includes PDU session identification, information of a Qos flow included in the PDU session, a mapping relationship between a Qos flow and an EPS bearer, and/or information of the EPS bearer. The information of the EPS bearer includes identification of the EPS bearer, Qos information of the EPS bearer, and/or tunnel information for data forwarding. The tunnel information for data forwarding is received from the MME. The UPF knows the EPS bearer that requires data forwarding according to the tunnel information for data forwarding. The UPF knows the information of the Qos flow that requires data forwarding according to the mapping relationship between the Qos flow and the EPS bearer. The information of the PDU session may further include information of the Qos flow that requires data forwarding. The information of the Qos flow that requires data forwarding includes information of the Qos flow that requires downlink data forwarding. The Qos flow that requires downlink data forwarding is the Qos flow corresponding to the EPS bearer for which the downlink data forwarding is proposed by the target base station.

As for the data forwarding method 1 between the UPF and the SGW, the information of the EPS bearer further includes the tunnel information for data forwarding which is received from the MME. The tunnel information for data forwarding corresponds to each EPS bearer. The UPF knows the EPS bearer that requires data forwarding according to the tunnel information for data forwarding. The UPF knows the information of the Qos flow that requires data forwarding according to the mapping relationship between the Qos flow and the EPS bearer. The information of the PDU session may further include information of the Qos flow that requires data forwarding.

As for the data forwarding method 2 between the UPF and the SGW, the information of the PDU session includes tunnel information for data forwarding. The tunnel information for data forwarding corresponds to each PDU session.

The AMF knows the information of the EPS bearer of the downlink data forwarding according to the information received in the Step 2510. The AMF knows the information of the Qos flow that accepts the downlink data forwarding according to the mapping relationship from the Qos flow to the EPS bearer. The AMF transmits the information of the Qos flow that requires downlink data forwarding in the PDU session or the information of the EPS bearer that requires downlink data forwarding to the SMF.

Step 2512, the SMF transmits a N4 session modification message to the UPF. The message includes information of a PDU session. The information of the PDU session includes PDU session identification, information of a Qos flow included in the PDU session, a mapping relationship from a Qos flow to an EPS bearer, and/or information of the EPS bearer. The information of the EPS bearer includes identification of the EPS bearer, Qos information of the EPS bearer, and/or tunnel information for data forwarding. The tunnel information for data forwarding is received from the MME. The UPF knows the EPS bearer that requires data forwarding according to the tunnel information for data forwarding. The UPF knows the information of the Qos flow that requires data forwarding according to the mapping relationship between the Qos flow and the EPS bearer. The information of the PDU session may further include information of the Qos flow that requires data forwarding. The information of the Qos flow that requires data forwarding includes information of the Qos flow that requires downlink data forwarding. The Qos flow that requires downlink data forwarding is the Qos flow corresponding to the EPS bearer for which the downlink data forwarding is proposed by the target base station.

As for the data forwarding method 1 between the UPF and the SGW, the information of the EPS bearer further includes the tunnel information for data forwarding which is received from the AMF. The tunnel information for data forwarding corresponds to each EPS bearer. The UPF knows the EPS bearer that requires data forwarding according to the tunnel information for data forwarding. The UPF knows the information of the Qos flow that requires data forwarding according to the mapping relationship between the Qos flow and the EPS bearer. The information of the PDU session may further include information of the Qos flow that requires data forwarding.

As for the data forwarding method 2 between the UPF and the SGW, the information of the PDU session includes tunnel information for data forwarding. The tunnel information for data forwarding corresponds to each PDU session.

The SMF may further transmit the information of the Qos flow that requires downlink data forwarding in the PDU session or the information of the EPS bearer that requires downlink data forwarding to the UPF.

There are four methods for data forwarding between the NG-RAN and the UPF:

Method A: The AMF notifies the NG-RAN of a Qos flow for which downlink data forwarding is proposed by the target base station. The data forwarding tunnel between the NG-RAN and the UPF corresponds to each Qos flow that requires data forwarding.

Method B: The AMF notifies the NG-RAN of a Qos flow for which downlink data forwarding is proposed by the target base station. The data forwarding tunnel between the NG-RAN and the UPF corresponds to each PDU session that requires data forwarding.

Method C: The AMF notifies the NG-RAN of a PDU session that requires downlink data forwarding. The data forwarding tunnel between the NG-RAN and the UPF corresponds to each PDU session that requires data forwarding. The AMF notifies the NG-RAN of a PDU session that requires downlink data forwarding in a display manner or in an implied manner. The implied manner indicates that the information of the PDU session in the handover command message includes the data forwarding tunnel information to identify the data forwarding is available or the downlink data forwarding is proposed by the target base station. As for the method of the target base station for allocating the data forwarding tunnels for all of the established E-RABs if the data forwarding is available and the handover process is the handover from the NG-RAN to the E-UTRAN, the information of each established PDU session in the handover command message includes the data forwarding tunnel information.

The UPF allocates the tunnel information for data forwarding between the NG-RAN and the UPF and transmits it to the SMF. As for the data forwarding methods B and C between the NG-RAN and the UPF, the UPF allocates a piece of user plane tunnel information to each PDU session that requires data forwarding The tunnel information includes a transport layer address and a Tunnel Endpoint Identifier (TEID). As for the data forwarding method A between the NG-RAN and the UPF, the UPF allocates a piece of user plane tunnel information to each Qos flow that requires data forwarding in the PDU session. The tunnel information includes a transport layer address and a Tunnel Endpoint Identifier (TEID).

The UPF transmits the allocated tunnel information for data forwarding to the SMF. The SMF receives an N4 session modification response message from the UPF. The message includes tunnel information for the data forwarding between the NG-RAN and the UPF allocated by the UPF.

Step 2513, the SMF transmits a response message of creating a indirect data forwarding tunnel to the AMF. The message includes tunnel information for the data forwarding between the NG-RAN and the UPF. As for the data forwarding method A between the NG-RAN and the UPF, the tunnel information corresponds to each Qos flow. As for the data forwarding methods B and C between the NG-RAN and the UPF, the tunnel information corresponds to each PDU session. The tunnel information for the data forwarding between the NG-RAN and the UPF is allocated by the UPF or the SMF.

Step 2514, the AMF transmits a handover command message to the NG-RAN. The message includes a target-to-source transparent container. The message further includes information of an established PDU session and information of a PDU session that is unsuccessfully established. The information of the established PDU session includes information of an established Qos flow and information of a Qos flow that is unsuccessfully established. The message includes the tunnel information for data forwarding. As for the data forwarding method A between the NG-RAN and the UPF, the tunnel information for data forwarding corresponds to each Qos flow in the PDU session. As for the data forwarding methods B and C between the 5G-RAN and the UPF, the tunnel information for data forwarding corresponds to each PDU session. The tunnel information for the data forwarding between the NG-RAN and the UPF is allocated by the UPF or the SMF.

In the Step 2503, the AMF knows the mapping relationship from the Qos flow to the EPS bearer in the PDU session.

As for the data forwarding method A between the NG-RAN and the UPF, the AMF includes downlink data forwarding tunnel information in the information of the accepted Qos flow in the handover command message. The tunnel information for downlink data forwarding is allocated by the UPF or the SMF. The Qos flow for which the downlink data forwarding is proposed notified to the NG-RAN through the downlink data forwarding tunnel information.

As for the data forwarding method B between the NG-RAN and the UPF, the AMF includes information of the downlink data forwarding proposal in the accepted Qos information in the handover command message. The AMF includes the downlink data forwarding tunnel information in the information of the established PDU session in the handover command message. The downlink data forwarding tunnel information corresponds to the PDU session. The tunnel information for data forwarding is allocated by the UPF or the SMF.

As for the data forwarding method C between the NG-RAN and the UPF, the AMF includes the downlink data forwarding tunnel information in the information of the established PDU session in the handover command message. The downlink data forwarding tunnel information corresponds to the PDU session. The PDU session for which the downlink data forwarding is proposed or can be performed is notified to the NG-RAN through the downlink data forwarding tunnel information. The data forwarding tunnel information is allocated by the UPF or the SMF.

Step 2515, the NG-RAN transmits a handover command message to the UE.

The NG-RAN forwards data to the UPF.

As for the data forwarding method A between the NG-RAN and the UPF, for the Qos flow that accepts downlink data forwarding of the NG-RAN, the NG-RAN forwards downlink data to the UPF through the downlink data tunnel corresponding to the Qos flow.

As for the data forwarding method B between the NG-RAN and the UPF, for the Qos flow that accepts downlink data forwarding of the NG-RAN, the NG-RAN forwards downlink data to the UPF through the downlink data tunnel corresponding to the PDU session.

As for the data forwarding method C between the NG-RAN and the UPF, for the PDU session that accepts or decides downlink data forwarding, the NG-RAN forwards downlink data to the UPF through the downlink data tunnel corresponding to the PDU session.

As for the data forwarding method A between the NG-RAN and the UPF, the UPF forwards the receive data of the Qos flow to the SGW through the tunnel of the EPS bearer corresponding to the Qos flow. The UPF obtains the mapping relationship between the Qos flow and the EPS bearer in the PDU session and the tunnel information for data forwarding allocated to the EPS bearer by the SGW in the Step 2512.

As for the data forwarding method B between the NG-RAN and the UPF, the UPF forwards the received data of the Qos flow to the SGW through the tunnel of the EPS bearer corresponding to the Qos flow. The UPF obtains the mapping relationship between the Qos flow and the EPS bearer in the PDU session and the tunnel information for data forwarding allocated to the EPS bearer by the SGW in the Step 2512.

As for the data forwarding method C between the NG-RAN and the UPF, the UPF obtains the mapping relationship between the Qos flow and the EPS bearer in the PDU session, and/or the information of the EPS bear or the Qos flow that requires downlink data forwarding in the Step 2512. For the downlink data forwarding, the UPF forwards the received data of the Qos flows to the SGW through the tunnel of the corresponding EPS bearer, according to the mapping relationship between the Qos flow and the EPS bearer. For the downlink data forwarding, the UPF forwards the data of the Qos flow corresponding to the E-RAB for which the downlink data forwarding is proposed by the target E-UTRAN (the UPF receives identification of the downlink data forwarding tunnel allocated by the SGW) to the SGW. The tunnel for data forwarding between the UPF and the SGW corresponds to each EPS bearer. The UPF does not forward the data of the Qos flow corresponding to the E-RAB for which the downlink data forwarding is not proposed by the target E-UTRAN (the UPF does not receive identification of the downlink data forwarding tunnel allocated by the SGW) to the SGW.

The SGW directly forwards data to the target base station.

In a process that a PDU session or a GRB Qos flow is established, the UE receives, from a network, Qos information of an EPS and/or identification information of an EPS bearer, to which a Qos flow is mapped. The UE correlates the ongoing Qos flow with the identification of the EPS bearer included in the handover command message. As for the EPS bearer that does not have the corresponding Qos flow, the UE may delete it.

Steps 2515 through 2522 are the same as the Steps 2315 through 2322, which will not be repeated here.

So far, the description of the ninth handover method supported by the present disclosure is completed. According to the method, the problem of the handover from the 5GS to the EPS is resolved, the data loss is avoided, and the service continuity is guaranteed.

FIG. 26 is a block diagram illustrating a base station according to another exemplary embodiment of the present disclosure.

FIG. 26 is a block diagram illustrating a UE according to another exemplary embodiment of the present disclosure.

Referring to the FIG. 26, the device 2600 may include a processor 2610, a transceiver 2620 and a memory 2630. However, all of the illustrated components are not essential. The device 2600 may be implemented by more or less components than those illustrated in FIG. 26. In addition, the processor 2610 and the transceiver 2620 and the memory 2630 may be implemented as a single chip according to another embodiment.

The aforementioned components will now be described in detail.

The processor 2610 may include one or more processors or other processing devices that control the proposed function, process, and/or method. Operation of the device 2600 may be implemented by the processor 2610.

The processor 2610 may determining handing over a UE to an E-UTRAN, transmitting a handover requirement message to an AMF, receiving a handover command message from the AMF and transmitting the handover command message to the UE, the handover message such that the UE is handed over from the 5G-RAN to the E-UTRAN and performing indirect data forwarding to a base station in the E-UTRAN.

The transceiver 2620 may include a RF transmitter for up-converting and amplifying a transmitted signal, and a RF receiver for down-converting a frequency of a received signal. However, according to another embodiment, the transceiver 2620 may be implemented by more or less components than those illustrated in components.

The transceiver 2620 may be connected to the processor 2610 and transmit and/or receive a signal. The signal may include control information and data. In addition, the transceiver 2620 may receive the signal through a wireless channel and output the signal to the processor 2610. The transceiver 2620 may transmit a signal output from the processor 2610 through the wireless channel.

The memory 2630 may store the control information or the data included in a signal obtained by the device 2600. The memory 2630 may be connected to the processor 2610 and store at least one instruction or a protocol or a parameter for the proposed function, process, and/or method. The memory 2630 may include read-only memory (ROM) and/or random access memory (RAM) and/or hard disk and/or CD-ROM and/or DVD and/or other storage devices.

FIG. 27 is a block diagram illustrating a UE according to another exemplary embodiment of the present disclosure.

Referring to the FIG. 27, the device 2700 may include a processor 2710, a transceiver 2720 and a memory 2730. However, all of the illustrated components are not essential. The device 2700 may be implemented by more or less components than those illustrated in FIG. 27. In addition, the processor 2710 and the transceiver 2720 and the memory 2730 may be implemented as a single chip according to another embodiment.

The aforementioned components will now be described in detail.

The processor 2710 may include one or more processors or other processing devices that control the proposed function, process, and/or method. Operation of the device 2700 may be implemented by the processor 2710.

The processor 2710 may receiving EPS bearer ID to which a QoS flow is mapped from a base station in a 5G-RAN, receiving a handover command message from the base station in the 5G-RAN, the handover message including QoS flow for Data Forwarding, correlating ongoing QoS flow with the EPS bearer ID and transmitting a handover completion message to the E-UTRAN.

The transceiver 2720 may include a RF transmitter for up-converting and amplifying a transmitted signal, and a RF receiver for down-converting a frequency of a received signal. However, according to another embodiment, the transceiver 2720 may be implemented by more or less components than those illustrated in components.

The transceiver 2720 may be connected to the processor 2710 and transmit and/or receive a signal. The signal may include control information and data. In addition, the transceiver 2720 may receive the signal through a wireless channel and output the signal to the processor 2710. The transceiver 2720 may transmit a signal output from the processor 2710 through the wireless channel.

The memory 2730 may store the control information or the data included in a signal obtained by the device 2700. The memory 2730 may be connected to the processor 2710 and store at least one instruction or a protocol or a parameter for the proposed function, process, and/or method. The memory 2730 may include read-only memory (ROM) and/or random access memory (RAM) and/or hard disk and/or CD-ROM and/or DVD and/or other storage devices.

Those skilled in the art may understand achieving all or a portion of the steps carried out by the method embodiments described above may be accomplished through commanding the associated hardware by a program, the program may be stored in a computer readable storage medium, when it is executed, one of the steps of the method embodiments or a combination thereof is included.

In addition, the functional units in the various embodiments of the present application may be integrated in a processing module, or each unit may be physically present individually, or two or more units may be integrated in one module. The integrated module may be implemented in the form of hardware, and may also be achieved in the form of software function modules. The integrated module may also be stored in a computer-readable storage medium if it is implemented in the form of a software function module and is sold or used as a standalone product.

Although the present disclosure has been particularly shown and described with reference to exemplary embodiments thereof, it will be understood by those skilled in the art that various changes in form and details may be made therein without departing from the spirit and scope of the present disclosure as defined by the following claims.

The invention claimed is:

1. A method performed by a user plane function (UPF) in a communication system, the method comprising:
receiving, from a session management function (SMF), a first message including first tunnel information for data forwarding between the UPF and a serving gateway (SGW) and information of a quality of service (QoS) flow;
allocating second tunnel information for data forwarding between a next generation radio access network (NG-RAN) and the UPF, the second tunnel information being associated with a protocol data unit (PDU) session;
transmitting, to the SMF, a second message including the second tunnel information;
receiving, from the NG-RAN, data based on the second tunnel information; and
transmitting, to the SGW, the data based on the first tunnel information, the first tunnel information being associated with an evolved packet system (EPS) bearer.

2. The method of claim 1, wherein the QoS flow is mapped into the first tunnel information for data forwarding between the UPF and the SGW.

3. A user plane function (UPF) comprising:
a transceiver; and
at least one controller coupled with the transceiver and configured to:
receive, from a session management function (SMF), a first message including first tunnel information for data forwarding between the UPF and a serving gateway (SGW) and information of a quality of service (QoS) flow,
allocate second tunnel information for data forwarding between a next generation radio access network (NG-RAN) and the UPF, the second tunnel information being associated with a protocol data unit (PDU) session,
transmit, to the SMF, a second message including the second tunnel information,
receive, from the NG-RAN, data based on the second tunnel information,
transmit, to the SGW, the data based on the first tunnel information, the first tunnel information being associated with an evolved packet system (EPS) bearer.

4. The UPF of claim 3, wherein the QoS flow is mapped into the first tunnel information for data forwarding between the UPF and the SGW.

* * * * *